United States Patent
Chastain et al.

(10) Patent No.: US 10,136,305 B2
(45) Date of Patent: Nov. 20, 2018

(54) METHOD AND APPARATUS FOR USING MOBILE SUBSCRIBER IDENTIFICATION INFORMATION FOR MULTIPLE DEVICE PROFILES FOR A DEVICE

(71) Applicants: AT&T INTELLECTUAL PROPERTY I, L.P., Atlanta, GA (US); AT&T MOBILITY II LLC, Atlanta, GA (US)

(72) Inventors: Walter Cooper Chastain, Atlanta, GA (US); Stephen Emille Chin, Marietta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 33 days.

(21) Appl. No.: 15/366,161

(22) Filed: Dec. 1, 2016

(65) Prior Publication Data
US 2018/0160292 A1 Jun. 7, 2018

(51) Int. Cl.
*H04W 8/18* (2009.01)
*H04W 8/26* (2009.01)
(Continued)

(52) U.S. Cl.
CPC ............... *H04W 8/18* (2013.01); *H04W 4/50* (2018.02); *H04W 8/26* (2013.01); *H04W 12/04* (2013.01); *H04W 12/06* (2013.01); *H04W 60/00* (2013.01)

(58) Field of Classification Search
CPC ......... H04W 8/18; H04W 4/50; H04W 12/06; H04W 4/001; H04W 60/00; H04W 12/04; H04W 8/26
See application file for complete search history.

(56) References Cited

U.S. PATENT DOCUMENTS 5,598,459 A * 1/1997 Haartsen ............... H04L 9/3271
455/11.1
5,765,105 A   6/1998 Kuriki
(Continued)

FOREIGN PATENT DOCUMENTS

AU   2014227509 A1   10/2014
CA   2673830 A1   7/2008
(Continued)

OTHER PUBLICATIONS

Choudhruy, Hiten, "A New Trust Model for Improved Identity Privacy in Cellular Networks", http://citeseerx.ist.psu.edu/viewdoc/download?doi=10.1.1.247.2671&rep=rep1&type=pdf, Disclosing re-using identifications for subsequent connections (p. 3)., 2012.
(Continued)

*Primary Examiner* — Nathan Mitchell
(74) *Attorney, Agent, or Firm* — Guntin & Gust, PLC; Atanu Das

(57) ABSTRACT

Aspects of the subject disclosure may include, for example, a system that manages reuse of mobile subscriber identity information. Further aspects may include mobile subscriber identity information used in a device having multiple device profiles indexed, directly or indirectly, by multiple $k_i$ (e.g. shared secret keys). Other embodiments are disclosed.

20 Claims, 38 Drawing Sheets

(51) Int. Cl.
*H04W 12/06* (2009.01)
*H04W 12/04* (2009.01)
*H04W 60/00* (2009.01)
*H04W 4/50* (2018.01)

(56) References Cited

U.S. PATENT DOCUMENTS

| | | |
|---|---|---|
| 5,887,257 A | 3/1999 | Olds |
| 6,154,654 A | 11/2000 | Mao |
| 6,591,098 B1 | 7/2003 | Shieh et al. |
| 7,266,371 B1 | 9/2007 | Amin et al. |
| 7,840,234 B2 | 11/2010 | Chan |
| 8,050,274 B2 | 11/2011 | Ala-Luukko et al. |
| 8,145,212 B2 | 3/2012 | Lopresti et al. |
| 8,406,758 B2 | 3/2013 | Snijder et al. |
| 8,463,258 B2 | 6/2013 | Parsons et al. |
| 8,468,260 B2 | 6/2013 | Yu |
| 8,505,081 B2 | 8/2013 | Hawkes et al. |
| 8,509,767 B2 | 8/2013 | Cochran et al. |
| 8,515,488 B2 | 8/2013 | Hillier et al. |
| 8,700,000 B2 | 4/2014 | Pauliac et al. |
| 8,718,711 B2 | 5/2014 | Shi et al. |
| 9,028,577 B2 | 5/2015 | Muratore et al. |
| 9,491,563 B1 | 11/2016 | Hatton et al. |
| 9,615,250 B2 | 4/2017 | Guday et al. |
| 9,699,646 B2 | 7/2017 | Poon et al. |
| 9,794,905 B1 | 10/2017 | Chastain et al. |
| 2002/0197991 A1 | 12/2002 | Anvekar et al. |
| 2003/0236980 A1* | 12/2003 | Hsu ......................... H04L 63/08 |
| | | 713/168 |
| 2005/0075106 A1 | 4/2005 | Jiang |
| 2006/0035631 A1 | 2/2006 | White et al. |
| 2007/0133467 A1 | 6/2007 | Hsu et al. |
| 2008/0026740 A1 | 1/2008 | Netanel et al. |
| 2008/0153521 A1 | 6/2008 | Benaouda et al. |
| 2008/0268842 A1 | 10/2008 | Herrero-Veron et al. |
| 2008/0293377 A1 | 11/2008 | Pauliac et al. |
| 2009/0029684 A1 | 1/2009 | Rosenblatt et al. |
| 2009/0149175 A1 | 6/2009 | Lopresti et al. |
| 2009/0264122 A1 | 10/2009 | Van Loon et al. |
| 2010/0009659 A1 | 1/2010 | Netanel et al. |
| 2010/0093358 A1 | 4/2010 | Cheong et al. |
| 2010/0136967 A1 | 6/2010 | Du et al. |
| 2010/0159924 A1 | 6/2010 | Lagerman et al. |
| 2010/0190473 A1 | 7/2010 | Ishikawa |
| 2010/0273462 A1 | 10/2010 | Thorn et al. |
| 2011/0053619 A1 | 3/2011 | Shaheen et al. |
| 2011/0171953 A1 | 7/2011 | Faccin et al. |
| 2011/0191835 A1 | 8/2011 | Hawkes et al. |
| 2012/0039312 A1 | 2/2012 | Narkar et al. |
| 2012/0094634 A1 | 4/2012 | Parsons et al. |
| 2012/0196570 A1 | 8/2012 | Lindholm et al. |
| 2012/0282891 A1 | 11/2012 | Mohammed et al. |
| 2012/0282924 A1 | 11/2012 | Tagg et al. |
| 2012/0303961 A1 | 11/2012 | Kean et al. |
| 2012/0309374 A1 | 12/2012 | Tagg et al. |
| 2012/0322410 A1 | 12/2012 | Lodeweyckx et al. |
| 2013/0012159 A1 | 1/2013 | Lodeweyckx et al. |
| 2013/0012168 A1* | 1/2013 | Rajadurai ............. H04L 9/0822 |
| | | 455/411 |
| 2013/0029637 A1 | 1/2013 | Hillier et al. |
| 2013/0065583 A1 | 3/2013 | Pan |
| 2013/0095795 A1 | 4/2013 | Shi |
| 2013/0102306 A1 | 4/2013 | Sachanandani |
| 2013/0157673 A1 | 6/2013 | Brusilovsky et al. |
| 2013/0165075 A1 | 6/2013 | Rishy-Maharaj et al. |
| 2013/0219180 A1* | 8/2013 | Saino ....................... G06F 21/42 |
| | | 713/171 |
| 2013/0326603 A1 | 12/2013 | Kato et al. |
| 2013/0343256 A1 | 12/2013 | Zakrzewski et al. |
| 2014/0004827 A1 | 1/2014 | O'Leary et al. |
| 2014/0051422 A1 | 2/2014 | Mittal et al. |
| 2014/0075532 A1 | 3/2014 | Murakami et al. |
| 2014/0094144 A1 | 4/2014 | Thorn et al. |
| 2015/0148032 A1 | 5/2015 | Rainer et al. |
| 2015/0230087 A1 | 8/2015 | Barkan |
| 2015/0237496 A1 | 8/2015 | Gao et al. |
| 2015/0311934 A1* | 10/2015 | Jang ....................... H04W 12/06 |
| | | 455/558 |
| 2015/0341852 A1 | 11/2015 | Knudsen |
| 2015/0350091 A1 | 12/2015 | Solovyev et al. |
| 2015/0359026 A1 | 12/2015 | Iwai et al. |
| 2016/0019381 A1 | 1/2016 | Yang et al. |
| 2016/0174069 A1 | 6/2016 | Bruner et al. |
| 2016/0183081 A1 | 6/2016 | Flores Cuadrado et al. |
| 2016/0183086 A1 | 6/2016 | Sharaga et al. |
| 2016/0295544 A1 | 10/2016 | Jiang et al. |
| 2016/0350097 A1* | 12/2016 | Mahapatra .............. G06F 8/654 |
| 2017/0026823 A1 | 1/2017 | Mohammed et al. |
| 2017/0064539 A1 | 3/2017 | Yang |
| 2017/0135059 A1 | 5/2017 | Taneja et al. |
| 2017/0230820 A1 | 8/2017 | Ho et al. |
| 2017/0374543 A1* | 12/2017 | Lee ......................... H04W 8/14 |
| 2018/0049018 A1 | 2/2018 | Campbell et al. |
| 2018/0063688 A1 | 3/2018 | Lindholm et al. |
| 2018/0077561 A1 | 3/2018 | Chastain et al. |
| 2018/0077563 A1 | 3/2018 | Chastain et al. |
| 2018/0077666 A1 | 3/2018 | Chastain et al. |
| 2018/0077667 A1 | 3/2018 | Walter et al. |
| 2018/0077669 A1 | 3/2018 | Chastain et al. |
| 2018/0084516 A1 | 3/2018 | Campbell et al. |
| 2018/0139602 A1 | 5/2018 | Chastain et al. |
| 2018/0152831 A1 | 5/2018 | Chastain et al. |

FOREIGN PATENT DOCUMENTS

| | | |
|---|---|---|
| CN | 101868991 A | 10/2010 |
| CN | 103167465 A | 6/2013 |
| DE | 60224063 T2 | 11/2008 |
| EP | 2814271 A1 | 12/2014 |
| GB | 2473753 B | 3/2013 |
| JP | 2013505658 A | 2/2013 |
| WO | 2004075598 A1 | 9/2004 |
| WO | 2013008048 A1 | 1/2013 |

OTHER PUBLICATIONS

Elouafiq, Ali, "Authentication and Encryption in GSM and 3G/UMTS An Emphasis on Protocols and Algorithms", http://arxiv.org/pdf/1204.1651, 2012.

Han, Chan-Kyu, "Evaluation of Authentication Signaling Loads in 3GPP LTE/SAE Networks", https://www.researchgate.net/profile/Jung_Woo_Baek/publication/221081030_Evaluation_of_authentication_signaling_loads_in_3GPP_LTESAE_networks/links/0046352597bfe186e0000000.pdf, 2009.

Jehadessan, R, "Mobile Communication Technologies", http://www.academia.edu/download/3455626/Information_and_Knowledge_Management_Using_GNOWSYS.pdf#page=111, 2005.

Kesdogan, Dogan, "Location Management Strategies Increasing Privacy in Mobile Communication", http://epub.uni-regensburg.de/7414/1/KFJP_96IFIPSec.pdf, 1996.

Thigale, Somnath, "Applying New Trust Requirements in 3GPP Mobile Systems for Improved Subscriber Identity Privacy", http://www.academia.edu/download/37998673/ijsrp-p4250.pdf, 2015.

* cited by examiner

200

1000

1100

1500

| IMEI1 | IMSI1 | $k_1$ |
| IMEI2 | IMSI1 | $k_2$ |
| IMEI3 | IMSI1 | $k_3$ |
| IMEI4 | IMSI2 | $k_4$ |
| IMEI5 | IMSI2 | $k_5$ |
| IMEI6 | IMSI3 | $k_6$ |

METHOD AND APPARATUS FOR USING MOBILE SUBSCRIBER IDENTIFICATION INFORMATION FOR MULTIPLE DEVICE PROFILES FOR A DEVICE

FIELD OF THE DISCLOSURE

The subject disclosure relates to a method and apparatus for using mobile subscriber identification information for multiple device profiles for a device.

BACKGROUND

Mobile communication devices register with networks so that the devices can provide communication services to subscribers. The registration process requires exchanging messages between the mobile communication device and network device(s), as well as exchanging messages between network devices.

As an example as illustrated in FIG. 1, a device can provide mobile subscriber identification information to the network at 101 which is received by a registration function (e.g., a Home Location Register (HLR)). Various information can be exchanged on the network-side and an analysis of the mobile subscriber identification information can be performed resulting in a registration authorization being provided to the device at 102.

BRIEF DESCRIPTION OF THE DRAWINGS

Reference will now be made to the accompanying drawings, which are not necessarily drawn to scale, and wherein:

FIG. 16 depicts an illustrative embodiment of a database structure that can be utilized during use of a same mobile subscriber identification information by more than one communication device;

FIG. 38 is a diagrammatic representation of a machine in the form of a computer system within which a set of

DETAILED DESCRIPTION

Figure 1:
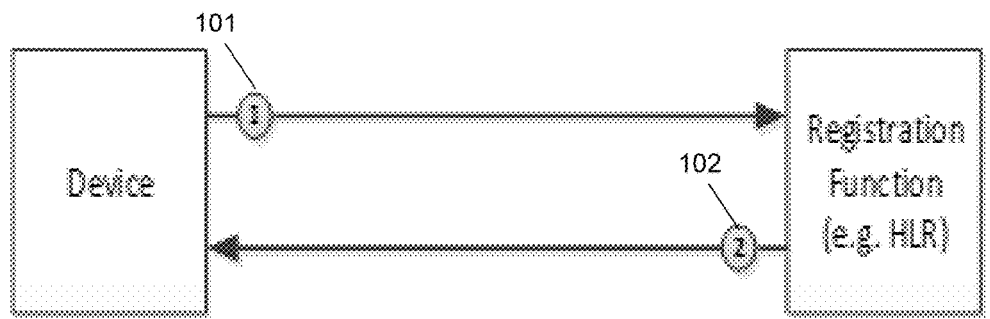
FIG. 1 depicts an illustrative embodiment of a registration process in the prior art.

The subject disclosure describes, among other things, illustrative embodiments for managing utilization of mobile subscriber identity information referred to herein as an International Mobile Subscriber Identity (IMSI). The system and methods described herein can enable reuse of an IMSI by a different communication device and/or re-authorizing use by a communication device that previously was authorized to utilize the IMSI. In one or more embodiments, the management of the IMSI reuse can be based at least in part on intercepting registration requests and/or registration error messages. In one or more embodiments, the communication devices can be end user devices, or other devices including Machine-to-Machine (M2M) or Internet of Things (IoT) devices. In one or more embodiments, a bootstrap IMSI can be utilized in a registration process by a communication device that has been flagged as inactive, where the limited use includes enabling communication with network elements for initiating a registration process without enabling user communication services at the communication device utilizing the bootstrap IMSI.

In one or more embodiments, a same IMSI can be utilized by more than one communication device according to distinguishing between device (e.g., during registration) based on unique device identification information. In one or more embodiments, a same IMSI can be utilized by more than one communication device according to the devices being located in different registration areas. Other embodiments are described in the subject disclosure.

In one or more embodiments, a same IMSI can be utilized by more than one communication device according to the mobility and/or device location among different communication devices.

One or more aspects of the subject disclosure is a device. The device can comprise a processing system including a processor, and a memory that stores executable instructions that, when executed by the processing system, facilitate performance of operations. The operations can include receiving an international mobile subscriber identity (IMSI) and a generated authentication response for each of a plurality of secret keys resulting in a plurality of generated authentication responses. Additional operations include associating each of the plurality of generated authentication responses with each of a plurality of device profiles. Also, the operations include receiving a registration request from a communication device. The registration request includes a device authentication response. Further operations can include comparing the device authentication response to the each of the plurality of generated authentication responses. Additional operations can include identifying that the device authentication response matches a first generated authentication response. The first generated authentication response is one of the plurality of generated authentication responses. Also, the operations can include identifying a first device profile associated with the first generated authentication response. The operations can further include notifying a server to provide services to the communication device according to the first device profile.

One or more aspects of the subject disclosure is a method. The method includes receiving, by a processing system including a processor, an international mobile subscriber identity (IMSI) and a plurality of unique identifiers from an identity provisioning function. Each of the plurality of unique identifiers are associated with a registration function resulting in a plurality of registration functions. The processing system operates as an identity proxy function. Further, the method includes obtaining, by the processing system, a registration request from a communication device. The registration request includes a first unique identifier of the plurality of the unique identifiers. In addition, the method includes steering, by the processing system, the registration request to a first registration function of the plurality of registration functions according to the first unique identifier. Also, the method includes providing, by the processing system, the first unique identifier to the identity provisioning function. The identity provisioning function identifies a first device profile according to the first unique identifier. Further, the identity provisioning function sends a notification to a server that the communication device has enabled the first device profile.

One or more aspects of the subject disclosure is a machine-readable storage medium that facilitates performance of operations. The operations include receiving an international mobile subscriber identity (IMSI) and a generated authentication response for each of a plurality of secret keys resulting in a plurality of generated authentication responses. Additional operations can include associating each of the plurality of generated authentication responses with each of a plurality of device profiles. Also, the operations can include receiving a registration request from a communication device, wherein the registration request includes a device authentication response. Further operations can include identifying a first device profile according to the device authentication response and a first generated authentication response from the plurality of generated authentication responses. Additional operations can include notifying a server to provide services to the communication device according to the first device profile.

Figure 2:
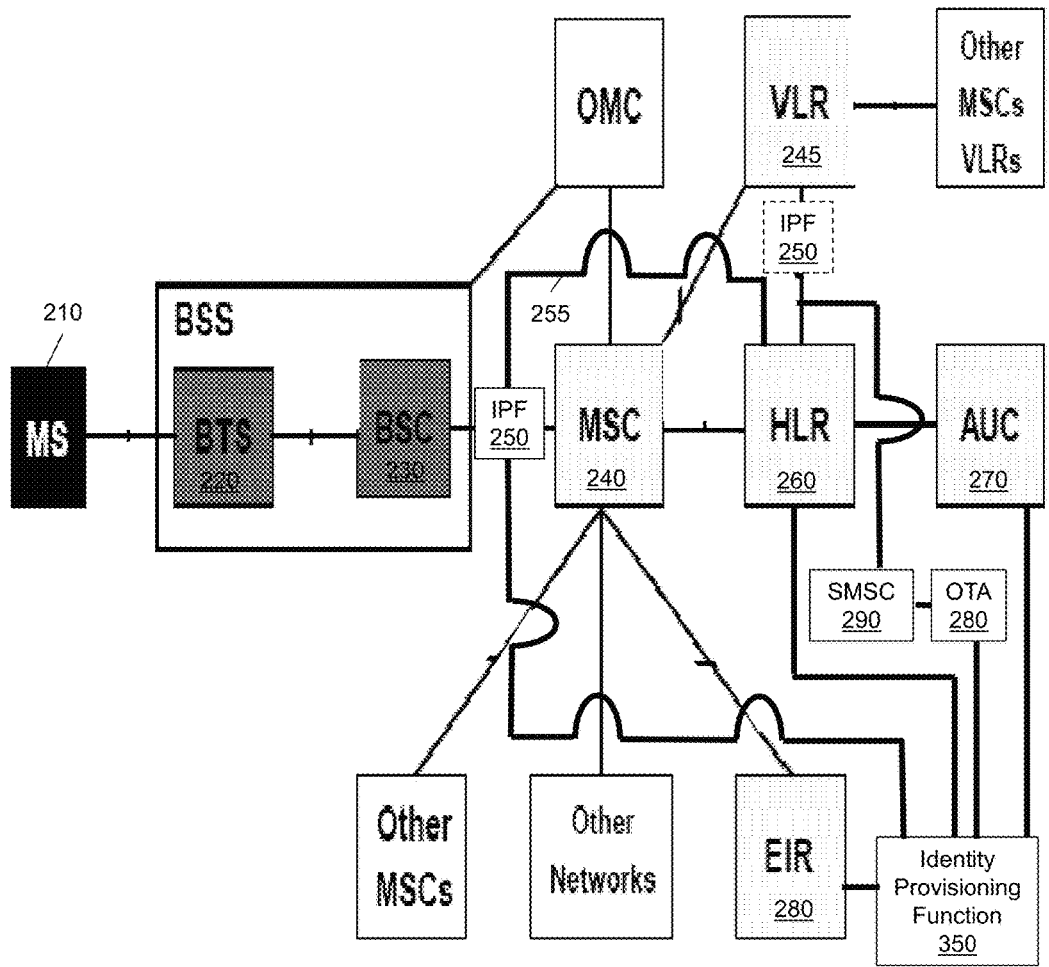
FIG. 2 depicts an illustrative embodiment of a system that provides communication services and enables re-using mobile Subscriber Identification Information by other devices.

FIG. 2 depicts an illustrative embodiment of a communication system 200 (e.g., a Global System for Mobile Communications (GSM) system) that provides communication services such as to a communication device 210. The communication device 210 can be various types of devices such as a mobile phone or other devices that utilize an IMSI for establishing communication services. The types of communication services can vary including voice services, video, data and/or messaging. System 200 enables IMSI re-use by the same or other communication devices through use of an identity proxy function 250 and an identity provisioning function 350.

System 200 can include various components that facilitate providing the communication services, such as a Base Station Subsystem (BSS) that performs various functions (e.g., allocation of radio channels, paging, transmitting and receiving over the air interface). The BSS can include a Base Transceiver Station (BTS) 220 which can include equipment for transmitting and receiving radio signals, antennas, and equipment for encrypting and decrypting communications with a Base Station Controller (BSC) 230. The BSC 230 can serve several different frequencies and different sectors of a cell. System 200 can include a core network with other components such as a Mobile Switching Center (MSC) 240, a Visitor Location Register (VLR) 245, a Home Location Register (HLR) 260, an Authentication Center (AUC) 270, and an Equipment Identity Register (EIR) 270.

The MSC 240 can be a primary service delivery node that is responsible for routing voice calls and SMS, as well as other services, such as conference calls, FAX and circuit switched data. The VLR 245 can be a database of subscribers that have roamed into a jurisdiction of a particular MSC served by that VLR. The VLR 245 is illustrated as a stand-alone device but can be integrated with the MSC 240. The HLR 260 can be a central database that contains details of each mobile phone subscriber that is authorized to use the core network. In one or more embodiments, the HLRs can store details of Universal Integrated Circuit Cards (UICCs) (e.g., Subscriber Identity Module (SIM) cards) issued by the mobile phone operator. In one or more embodiments, IMSIs can be unique identifiers which are the primary key to each HLR record. In one or more embodiments, MSISDNs, which are the telephone numbers used by mobile phones to make and receive calls, can also be a primary key to a particular HLR record. Other data can be stored in the HLR 260 (e.g., indexed to a particular IMSI), such as communication services that the subscriber has requested or is authorized to utilize, GPRS settings to allow the subscriber to access packet services, a current location of subscriber call divert settings applicable for each associated MSISDN, and so forth.

The AUC 270 can perform a function to authenticate each UICC that attempts to connect to the core network (e.g., when the phone is powered on). Once the authentication is successful, the HLR 260 can manage the UICC and authorized communication services. The EIR 280 can maintain a list of mobile phones (e.g., identified by their International Mobile Station Equipment Identity (IMEI)) which are to be monitored or are to be prohibited from utilizing the network. The EIR 280 can be a database that contains information about the identity of the mobile equipment that prevents calls from stolen, unauthorized or defective mobile stations. In one or more embodiments, the EIR 280 can log handset attempts that are stored in a log file. The EIR 280 is illustrated as a stand-alone device but can be integrated with the HLR 260. System 200 can include other features such as an Operations and Maintenance Center (OMC) that enables or otherwise facilitates the operation, administration and maintenance of a GSM network.

The communication system 200 can provide Over-The-Air (OTA) technology to communicate with, download applications to, and manage a UICC without being connected physically to the UICC. As an example, an OTA gateway 280 can communicate with a Short Message Service Center (SMSC) 290 for delivering provisioning information to the communication device 210, as well as propagating information to other network elements. For instance, OTA gateway 280 can transform information (e.g., service requests, provisioning information, and so forth) into short messages which are provided to the SMSC 290 for delivery to the communication device 210. In one embodiment, the OTA gateway 280 receives service requests through a gateway API that indicates the actual UICC to modify, update, and/or activate. In one embodiment, the OTA gateway 280 can have a UICC database that indicates for each UICC, the vendor, a UICC identification number, the IMSI and the MSISDN. In one embodiment, the service request can be formatted by the OTA gateway 280 into a message that can be understood by the recipient UICC, such as through use of libraries accessible to (or stored by) the OTA gateway that contain the formats to use for each brand of UICC. The resulting formatted message can then be sent to the SMSC 290 for delivery.

The identity proxy function 250 can be a stand-alone device (e.g., positioned between the BSS and the MSC 240), or can be integrated with other components of the system 200 such as being executed by a server that also executes the MSC/VLR functions. In one or more embodiments, the identity proxy function 250 is configured so that information (e.g., a registration request) being sent to a registration function (e.g., the HLR 260) is intercepted or otherwise first received by the identity proxy function prior to being received by the MSC 240, the VLR 245 and the HLR 260. The particular positioning of the identity proxy function 250 with respect to other network elements can vary provided that the identity proxy function maintains its ability to manage use and re-use of IMSIs. In one embodiment, a single identity proxy function 250 can be utilized for a set of MSC/VLR and HLR.

In another embodiment, multiple identity proxy functions 250 can be utilized for each set of MSC/VLR and HLR, where the identity proxy functions are positioned at various points in the core network such as between the BSS and the MSC 240 and between the VLR 245 and the HLR 260 (shown as dashed lines in FIG. 2). In one embodiment where multiple identity proxy functions 250 are utilized, they can communicate with each other for implementing the management of the use and re-use of the IMSIs.

In one embodiment, an interface 255 can be established between the identity proxy function 250 and other network components, such as the HLR 260. For example, the interface 255 can enable the identity proxy function 250 to communicate directly with the HLR 260 so as to bypass communication with the VLR. For instance and as described herein, the identity proxy function 250 can simulate function(s) of the VLR 245 such as SRES comparison, and the interface 255 can enable obtaining data needed for the SRES comparison.

System 200 can also include an identity provisioning function 350 for providing information to various devices including the communication device 210, and network element(s). In one embodiment, the identity provisioning function 350 can maintain a listing of the designated IMSIs and can provision identity proxy functions throughout the network with this listing. The identity provisioning function 350 can be a separate device that is in communication with the identity proxy function 250. In one embodiment, the identity provisioning function 350 can provide for OTA provisioning of the communication device 210 via a registration simulation platform as described herein, as well as propagate other information to various network elements (e.g., communicating notices of reassigned IMSIs or other information to the HLR 260, the AUC 270 and/or the EIR 280). In one embodiment, the identity provisioning function 350 can be in communication with the OTA gateway 280 and can utilize the services of the SMSC 290 to provision communication devices. The functions performed by the identity proxy function 250 and the identity provisioning function 350 in managing IMSI reuse can vary. In one embodiment, the identity proxy function 250 can be utilized as a point of IMSI screening and further determinations as to what steps should be taken to manage the particular IMSI can be made by the identity provisioning function 350 based on a detection or screening message received by the identity provisioning function 350 from the identity proxy function 250. In other embodiments, the identity proxy function 250 can take a more active role in determinations of the appropriate steps to be taken to manage the particular IMSI.

Figure 3:
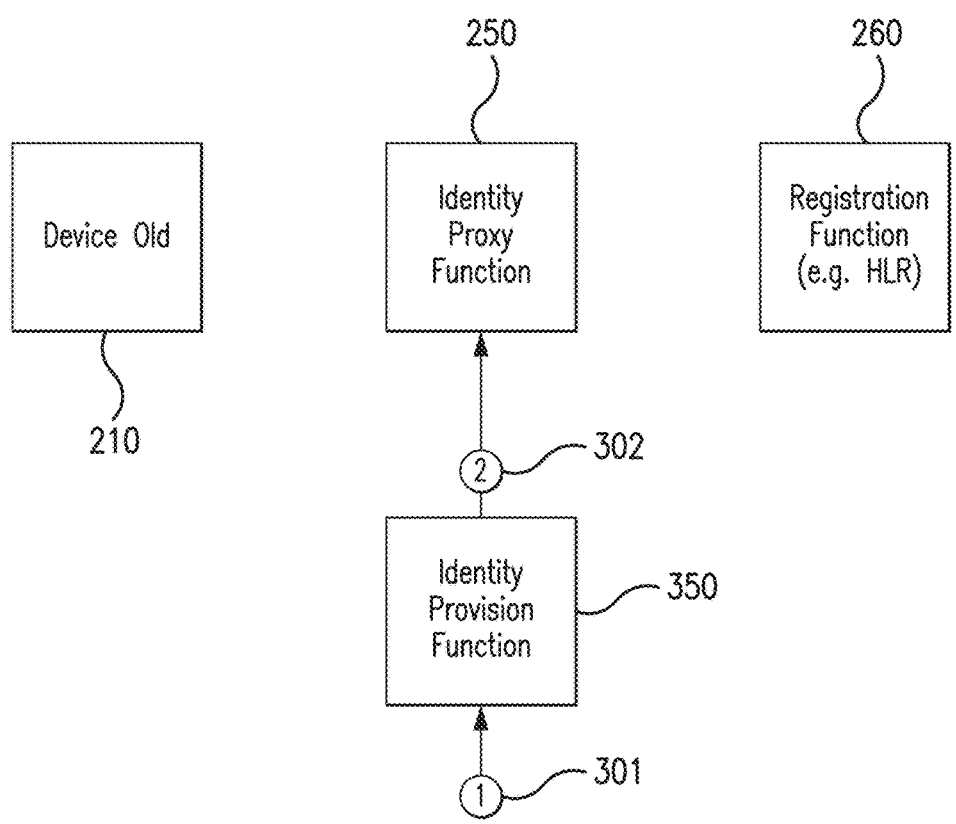
FIGS. 3-6 depict illustrative embodiments of registration processes used in portions of the system described in FIG. 1.

Referring to FIG. 3 which illustrates a portion of system 200 and may or may not include intermediate network components in the message exchange paths, the identity proxy function 250 can have access to a list of IMSIs that are designated for potential reassignment or as having already been reassigned to another communication device. For instance, the identity provisioning function 350 can maintain the listing of the designated IMSIs at 301 and can provision identity proxy functions throughout the network with this listing at 302. The listing of the designated IMSIs can be generated based on various criteria.

This provisioning information associated with the IMSIs can be utilized by the identity proxy function 250 to manage or otherwise facilitate registration by communication devices and reuse of IMSIs. For example, the identity proxy function 250 can determine that an IMSI is not included in the listing of the designated IMSIs in which case a registration request associated with that IMSI would be forwarded to the MSC 240 for completing a registration process.

As another example, the identity proxy function 250 can determine that an IMSI is included in the listing of the designated IMSIs but is not included in the subset of IMSIs that has already been reassigned in which case the identity proxy function 250 would know that an original device (which has been flagged as inactive) is attempting to register with the network. The identity proxy function 250 could then take appropriate steps for providing service to the original device, such as causing (e.g., via the identity provisioning function 350) reauthorizing use of the IMSI if services are now authorized (e.g., payment of services has been received) or causing the providing of nullification information to the original device (e.g., via the identity provisioning function 350, a registration simulation platform, the OTA 280 and/or the SMSC 290) to further cause use of the IMSI at the original device to be disabled if services are not authorized or the device/UICC are not compatible with current network service. In one or more embodiments, the identity proxy function 250 can provide a notice to the identity provisioning function of detection of a particular IMSI and the identity provisioning function 350 can then take appropriate steps for managing the reuse of IMSIs.

As another example, the identity proxy function 250 can determine that an IMSI is included in the listing of the designated IMSIs and is also included in the subset of IMSIs (which have already been reassigned). Responsive to these determinations, a further determination can be made as to whether the device is the original device associated with the IMSI prior to the reassignment or whether the device is the new device that has been reassigned the IMSI. The identity proxy function 250 and/or the identity provisioning function 350 could then take appropriate steps for allowing registration of the new device that has been reassigned the IMSI or for providing service to the original device. For instance, another IMSI can be reassigned (e.g., via the identity provisioning function 350) to the original device from the listing of designated IMSIs (which has not already been reassigned) if services are now authorized (e.g., payment of services has been received). In another embodiment, nullification information can be provided to the original device (e.g., via the identity provisioning function 350) to cause use of the original IMSI at the original device to be disabled, such as where another IMSI is to be reassigned to the original device.

In one embodiment, IMSIs can be designated for potential re-use due to suspension of services for a subscriber such as for non-payment or for another reason. In one embodiment, IMSIs can be designated for potential re-use due to a lack of use of the IMSI (or the device having a UICC that utilizes the IMSI) for a threshold time period, such as a mobile phone that has not attempted to register with a network (e.g., the GSM network or some other network including LTE or UMTS) in six months. In one embodiment, IMSIs can be designated for potential re-use according to a confirmation that the UICC has been damaged, lost, stolen and so forth. In one or more embodiments as the IMSIs are reassigned to other devices, those particular IMSIs can be further flagged as having been reassigned (i.e., flagged as a subset of the list of designated IMSIs). The identity provisioning function 350 can keep the identity proxy function 250 (as well as other identity proxy functions throughout the network) apprised of the list of designated IMSIs as well as the subset of those IMSIs that have already been reassigned to another communication device so that the identity proxy function 250 can accurately perform an IMSI screening process when registration requests are received.

Figure 4:
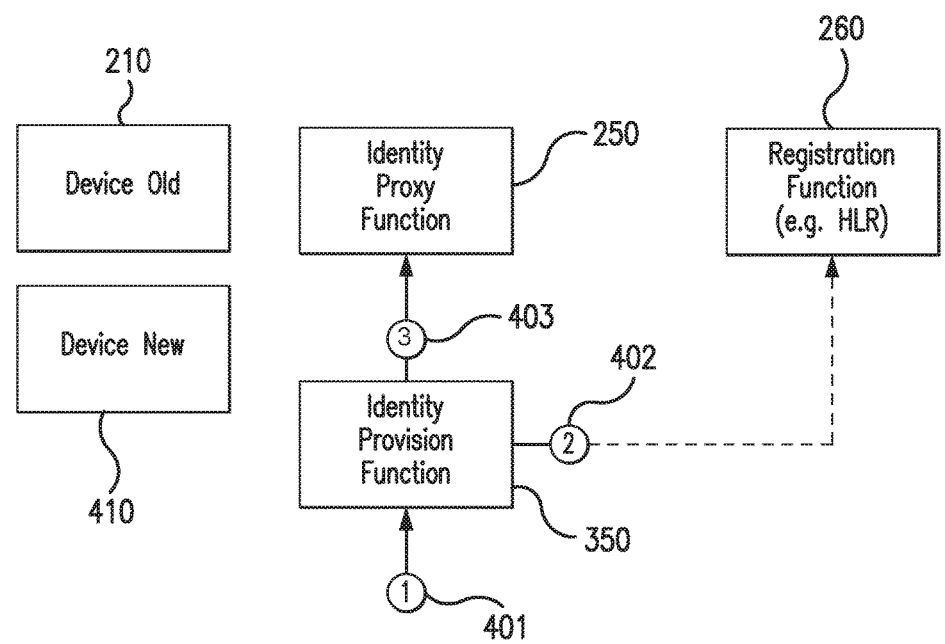

Referring to FIG. 4 which illustrates a portion of system 200 and may or may not include intermediate network components in the message exchange paths, another communication device 410 can be reassigned an IMSI from the designated IMSIs where the IMSI was previously associated with the communication device 210 (which has been flagged as inactive). In this example at 401, the identity provisioning function 350 can receive a request, be instructed or otherwise determine that the IMSI (in the list of designated IMSIs) is to be reassigned to the communication device 410. The communication device 410 can be a new device that needs an IMSI to provide communication services or an existing device that requires another IMSI due to some other reason, such as having its own IMSI reassigned to a different device.

At 402, the identity provisioning function 350 can notify the HLR 260 that the communication device 410 is now associated with the particular reassigned IMSI. This can include deleting an original IMSI assignment for the communication device 410 and/or adding the new IMSI assignment for the communication device 410 in the database of the HLR 260. In one embodiment, this notification can cause the HLR 260 to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth.

At 403, the identity provisioning function 350 can notify the identity proxy function 250 that the communication device 410 is now associated with the particular reassigned IMSI. In one embodiment, the identity proxy function 250 can already be aware that the IMSI is part of a group of IMSIs designated for potential reassignment and can already be aware that the communication device 210 has been flagged as inactive. In this example, the identity proxy function 250 can switch a designation of the particular IMSI to being flagged as within the subset of the designated IMSIs that have already been reassigned to another device (i.e., the communication device 410 in this example).

Figure 5:
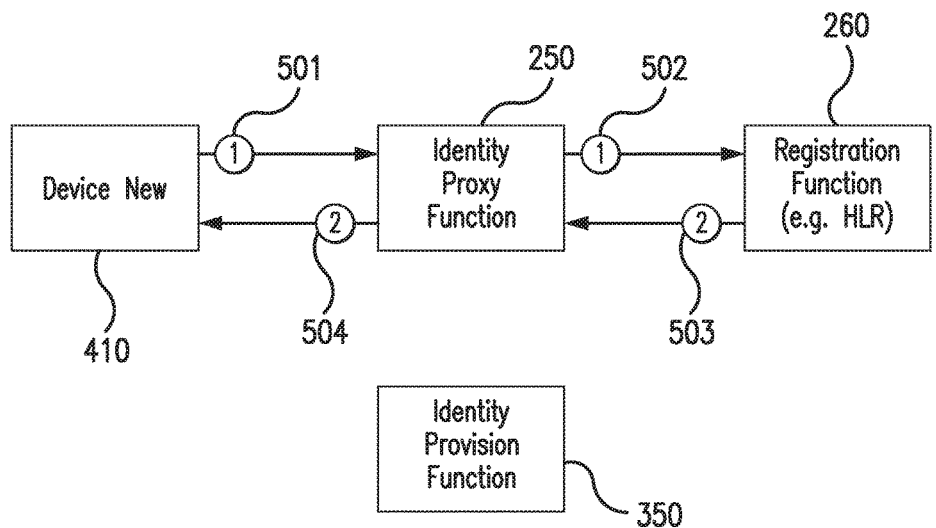

Referring to FIG. 5 which illustrates a portion of system 200 and may or may not include intermediate network components in the message exchange paths, the identity proxy function 250 facilitates registration of devices that have been reassigned IMSIs by intercepting or otherwise receiving registration requests, such as prior to the registration request being provided to the MSC 240, the VLR 245 and the HLR 260. For example at 501, the communication device 410 (which has been reassigned an IMSI from the listing of designated IMSIs where the IMSI was previously associated with the communication device 210) can request registration with the network. A registration request including the reassigned IMSI can be received by the identity proxy function 250 which determines whether or not the particular IMSI is part of the group of designated IMSIs and whether a reassignment to another device has already occurred. In one embodiment, the identity proxy function 250 and/or the identity provisioning function 350 can identify the particular device requesting registration with the network. For instance, device identification information (e.g., an IMEI) can be obtained for the communication device 410, such as being received from device 410 or from another source.

At 502, if the received IMSI is determined as having already been reassigned to another device and if the communication device 410 is determined to be that other device then identity proxy function 250 can forward the registration request to the MSC/VLR (or another registration function server) for processing of the registration of the communication device 410. At 503 and 504, messaging associated with the registration process can be exchanged such as between the HLR 260, the VLR 245, the identity proxy function 250, and/or the communication device 410.

The particular messaging that makes up the registration request and the registration process can vary. In one embodiment, the communication device 410 can send a Channel Request message to the BSS on a Random Access Channel (RACH) and the BSS can respond on an Access Grant Channel (AGCH) with an Immediate Assignment message while assigning a Stand Alone Dedicated Control Channel (SDCCH) to the communication device 410. The communication device 410 can switch to the assigned SDCCH and can send a Location Update Request to the BSS. The communication device 410 can send its IMSI to the BSS. The BSS can forward the Location Update Request/IMSI (i.e., a registration request) which is received or intercepted by the identity proxy function 250 which determines whether the received IMSI is already reassigned to another device and if the communication device 410 is that other device. If so, then the registration request is forwarded by the identity proxy function 250 to the MSC 240/VLR 245 which in turns forwards the registration request to the HLR 260, along with a request for verification of the IMSI and a request for authentication triplets (RAND, Kc, SRES). The HLR 260 can forward the IMSI to the AuC 270 and can request the authentication triplets. The AuC 270 can generate the authentication triplets and can send them, along with the IMSI, back to the HLR 260. The HLR 260 can validate the IMSI by ensuring it is allowed on the network and it is authorized for subscriber services. The HLR 260 can then forward the IMSI and the triplets to the VLR 245 which stores the SRES and the Kc, and can also forward the RAND to the BSS. The VLR 245 can utilize the BSS to authenticate the communication device 410. The BSS can send the communication device 410 an Authentication Request message with the only authentication parameter being sent in the message being the RAND. The communication device 410 can use the RAND to calculate the SRES and can send the SRES back to the BSS on the SDCCH in an Authentication Response. The BSS can forward the SRES to the VLR 245 which compares the SRES generated by the AuC with the SRES generated by the communication device. If the SRESs match then authentication is completed successfully. The exemplary embodiments can also utilize other messaging techniques and paths for registration of the communication device 410.

In one embodiment, the VLR 245 can forward the Kc for the communication device 410 to the BSS where the Kc is not sent across the air interface to the communication device. The BSS can store the Kc and can forward a Set Cipher Mode command to the communication device 410 where the command only indicates which encryption to use.

The communication device 410 can switch to cipher mode using the particular encryption algorithm (e.g., A5) so that all transmissions are now enciphered and can send a Ciphering Mode Complete message to the BSS. The VLR 245 can send a Location Updating Accept message to the BSS and also generate a new Temporary Mobile Subscriber Identity (TMSI) for the communication device. The BSS can send the TMSI to the communication device 410 which can respond with a TMSI Reallocation Complete message that is forwarded to the VLR 245. The BSS can instruct the communication device 245 to go into idle mode by sending it a Channel Release message and can then deassign the SDCCH. The VLR 245 can send an Update Location message to the HLR 260 which records the particular MSC/VLR the communication device is currently associated with.

In one embodiment such as where the identity proxy function 250 is unable to obtain device identity information (e.g., the IMEI) for the communication device 410, the identity proxy function 250 can simulate the registration process to obtain information that enables discerning whether the communication device 410 is the device that has been reassigned the IMSI or is the original device that was previously associated with the IMSI prior to the reassignment. As an example, the identity proxy function 250 can simulate the registration process so as to obtain an SRES generated by the communication device 410. From that generated SRES, the identity proxy function 250 can detect whether the communication device 410 is the device that has been reassigned the IMSI or is the original device that was previously associated with the IMSI prior to the reassignment. In this example, the identity proxy function 250 can communicate with other necessary components for obtaining data that is utilized in the registration process such as bypassing the VLR 245 and communicating via the interface 255 with the HLR 260 to obtain the authentication triplets. In this example, since the identity proxy function 250 requested the authentication triplets, the HLR 260 will obtain them from the AuC 270 and provide them back to the identity proxy function rather than providing them to the VLR 245. In one embodiment, the simulation of the registration process and the forcing of an SRES generation by the communication device 410 can be utilized to identify the particular device according to a secret key (in combination with the RAND provided by the identity proxy function 250) that the communication device would utilize in generating the SRES. The secret keys can be known or otherwise accessible to the identity proxy function 250 so that the secret key could be utilized to detect which device is generating the registration request. As an example, the secret key can be used during multiple cryptographic operations which can include the authentication of the device (e.g., in all networks) and the network (e.g., in UMTS and LTE).

In one embodiment, rather than utilizing the interface 255, system 200 can utilize first and second identity proxy functions 250 that are positioned between the communication device 210 and the MSC 240 and positioned between the VLR 245 and the HLR 260, respectively. The first and second identity proxy functions 250 can communicate with each other, such as to bypass the VLR 245 when the identity proxy functions 250 are simulating a registration process and forcing the communication device 410 to generate an SRES. In one embodiment, once the identity proxy function 250 has determined the identity of the device (original device vs. new device), the identity proxy function 250 can require that the communication device perform a re-registration.

Figure 6:
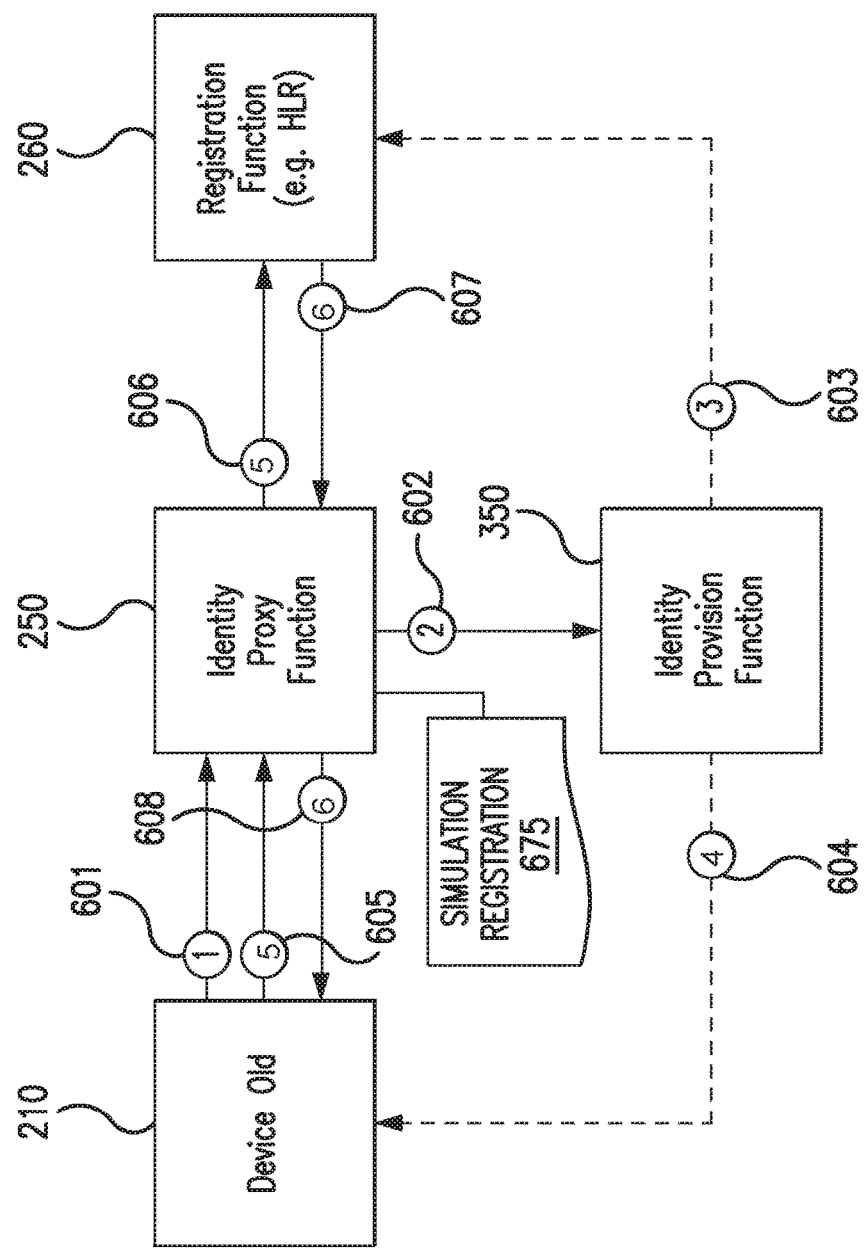

Referring to FIG. 6 which illustrates a portion of system 200 and may or may not include intermediate network components in the message exchange paths, the identity proxy function 250 facilitates registration of devices where the particular IMSI has been designated for potential reassignment or has already been reassigned by intercepting or otherwise receiving registration requests, such as prior to the registration request being provided to the MSC 240, the VLR 245 and the HLR 260. For example at 601, the original device 210 can request registration with the network. The original device 210 may have been flagged as inactive, such as for non-use over a threshold period of time, suspension of services for non-payment, a customer requesting discontinuation of services, and so forth. A registration request including the IMSI can be received by the identity proxy function 250 which determines whether or not the particular IMSI is part of the group of designated IMSIs and whether a reassignment has already occurred. In one embodiment, the identity proxy function 250 can identify the particular device requesting registration with the network. For example, device identification information (e.g., an IMEI) can be obtained for the original device 210, such as being received from device 210 (e.g., in the registration request). As another example, if the IMSI has not been reassigned but is part of the IMSIs designated for potential reassignment then the identity proxy function 250 can determine that the device requesting registration is the original device 210 that has been flagged as inactive. The identification of the device can be based on simulating the registration process and forcing a generation of an SRES by the communication device 210, as described herein.

In one embodiment, the identity proxy function 250 and/or the identity provisioning function 350 can determine whether the original device 210 is eligible for services. If the original device 210 is not eligible for services (e.g., suspension of services for non-payment or other reasons, device/UICC is no longer compatible with network or services, and so forth) then the identity proxy function 250 can cause or otherwise facilitate or enable provisioning information to be provided (e.g., via the identity provisioning function 350) to the original device 210 to cause the original device to disable its use of the IMSI. In this example, the IMSI can then be removed from the designated listing of IMSIs and can instead be included with other IMSIs (e.g., that have never been used before) that are eligible for assignment.

In one embodiment, if the IMSI has not yet been reassigned then the identity proxy function 250 and/or the identity provisioning function 350 can determine whether to allow the original device 210 to utilize that original IMSI, such as confirming that the subscriber is eligible for services (e.g., based on payment for services or other actions that removed a suspension of services). If the original device 210 is permitted to utilize its IMSI, then identity proxy function 250 can forward the registration request (based on the original IMSI) to the MSC 240/VLR 245 and can provide a notification (e.g., to the identity provisioning function 350) to remove the IMSI from the listing of designated IMSIs and to further adjust the status of the original device 210 from an inactive status to an active status.

In one embodiment, if the IMSI has already been reassigned to another device then the identity proxy function 250 and/or the identity provisioning function 350 can confirm that the subscriber of the original device 210 is eligible for services and can obtain reassignment of another IMSI (from the designated list of IMSIs) for the original device. For example at 602, responsive to a determination that the IMSI has already been reassigned to another device and a determination that the subscriber of the original device 210 is eligible for services then the identity proxy function 250 can provide a request to the identity provisioning function 350 for another IMSI from the listing of designated IMSIs (which is not in the subset of IMSIs that has already been reassigned) or the identity proxy function 250 can receive the other IMSI from the identity provisioning function 350 based on a determination made by the identity provisioning function 350. In one embodiment, the original device 210 can continue to utilize its original secret key (which is mapped to the original device by the network). In one embodiment, the determination of eligibility for services can be made by the identity provisioning function 350 such that the identity proxy function 250 transmits the request to the identity provisioning function 350 for another IMSI responsive to a determination that the IMSI has already been reassigned to another device and the identity provisioning function 350 can approve or deny the request.

Continuing with this example at 603, the identity provisioning function 350 can notify various network elements (e.g., the HLR 260) that the communication device 210 is now associated with the particular reassigned IMSI. This can include the HLR 260 deleting an original IMSI assignment for the communication device 210 and/or adding the new IMSI assignment for the communication device 210 in its database. In one embodiment, this notification can cause the HLR to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth.

At 604, the identity provisioning function 350 can provide provisioning information to the communication device 210 via an OTA platform that causes the UICC to be adjusted so that the reassigned IMSI is now utilized by the device for communication services. In one embodiment, to send an OTA provisioning message to a device that has not completed registration to a target network, a simulating network can be used to intercept (e.g., prior to being received by a VLR in GSM or an MME in LTE) and complete the registration. The simulating network can send an OTA message to the device that can cause the modification of the device IMSI and can cause the device to perform a re-registration to the target network. For example, the simulating network can comprise a set of functional elements (e.g., registration simulation platform 675) that exist in the target network. This can include an MSC/VLR, a MME, a HLR or HSS, an AUC, a SMSC, an OTA platform, a SGW, a PGW, an EIR and/or any combination thereof. The AUC of registration simulation platform 675 can contain the secret key of the device and the HSS/HLR can be provisioned to allow the device to register. Other pre-provisioning functions can be performed. For instance, the registration simulation platform 675 can be integrated into the identity proxy function 250 (illustrated in FIG. 6), the identity provisioning function 350 and/or can exist as a standalone device. In one embodiment, the identity provisioning function 350 can become aware of the registration to the registration simulation platform 675 by notification from the registration simulation platform 675 and/or from the identity proxy function 250. In this example, the identity provisioning function 350 can instruct the registration simulation platform 675 to perform an OTA to modify an IMSI of that particular device. The identity provisioning function 350 may provide an update to the identity proxy function 250 regarding the content of the requested OTA. In one embodiment, the identity proxy function 350 can first detect an error message, then perform an action such as not forwarding the error to the device to cause the device to reattempt the registration, and finally intercept the reattempt and forward to the registration simulation platform 675.

In another embodiment, the identity provisioning function 350 can provide provisioning information to the communication device 210 via the OTA 280 and the SMSC 290 that causes the UICC to be adjusted so that the reassigned IMSI is now utilized by the device for communication services. In another embodiment at 605, the communication device 210 can then attempt to re-register utilizing the reassigned IMSI. The identity proxy function 250 can receive the registration request for the communication device 210, which now includes the reassigned IMSI and at 606-608 the registration process (via the VLR 245 and the HLR 260) can be completed based on the reassigned IMSI. In one or more embodiments, the identity provisioning function 350 can provision a National SIM Manager (NSM) with the reassigned IMSI for the original device where the secret key of the original device is already known. In another embodiment, the identity provisioning function 350 can be integrated with equipment of the NSM. In one embodiment, a billing system can detect the change in IMSI for the UICC and can provision some or all other network elements necessary for enabling call processing (e.g., HLR 260, AUC 270).

Figure 7:
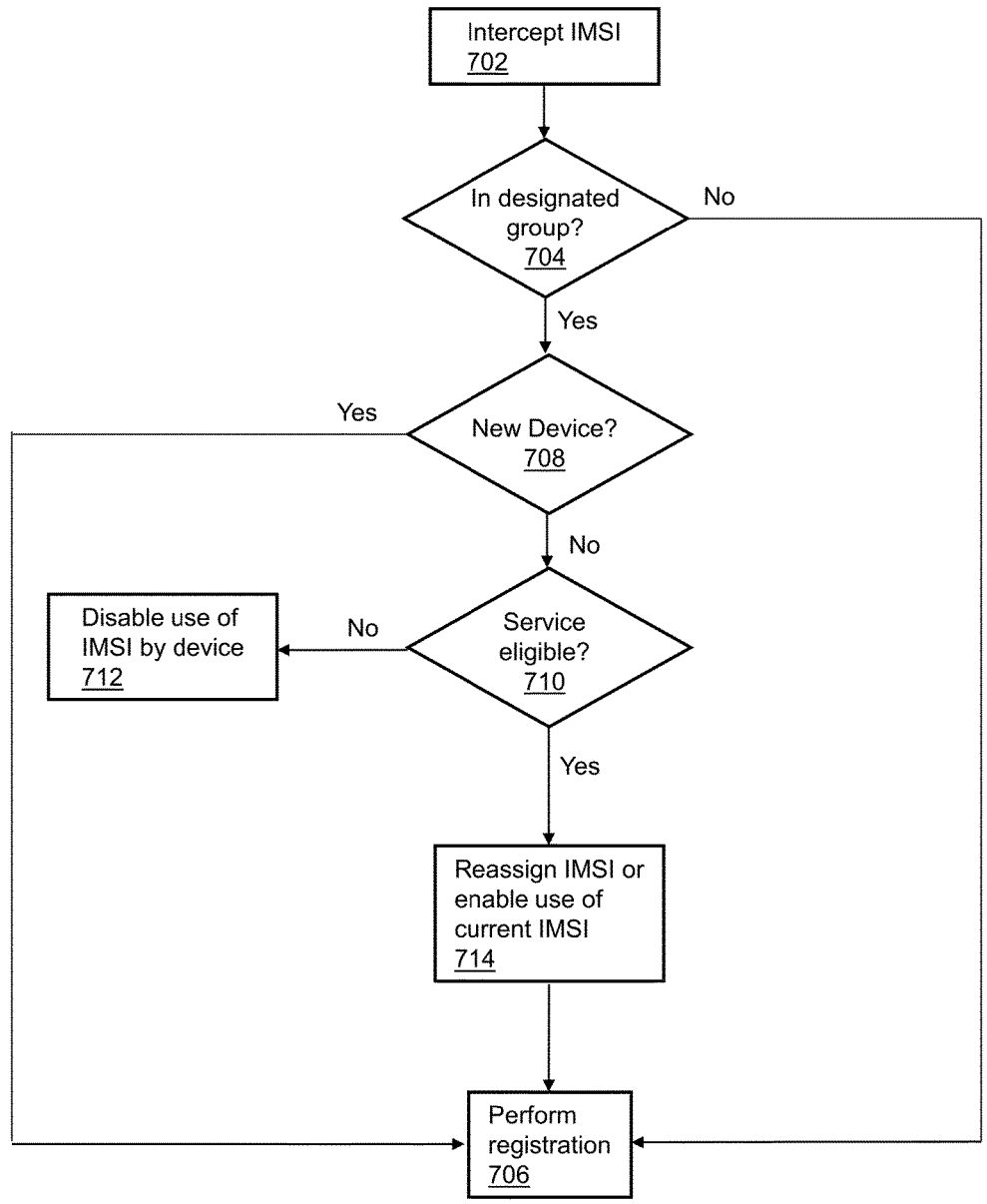
FIG. 7 depicts an illustrative embodiment of a method that provides communication services and enables re-using mobile Subscriber Identification Information by other devices.

FIG. 7 depicts an illustrative embodiment of a method 700 used by system 200 for facilitating the re-use of IMSIs. One or more of the steps of method 700 can be performed by the identity proxy function 250, the identity provisioning function 350 and/or by other devices described in FIGS. 2-6. At 702, an IMSI can be received that is associated with a communication device. For instance, the IMSI can be part of a registration request that is generated by or caused to be generated by the communication device. At 704, a determination of the status of the IMSI can be made. For example, the identity proxy function 250 can determine whether the IMSI is included in a designated group of IMSIs and if so can further determine whether the IMSI is included in a subset of the group which is further designated as having already been reassigned to another communication device. If the IMSI is not part of the designated group of IMSIs then the registration process can be continued by forwarding the registration request and/or IMSI to the MSC 240/VLR 245 to perform the registration at 706. If on the other hand the IMSI is part of the designated group of IMSIs then a determination can be made at 708 as to whether the registration request is for an original device that was associated with the IMSI (e.g., prior to being reassigned) or whether the registration request is for a new device that has been reassigned the IMSI. The identification of the particular device can be performed in a number of different ways, such as based on device identification information (e.g., IMEI), simulating a registration process to force an SRES generation by the device from which the device identification can be determined, and so forth.

If the registration request and the IMSI are from a new device that has been reassigned the IMSI then the registration process can be continued by forwarding the registration request and/or IMSI to the MSC 240/VLR 245 to perform the registration at 706. If on the other hand the registration request and the IMSI are from an original device (e.g., a device that the IMSI was previously associated with prior to being added to the listing of designated IMSIs) then a determination can be made at 710 as to whether the subscriber of the original device is eligible for communication services. Eligibility for services can be based on various factors and can be determined by various components or a combination of components, such as based on billing, device hardware requirements, device software requirements, and so forth. If the subscriber of the original device is not eligible for communication services then at 712 provisioning information can be provided to the original device (e.g., via OTA provisioning by the identity provisioning function 350 such as through use of registration simulation platform 675) that causes disabling the use of the particular IMSI by the original device. In one embodiment, if the IMSI has not already been reassigned then it can be removed from the listing of designated IMSIs and provided to another communication device (e.g., the identity proxy function 250 can forward the IMSI automatically to the MSC240/VLR 245 for completion of registration associated with a new device that utilizes the IMSI).

If on the other hand the subscriber of the original device is eligible for communication services then at 714 the original device can be authorized to utilize the particular IMSI (e.g., if it is determined that the particular IMSI has not yet been reassigned) or the original device can be provisioned with another IMSI (e.g., if it is determined that the original IMSI has already been reassigned to another device). In one embodiment, the new IMSI reassigned to the original device can be selected from the listing of designated IMSI (which is not included in the subset of IMSIs that has already been reassigned). Method 700 can then proceed to 706 where the registration process is completed.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, eligibility for services can be determined according to a viability of the UICC. For example, if it is determined that the UICC is no longer compatible with the network (e.g., it cannot perform certain functions requested by the network or cannot facilitate certain communication services) then the device/UICC can be designated as being ineligible for service and provisioning information can be sent to the device (e.g., via registration simulation platform 675) to nullify or otherwise disable use of the IMSI by that device/UICC. In one embodiment, if it is determined that the UICC is not viable or otherwise is incompatible with the network then the subscriber of the original device can be provided with a request to upgrade the UICC (which may or may not utilize the same IMSI), such as forwarding a message including an offer to the original device. In this example, the IMSI can be removed from the listing of designated IMSIs. One or more of the determinations described with respect to any of the exemplary embodiments can be made by the identity proxy function 250, the identity provisioning function 350, or another network device.

Figure 8:
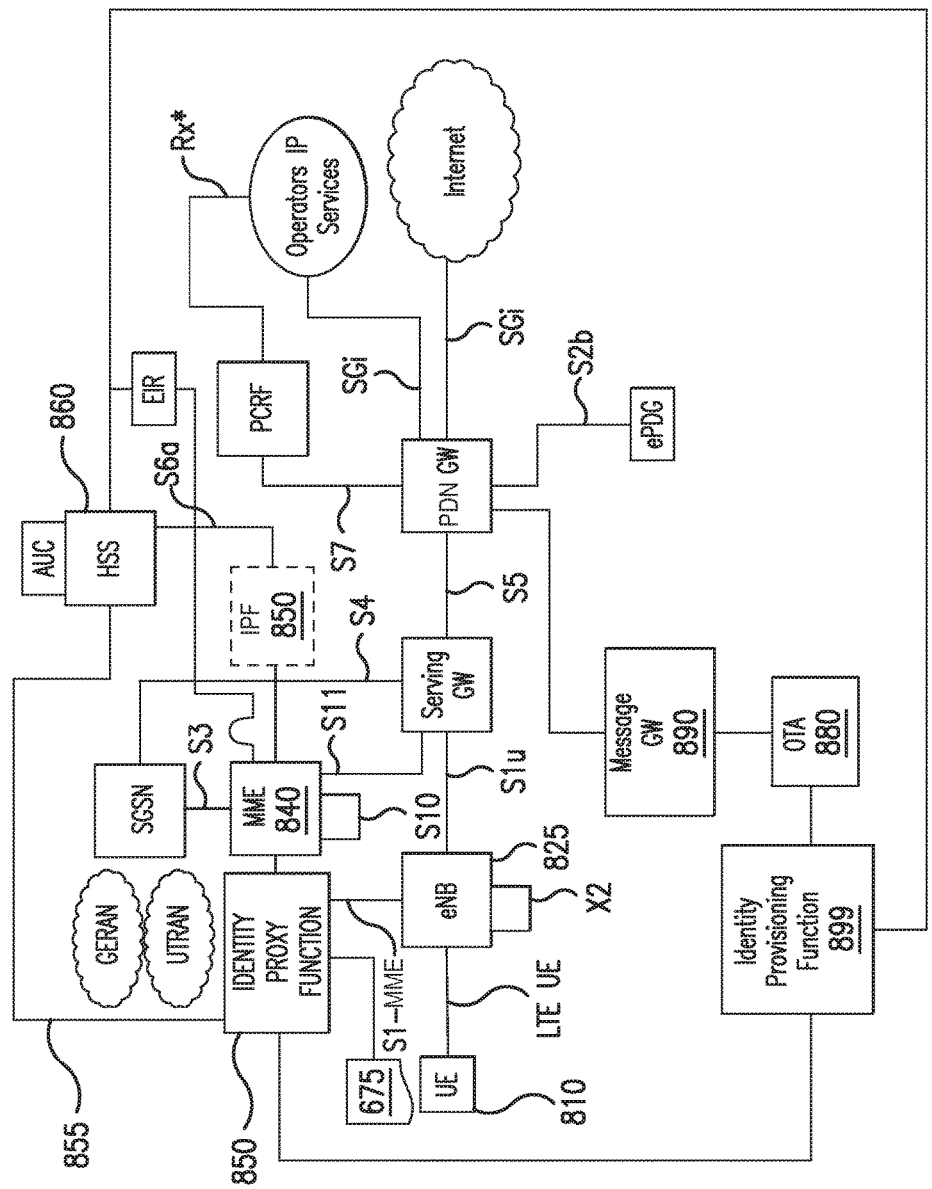
FIG. 8 depicts another illustrative embodiment of a system that provides communication services and enables re-using mobile Subscriber Identification Information by other devices.

FIG. 8 depicts an illustrative embodiment of a communication system 800 (e.g., a Long Term Evolution (LTE) system) that provides communication services such as to a communication device 810. The communication device 810 can be various types of devices such as a mobile phone or other devices that utilize an IMSI for establishing communication services. The types of communication services can vary including voice services, video, data and/or messaging. System 800 enables IMSI re-use by the same or other communication devices through use of an identity proxy function 850 and an identity provisioning function 899. System 800 can perform many of the same functions as described with respect to system 200 including intercepting a registration request with an IMSI, determining an identity of a device requesting registration, processing registration requests according to whether the IMSI is a designated IMSI and whether the IMSI has already been reassigned to another device, reassigning an IMSI to an original device that has come back online, reauthorizing use of an original IMSI for an original device that has returned to being service eligible, and so forth.

System 800 can utilize the identity proxy function 850 to perform functions similar to those described with respect to the identity proxy function 250 of system 200 for facilitating the re-use of IMSIs. System 800 can include various components that facilitate providing the communication services, including an eNodeB (eNB) 825 that functions as hardware that communicates directly wirelessly with mobile handsets similar to the BSS of the GSM network of system 200, a Mobility Management Entity (MME) 840 that functions as a control-node for the LTE access-network, and a Home Subscriber Server (HSS) 860 that functions as a central database to contain user-related and subscription-related information and which provides user authentication and access authorization functionality. The HSS 860 is similar to the HLR 260 and AUC 270 of the GSM network of system 200. Other components can also be included in the system 800 such as an EIR, S-GW, PDN GW, ePDG, SGSN and so forth.

In one or more embodiments, the identity proxy function 850 can be positioned between the eNB 825 and the MME 840 so that the IMSI is received by the identity proxy function 850 prior to being processed by the MME 840. In one embodiment, an interface 855 can be established between the identity proxy function 850 and other network components, such as the HSS 860. For example, the interface 855 can enable the identity proxy function 850 to communicate directly with the HSS 860 so as to bypass communication with the MME 840. For instance and as described herein, the identity proxy function 850 can simulate function(s) of the MME 840 such as RES comparison and the interface 855 can enable obtaining data needed for the RES comparison.

System 800 can utilize an identity provisioning function 899 for provisioning information to the communication device 810, such as a reassigned IMSI, nullification information that disables the use of an old IMSI at an original device, an offer to obtain a reassigned IMSI, and so forth. In one embodiment, identity provisioning function 899 can also propagate other information to other network elements, such as notifications that an IMSI from the listing of designated IMSIs has been reassigned or has been removed from the IMSI, an inactive or active status change for a device, and so forth to various network elements such as the HSS 860, the EIR, and so forth. The provisioning or propagation of information to the communication device 810 can be performed in a number of different ways, including utilizing a registration simulation platform (e.g., performing function similar to that of registration simulation platform 675 in FIG. 6), an OTA gateway 880 and/or a messaging gateway 890. The functions performed by the identity proxy function 850 and the identity provisioning function 899 in managing IMSI reuse can vary. In one embodiment, the identity proxy function 850 can be utilized as a point of IMSI screening and further determinations as to what steps should be taken to manage the particular IMSI can be made by the identity provisioning function 899 based on a detection or screening message received by the identity provisioning function 899 from the identity proxy function 850. In other embodiments, the identity proxy function 850 can take a more active role in determinations of the appropriate steps to be taken to manage the particular IMSI.

In one embodiment, the HSS 860 can be provisioned with reassigned IMSIs to facilitate the registration of a new device that has received a reassigned IMSI from an original device. In one embodiment, the identity proxy function 850 can simulate a registration process to force the communication device 810 to generate a RES (similar to the process described with respect to FIG. 5) so that the identity proxy function 850 can determine whether the device requesting registration is an original device or a new device.

In one embodiment, the identity proxy function 850 can obtain an IMSI of the communication device 810 attempting to register and can determine the identity of that device. Based upon the IMSI and the identity of the communication device 810, a determination can be made (e.g., by the identity proxy function 850 and/or the identity provisioning function 899) whether to allow the registration to proceed (to the MME 840), reassign an IMSI to the communication device, provide provisioning information that disables use of the IMSI by the communication device and/or take other appropriate actions to facilitate managing use and reuse of IMSI.

For example, the communication device 810 can initiate an attach procedure by transmitting an attach request to the eNB 825 so that the eNB can derive the appropriate MME from the Radio Resource Control (RRC) parameters carrying the old Globally Unique Mobility Management Entity Identifier (GUMMEI) and the indicated Selected Network. The attach request (i.e., registration request) can be received by the identity proxy function 850 (e.g., from the eNB 825). In one embodiment, the attach request can include a Globally Unique Temporary UE Identity (GUTI) which has the GUMMEI and also has the M-TMSI, which identifies the particular device. This identification allows the identity proxy function 850 to ascertain whether the particular device is a new device that has been reassigned the IMSI from the listing of designated IMSIs or is the original device that was previously associated with the IMSI prior to the reassignment. In this example, the identity proxy function 850 can obtain the IMSI in a number of different ways. For example, if the communication device 810 identifies itself with a GUTI, then the GUTI can be used to derive the old MME/SGSN address, and an Identification Request can be sent to the old MME/SGSN to request the IMSI. In another embodiment, the identity proxy function 850 can send an Identity Request to the communication device 810 to request the IMSI.

In one embodiment such as where the identity proxy function 850 is unable to obtain device identity information (e.g., the GUTI) for the communication device 810, the identity proxy function 850 can simulate the registration process of the MME 840 to obtain information that enables discerning whether the communication device 810 is a new device that has been reassigned the IMSI or is the original device that was previously associated with the IMSI prior to the reassignment. As an example, the identity proxy function 850 can simulate the registration process of the MME 840 so as to obtain a RES generated by the communication device 810 according to an EPS AKA algorithm. From that generated RES, the identity proxy function 850 can detect whether the communication device 810 is the new device that has been reassigned the IMSI or is the original device that was previously associated with the IMSI prior to the reassignment. In this example, the identity proxy function 850 can communicate with other necessary components for obtaining data that is utilized in the registration process (e.g. a mutual authentication process) such as bypassing the MME 840 and communicating via the interface 855 with the HSS 860 to obtain authentication vectors (e.g., RAND, AUTN, XRES, $K_{ASME}$). The HSS 860 generates authentication vector(s) using the EPS AKA algorithm and forwards them back to the identity proxy function 850. The identity proxy function 850 can select one of the authentication vectors (if more than one was received) and can use it to perform mutual authentication with the communication device 810 by forwarding the RAND and $AUTN_{HSS}$ to the communication device, which then computes RES, $AUTN_{UE}$ and $K_{ASME}$ using the EPS AKA algorithm. The communication device 810 can then compare its own $AUTN_{UE}$ and $AUTN_{HSS}$ received from the identity proxy function 850. Once authenticated, the communication device 810 can forward the RES to the identity proxy function 850, which can then determine from a comparison of the XRES received from the HSS 860 with the RES generated by the communication device whether the particular device is the original device or the new device since different RESs will be generated based on different secret keys (LTE K) stored at different UICCs. In this example, since the identity proxy function 850 requested the authentication vectors, the HSS 860 will provide them back to the identity proxy function via interface 855 rather than providing them to the MME 840.

In one embodiment, rather than utilizing the interface 855, system 800 can utilize first and second identity proxy functions 850 that are positioned between the communication device 810 and the MME 840 and positioned between the MME 840 and the HSS 260 (shown in dashed lines in FIG. 8), respectively. The first and second identity proxy functions 850 can communicate with each other, such as to bypass the MME 840 when the identity proxy functions 850 are simulating a registration process of the MME 840 and forcing the communication device 810 to generate a RES. In one embodiment, once the identity proxy function 850 has determined the identity of the device (original device vs. new device), the identity proxy function 850 can require that the communication device 810 perform a re-registration.

In one or more embodiments, system 800 enables receiving, by the identity proxy function 850, a registration request associated with the communication device 810 where the registration request includes an IMSI of the communication device. System 800 enables accessing, by the identity proxy function 850, information that identifies a group of IMSIs and that indicates a subset of the group of IMSIs that have been reassigned to other communication devices. Responsive to a first determination that the IMSI is not included in the group of IMSIs or a second determination that the IMSI is included in the subset of the group of IMSIs, system 800 enables providing, by the identity proxy function 850, the registration request to a registration function (e.g., the MME 840 and/or the HSS 860) for completing a registration process for the communication device which allows for communication services at the communication device. In one embodiment, system 800 enables receiving, by the identity proxy function 850, device identification data for the communication device 810. A third determination can then be performed as to whether the communication device 810 is one of the other communication devices that has received a reassignment of one of the subset of the group of international mobile subscriber identities, where the third determination is based on the device identification data, and where the providing the registration request to the registration function for completing the registration process is according to the third determination. In one embodiment, the device identification data comprises an IMEI. In one embodiment, the IMEI is obtained from the communication device 810. In one embodiment responsive to a third determination that the IMSI is included in the subset of the group of IMSIs and that the communication device 810 is not one of the other communication devices that has received a reassignment of one of the subset of the group of IMSIs, system 800 enables providing, via the identity provisioning function 899, the communication device with provisioning information. The provisioning information causes one of disabling use of the IMSI by the communication device, reassignment of another IMSI from the group of IMSIs that is not included in the subset of the group of IMSIs, or a combination thereof. In one embodiment, the system 800 enables receiving, by the identity proxy function 850, an IMEI from the communication device 810, wherein the third determination is based on the IMEI. In one embodiment responsive to a third determination that the communication device 810 is eligible for service, that the IMSI is included in the group of IMSIs, and that the IMSI is not included in the subset of the group of IMSIs, the system 800 enables removal of the IMSI from the group of IMSIs and further enables providing, by the identity proxy function 850, the registration request to the registration function for completing the registration process for the communication device. In one embodiment, system 800 enables determining a functionality of a universal integrated circuit card of the communication device 810 that stores the IMSI, where the removal of the IMSI from the group of IMSIs and the providing the registration request to the registration function are based on a fourth determination that the functionality of the universal integrated circuit card is compatible with the communication services associated with the communication device. In one embodiment, the identity proxy function 850 is a stand-alone server located between the eNB 825 and the MME 840, and the registration function is performed by the MME 840 utilizing services of the HSS 860. In one embodiment, the provisioning information can be provided to the communication device by the identity provisioning function via an OTA interface, where the OTA instructions go through the identity proxy function 850.

In one embodiment, the system 800 enables receiving, by the identity proxy function 850, a signed response message generated by the communication device 810 based on a random challenge; and performing, by the identity proxy function, a third determination that the communication device is one of the other communication devices that has received a reassignment of one of the subset of the group of IMSIs, where the third determination is based on the signed response message, and where the providing the registration request to the registration function for completing the registration process is according to the third determination. In one embodiment, the system 800 enables providing, by the identity proxy function 850, the random challenge to the communication device 810.

Figure 9:
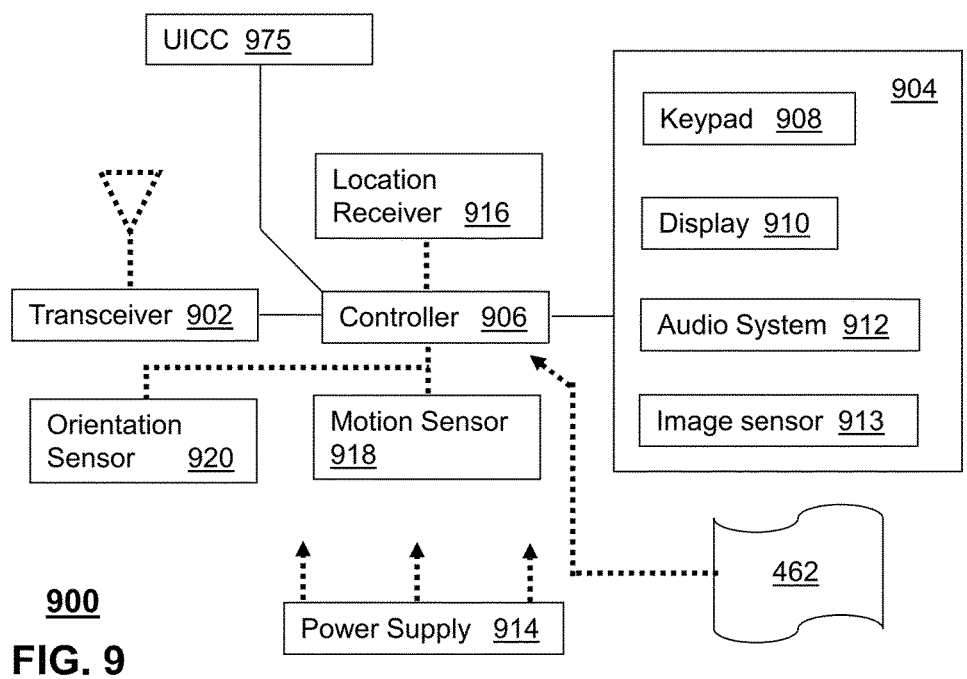
FIG. 9 depicts an illustrative embodiment of a communication device that can be utilized in either or both of the systems of FIGS. 2 and 8 and/or can be utilized during the method of FIG. 7.

FIG. 9 depicts an illustrative embodiment of a communication device 900. Communication device 900 can serve in whole or in part as an illustrative embodiment of the devices depicted in FIGS. 2-6 and 8 and can be configured to perform portions of method 700 of FIG. 7. Where communication device 900 is an end user device, it can include a UICC 975 that stores or otherwise manages use of an IMSI for registering the communication device. In one embodiment, the communication device 900 can be an end user device that performs operations including: providing a registration request that is received by an identity proxy function operating in a server, where the registration request includes a first IMSI of the communication device; responsive to a determination that the first IMSI has been reassigned to another communication device and that the communication device 900 is not the other communication device, receiving provisioning information that includes a second IMSI; and facilitating a registration process that utilizes the second IMSI and that enables communication services at the communication device. In one embodiment, the provisioning information includes disabling information that disables use of the first IMSI by the communication device 900, where the registration process utilizes a secret key that was previously associated with the first IMSI prior to the first IMSI being reassigned to the other communication device, and where the receiving of the provisioning information is responsive to determining that the communication device is eligible for the communication services.

In another embodiment, the communication device 900 can be a network device (e.g., a network server executing the identity proxy function 250, 850 and/or the identity provisioning function 350, 899) that performs operations including: receiving an IMSI of a communication device; accessing information that identifies a group of IMSIs and that indicates a subset of the group of IMSIs that have been reassigned to other communication devices; and, responsive to a first determination that the IMSI is included in the subset of the group of IMSIs and that the communication device is not one of the other communication devices that has received a reassignment of one of the subset of the group of IMSIs, providing the communication device with provisioning information that disables use of the IMSI by the communication device. In one embodiment, the communication device 900 can, responsive to determining that use of the IMSI by the communication device has been nullified, provide a notification to or otherwise perform a removal of the IMSI from the group of IMSIs. In one embodiment, the communication device 900 can, receive an IMEI from the communication device, where the first determination is based on the IMEI. In one embodiment, the communication device 900 can, perform a second determination that the communication device is not service eligible, where the providing the communication device with the provisioning information is responsive to the second determination. In one embodiment, the communication device 900 can, responsive to a second determination that the IMSI is included in the subset of the group of IMSIs and that the communication device is one of the other communication devices that has received a reassignment of one of the subset of the group of IMSIs, providing a registration request to a registration function for completing a registration process for the communication device that enables communication services at the communication device. In one embodiment, the provisioning information enables reassignment of another IMSI from the group of IMSIs that is not included in the subset of the group of IMSIs, and where the communication device 900 can provide a registration request to a registration function for completing a registration process for the communication device utilizing the other IMSI. In one embodiment, the registration process for the communication device utilizing the other IMSI is further based on a secret key that was previously associated with the IMSI prior to the reassignment of the other IMSI to the communication device.

Communication device 900 can include more or less than the components described herein. For example, communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing the UICC 975 (where it is not an embedded UICC). The UICC 975 can be various types of UICCs and can be a Subscriber Identity Module (SIM) card. The UICC 975 can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the devices of FIGS. 2-6 and 8 including communication devices 210, 410, 810, as well as the identity proxy functions 250, 850, the identity provisioning functions 350, 899 and other network components described herein. It will be appreciated that the communication device 900 can also represent other devices that can operate in systems 200 and 800. In addition, the controller 906 can be adapted in various embodiments to perform the functions 462 which enables management of the re-use of IMSIs.

Upon reviewing the aforementioned embodiments, it would be evident to an artisan with ordinary skill in the art that said embodiments can be modified, reduced, or enhanced without departing from the scope of the claims described below. For example, other factors can be utilized to determine whether an original device should receive an IMSI from the designated group of IMSIs (which has not yet been reassigned) or whether the original device should continue to utilize the original IMSI. For instance, even though the original IMSI may not yet have been reassigned, the service provider may desire to reassign another IMSI (from the designated IMSI to be reassigned) such as to facilitate categorizing devices and/or subscribers based on particular groupings of IMSIs.

The exemplary embodiments have been described with respect to GSM and LTE networks 200, 800, respectively. However, the exemplary embodiments can be utilized for managing use of IMSIs in various types of networks. For example in a Universal Mobile Telecommunications System (UMTS) network, IMSI management can be performed as described in the exemplary embodiments by intercepting a registration request utilizing an identity proxy function (e.g., positioned between the BSS and the Serving GPRS Support Node (SGSN)). In another example in a General Packet Radio Service (GPRS) network, IMSI management can be performed as described in the exemplary embodiments by intercepting a registration request utilizing an identity proxy function.

In one or more embodiments, other steps or procedures can be implemented when an original device that has been flagged as inactive attempts to register with the network. For example, when an original device whose original IMSI has been re-assigned to another device is detected during a registration request, the network can limit interaction of the original device with the network. For instance, the UICC of the original device can be forced to use a default or bootstrap IMSI which has limited functionality such as being limited to bootstrap functions (e.g., functions that enable communicating with the network for administrative reasons including obtaining a reassigned IMSI), a pay for service mode, and so forth. For instance, a pay for service mode can be implemented by the default IMSI by allowing registration that enables access to a webpage for selecting and paying for particular communication services, such as messaging, voice calls, and so forth. In one embodiment, the default IMSI can be stored by the UICC in addition to the original IMSI. In one embodiment, the provisioning information provided to the UICC can cause the UICC to utilize the default IMSI instead of the original IMSI. In another embodiment, the identity provisioning function 350, 899 can provision the default IMSI to the original device rather than provisioning an IMSI from the designated group of IMSIs. The default or bootstrap IMSI can differ from an original IMSI in that the original IMSI can be utilized by a device (e.g., a new device reassigned the original IMSI or the original device that is re-authorized to utilize the IMSI) for accessing a full range of available services whereas the default or bootstrap IMSI does not provide access to the full range of available services, although the default or bootstrap IMSI could provide access to a webpage for pay for service mode. In one embodiment, a same default or bootstrap IMSI can be utilized by numerous devices that have been flagged as inactive.

In one or more embodiments, the intercepting of the IMSI and determining whether to allow registration to continue by the identity proxy function 250, 850 prevents a failure or other error message from being generated and/or from being provided to the communication device which could have adverse effects on the communication device such as disabling OTA interface of the communication device.

In one or more embodiments, the identity proxy function 250, 850 can cache or otherwise store last successful registration processes for particular devices to utilize that information for determining whether a device requesting registration is an original device or a new device with a reassigned IMSI. In one embodiment, the device identification information (e.g., an IMEI) can be sourced by one or more other network elements. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
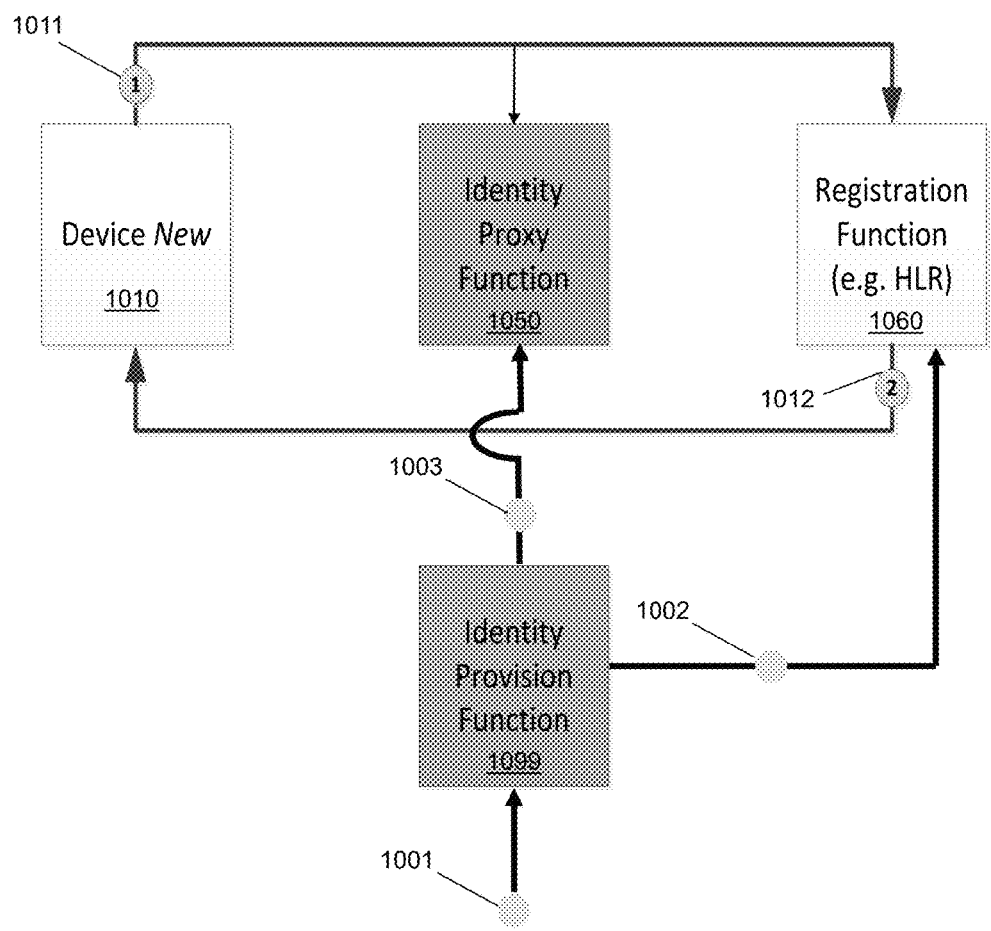
FIGS. 10-11 depict illustrative embodiments of systems that provide for reuse of mobile subscriber identification information based on registration error messages.

FIG. 10 illustrates a portion of a system 1000 that provides communication services to end user devices or other devices, such as communication device 1010. System 1000 can be part of or combined with all or a portion of system 200 of FIG. 2, system 800 of FIG. 8 or another network such as a GPRS or UMTS network. The communication device 1010 can be various types of devices such as a mobile phone or other devices that utilize an IMSI for establishing communication services. The types of communication services can vary including voice services, video, data and/or messaging. System 1000 enables IMSI re-use by the same or other communication devices through use of an identity proxy function 1050 (which can perform some or all of the functions described with respect to identity proxy functions 250, 850) and an identity provisioning function 1099 (which can perform some or all of the functions described with respect to identity proxy functions 350, 899). System 1000 provides for registration of communication devices through use of a registration function 1060, such as an MSC/VLR and/or HLR in a GSM network or an MME and/or HSS in an LTE network.

System 1000 may or may not include intermediate network components in the message exchange paths. In one embodiment, the communication device 1010 can be reassigned an IMSI from a listing of designated IMSIs where the IMSI was previously associated with a different communication device (e.g., which has been flagged as an inactive device). In this example at 1001, the identity provisioning function 1099 can receive a request, be instructed or otherwise determine that an IMSI (in a list of designated IMSIs) is to be reassigned to the communication device 1010. The communication device 1010 can be a new device that needs an IMSI to provide communication services or can be an existing device that requires another IMSI due to some other reason, such as having its own IMSI reassigned to a different device.

At 1002, the identity provisioning function 1099 can notify the registration function 1060 (e.g., the HLR 260 in system 200 of FIG. 2 or the HSS 860 in system 800 of FIG. 8) that the communication device 1010 is now associated with the particular reassigned IMSI. This can include deleting an original IMSI assignment for the communication device 1010 and/or adding the new IMSI assignment for the communication device 1010 in a database, such as of the HLR 260 or the HSS 860. In one embodiment, this notification can cause the HLR 260 or HSS 860 to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth. By notifying the registration function 1060 that the communication device 1010 is now associated with the particular reassigned IMSI, the communication device 1010 can now successfully register with the network.

At 1003, the identity provisioning function 1099 can notify the identity proxy function 1050 that the communication device 1010 is now associated with the particular reassigned IMSI or can notify the identity proxy function that an IMSI in the listing of designated IMSIs has been moved to the subset of designated IMSIs due to reassignment to another device (with or without indicating the particular new device that has been reassigned the IMSI). In one embodiment, the identity proxy function 1050 can already be aware that the IMSI is part of the group of IMSIs designated for potential reassignment and can already be aware that an original communication device associated with the particular IMSI has been flagged as inactive. In this example, the identity proxy function 1050 can switch a designation of the particular IMSI to being flagged as within the subset of the designated IMSIs that have already been reassigned to another device (i.e., the communication device 1010 in this example).

System 1000 also illustrates a successful registration of communication device 1010 utilizing the reassigned IMSI from steps 1001-1003. For example at 1011, the communication device 1010 (which has been reassigned the IMSI) can request registration with the network. A registration request including the reassigned IMSI can be received by the registration function 1060 (e.g., an MSC/VLR in a GSM network or an MME in an LTE network). In one embodiment, the registration request can also be received by the identity proxy function 1050. For instance, the registration request can be intercepted or otherwise received by the identity proxy function 1050 and then forwarded to the registration function 1060. A registration process can be performed according to the reassigned IMSI and a secret key that is associated with the communication device 1010. The registration function 1060 can be aware of the secret key associated with the communication device 1010 and can be aware of the reassigned IMSI that is now associated with the communication device. The registration process can be similar to the processes described herein with respect to GSM or LTE networks, such as a comparison of SRES in GSM or a comparison of RES in LTE or a comparison of XRES in UMTS environment. At 1012, a successful registration can be communicated to the communication device 1010. The particular messaging that makes up the registration request and the registration process can vary.

Figure 11:
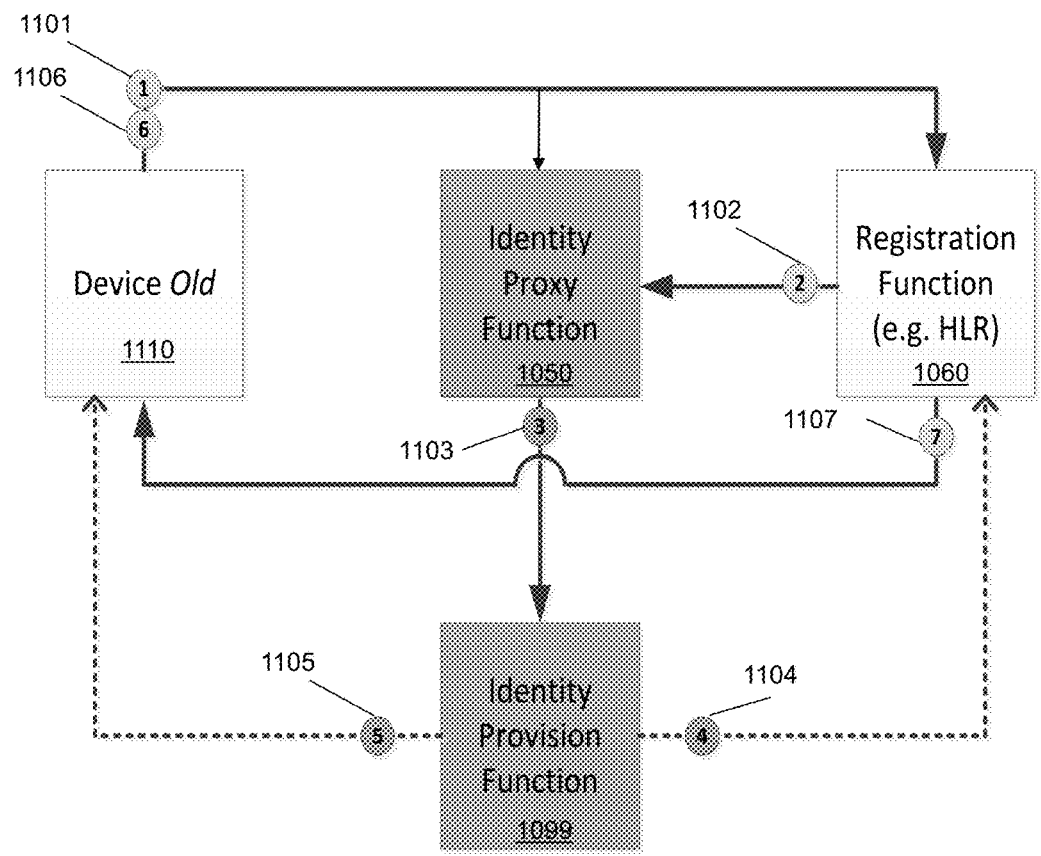

FIG. 11 illustrates a portion of a system 1100 that provides communication services to end user devices, such as communication device 1110. System 1100 can be part of or combined with all or a portion of system 200 of FIG. 2, system 800 of FIG. 8, system 1000 of FIG. 10 or another network such as a GPRS or UMTS network. The communication device 1110 can be various types of devices such as a mobile phone or other devices that utilize an IMSI for establishing communication services. The types of communication services can vary including voice services, video, data and/or messaging. System 1100 enables IMSI re-use by the same or other communication devices through use of an identity proxy function 1050 (which can perform some or all of the functions described with respect to identity proxy functions 250, 850) and an identity provisioning function 1099 (which can perform some or all of the functions described with respect to identity proxy functions 350, 899). System 1100 provides for registration of communication devices through use of a registration function 1060, such as an MSC/VLR and/or HLR in a GSM network or an MME and/or HSS in an LTE network.

System 1100 may or may not include intermediate network components in the message exchange paths. System 1100 illustrates an attempted registration by the communication device 1110 utilizing an IMSI that is included in the listing of designated IMSIs (e.g., where the communication device 1110 is an original device that has been flagged as inactive). For example at 1101, the communication device 1110 can request registration with the network. A registration request (e.g., including an original IMSI that is among the listing of designated IMSIs for reassignment or has already been reassigned to another device or an IMSI that is not on the designated list) can be received by the registration function 1060 (e.g., an MSC/VLR in a GSM network or an MME in an LTE network). In one embodiment, the registration request can also be received by the identity proxy function 1050. For instance, the registration request can be intercepted or otherwise received by the identity proxy function 1050 and then forwarded to the registration function 1060. A registration process can be performed according to the original IMSI and a secret key that is associated with the communication device 1110. The registration function 1060 can be aware of the secret key associated with the communication device 1110. The registration process can be similar to the processes described herein with respect to GSM or LTE networks, such as a comparison of SRES in GSM or a comparison of RES in LTE.

At 1102, a registration error can be generated by the registration function 1060 (e.g., an authentication failure message generated by the MSC/VLR and/or HLR in GSM or by the MME and/or HSS in LTE) and can be received by the identity proxy function 1050 from the registration function 1060. In this example, the identity proxy function 1050 can intercept the authentication error message prior to or otherwise to avoid it being received by the communication device 1110. The particular messaging that makes up the registration request, the registration process and/or the registration error can vary. In one embodiment, the identity proxy function 1050 can determine that the registration error is a valid failure for a device that should not be attempting to use the IMSI (such as a third device that is not the original device and is not a new device that has been reassigned the IMSI). For instance, an authentication failure can be received for a device that is not the original device and is not a new device that has been reassigned the IMSI. In this example, the identity proxy function 1050 can allow the error process (e.g., an authentication failure messaging) to proceed. In another embodiment at 1103, a request for reassignment of another IMSI from the listing of the designated IMSIs or authorization to utilize the original IMSI can be provided to the identity provisioning function 1099 from the identity proxy function 1050. For instance, the identity proxy function 1050 can (e.g., in response to receiving the error message) compare the original IMSI associated with communication device 1110 to the list of designated IMSIs and the subset of the designated IMSIs to determine the status of the original IMSI (reassigned vs not reassigned). The identity proxy function 1050 can further determine the identity of the communication device 1110 (original vs new device) based on device identification information (e.g., an IMEI, GUTI and so forth).

In one embodiment, where the error message does not include any device identification information and/or the IMSI, the identity proxy function 1050 can ascertain the device identification information and/or IMSI from the registration request that was previously received or intercepted. For instance, when the identity proxy function 1050 detects a registration error message (e.g., an AUTHENTICATION REJECT message from an MME), the identity proxy function 1050 can detect within the message addressing information, message ID information, correlation ID information, and so forth, and can further correlate the error message with the stored registration request previously intercepted. This enables the IMSI and/or device identification information (e.g., GUTI or IMEI) to be determined.

Continuing with this example and based on this information, reassignment of another IMSI from the listing of the designated IMSIs or authorization use of the original IMSI can be implemented. In one embodiment, the identity provisioning function 1099 can notify the HLR or HSS that the user is valid and the HLR or HSS can perform a database update to enable a subsequent registration utilizing the reassigned IMSI by the device. In this example, the identity proxy function 1050 can also take action, such as preventing forwarding of the failed registration to the device, to cause the device to reattempt the registration. In one embodiment, a determination of a subscriber's eligibility for services can be made. Eligibility for services can be based on various factors such as suspension of services for non-payment or other reasons, the device/UICC is no longer compatible with network or services, and so forth. In another embodiment, a determination of a compatibility of service with a UICC of the communication device 1110 can be made. One or both of these determinations can be part of deciding whether to reassign another IMSI from the listing of the designated IMSIs, to authorize use of the original IMSI, or to deny services to the communication device 1110. These determinations can be made by the identity provisioning function 1099 or can be made by another network element.

If it is determined that an IMSI from the listing of designated IMSIs (which has not yet been reassigned) is to be reassigned to the communication device 1110, then at 1104 provisioning information can be provided by the identity provisioning function 1099 to the registration function 1060 which will enable the communication device to register with the network utilizing the reassigned IMSI in conjunction with an original secret key that is associated with the communication device. In one embodiment, if it is determined that the communication device 1110 is to be permitted to reuse its original IMSI (where the original IMSI has not yet been reassigned to another device), then provisioning information can be provided by the identity provisioning function 1099 to the registration function 1060 which will enable the communication device to register with the network utilizing the original IMSI in conjunction with the original secret key that is associated with the communication device.

If it is determined that a reassigned IMSI is to be provisioned to the communication device 1110, then at 1104 provisioning information can be provided by the identity provisioning function 1099 to the communication device 1110 which will include the reassigned IMSI. As an example, the identity provisioning function 1099 can provide the reassigned IMSI to the communication device 1110 utilizing an OTA interface according to an SMS protocol such as through use of a registration simulation platform (e.g., performing function similar to that of registration simulation platform 675 in FIG. 6). In one embodiment, if it is determined that the communication device 1110 is not to be permitted to reuse its original IMSI (e.g., another IMSI is to be reassigned or the communication device 1110 is not eligible for services), then provisioning information can be provided by the identity provisioning function 1099 to the communication device 1110 to prevent the communication device from attempting to register with the network utilizing the original IMSI. In one embodiment, the identity provisioning function 1099 can further communicate with various network elements (e.g., the identity proxy function 1050, HLR, HSS, EIR, and so forth) so that the network elements are informed of the current state of IMSIs and/or communication devices. For example, if an original device is reassigned another IMSI or an original device is nullified from using the original IMSI via provisioning information then the identity provisioning function 1099 can remove the original IMSI (of that original device) from the listing of designated IMSIs. In these examples, the original IMSI can also then be assigned to another device (if not already reassigned).

At 1106 if another IMSI has been reassigned to the communication device 1110 or reuse of the original IMSI has been authorized, then the communication device 1110 can re-register. For example, the provisioning information provided by the identity provisioning function 1099 to the communication device 1110 can cause the communication device to initiate a re-registration. The re-registration request can be received and processed by the registration function 1060 and based on the provisioning procedures at steps 1104 and 1105, a successful registration message can be provided to the communication device 1110 at 1107.

Figure 12:
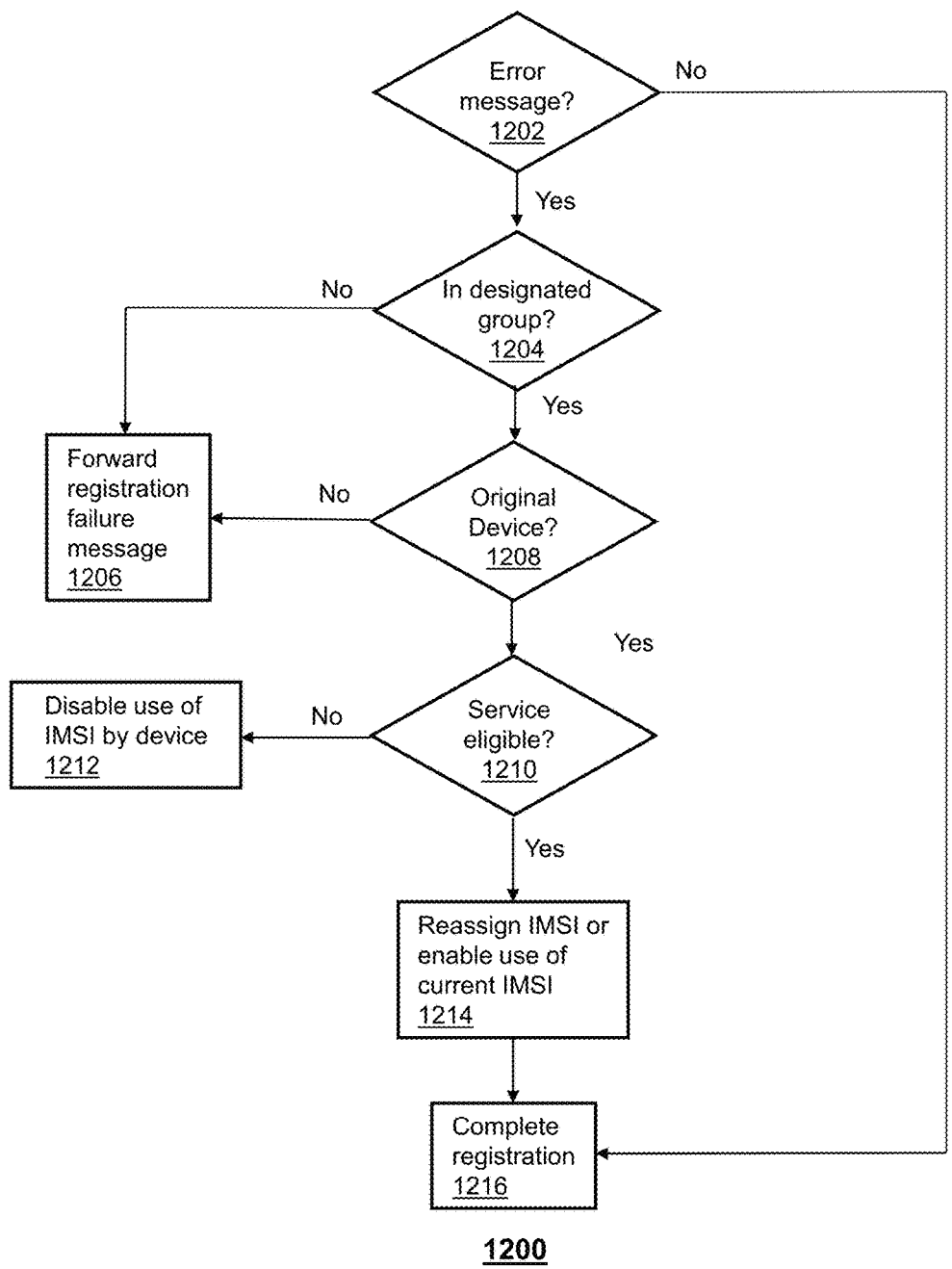
FIG. 12 depicts another illustrative embodiment of a method that provides communication services and enables re-using mobile subscriber identification information by other devices.

FIG. 12 depicts an illustrative embodiment of a method 1200 used by systems 1000, 1100 for facilitating the re-use of IMSIs. One or more of the steps of method 1200 can be performed by the identity proxy function 1050, the identity provisioning function 1099 and/or by other devices described in FIGS. 2-6 and 8-9. At 1202, an error message can be received that is associated with a communication device. For instance, the error message can result from a registration request that is generated by or caused to be generated by the communication device utilizing an IMSI that is part of the listing of designated IMSIs. As an example in GSM, the identity proxy function 1050 can receive an authentication failure message from a VLR. As another example in LTE, the identity proxy function 1050 can receive an authentication failure message from an MME. In one or more embodiments, the determination of an authentication failure (e.g., by an HLR or HSS) can be based on an IMSI and secret key combination for a device that is flagged as inactive. If there is no determination of an error (e.g., the IMSI is not included in the listing of designated IMSIs or the IMSI has been reassigned to a new device and the registration request is from that new device) then method 1200 can proceed to 1216 so that the registration process can be completed which enables the communication device to obtain services via the network.

At 1204, a screening of the IMSI can be performed by the identity proxy function 1050. For example, the identity proxy function 1050 can determine whether the IMSI is included in the designated group of IMSIs and if so can further determine whether the IMSI is included in a subset of the group which is further designated as having already been reassigned to another communication device. If the IMSI is not part of the designated group of IMSIs then method 1200 can proceed to 1206 for the authentication failure message to be delivered to the communication device 1110. If on the other hand the IMSI is part of the designated group of IMSIs then a determination can be made at 1206 as to whether the error message is for an original device that was associated with the IMSI (e.g., prior to being reassigned) or whether error message is for some other device. The identification of the particular device can be performed in a number of different ways, such as based on device identification information (e.g., IMEI). In one embodiment, where the error message does not include any device identification information and/or the IMSI, the identity proxy function 1050 can ascertain the device identification information and/or IMSI from the registration request that was previously received or intercepted. For instance, when the identity proxy function 1050 detects a registration error message (e.g., an AUTHENTICATION REJECT message from an MME), the identity proxy function 1050 can detect within the message addressing information, message ID information, correlation ID information, and so forth, and can further correlate the error message with the stored registration request previously intercepted. This enables the IMSI and/or device identification information (e.g., GUTI or IMEI) to be determined.

If the error message is not for the original device (e.g., a device that the IMSI was previously associated with prior to being added to the listing of designated IMSIs) then method 1200 can proceed to 1206 for the authentication failure message to be delivered to the communication device 1110. If on the other hand the error message is for the original device then a determination can be made at 1210 as to whether the subscriber of the original device is eligible for communication services. Eligibility for services can be based on various factors and can be determined by various components or a combination of components, such as based on billing, device hardware requirements, device software requirements, and so forth.

If the subscriber of the original device is not eligible for communication services then at 1212 provisioning information can be provided to the original device (e.g., via OTA provisioning by the identity provisioning function 1099 such as through use of the registration simulation platform 675) that causes disabling the use of the original IMSI by the original device. In one embodiment, the IMSI can then be removed from the listing of designated IMSIs.

If on the other hand the subscriber of the original device is eligible for communication services then at 1214 the original device can be authorized to utilize the particular IMSI (e.g., if it is determined that the particular IMSI has not yet been reassigned) or the original device can be provisioned, such as through use of the registration simulation platform 675, with another IMSI (e.g., if it is determined that the original IMSI has already been reassigned to another device) and registration of the device can be completed at 1216.

In one embodiment, the new IMSI reassigned to the original device can be selected from the listing of designated IMSI (which is not included in the subset of IMSIs that has already been reassigned). In one embodiment, the communication device 1110 can be instructed to re-register utilizing the new IMSI if one has been reassigned or utilizing the original IMSI if reuse of that original IMSI has been authorized.

While for purposes of simplicity of explanation, the respective processes are shown and described as a series of blocks in FIG. 12, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13:
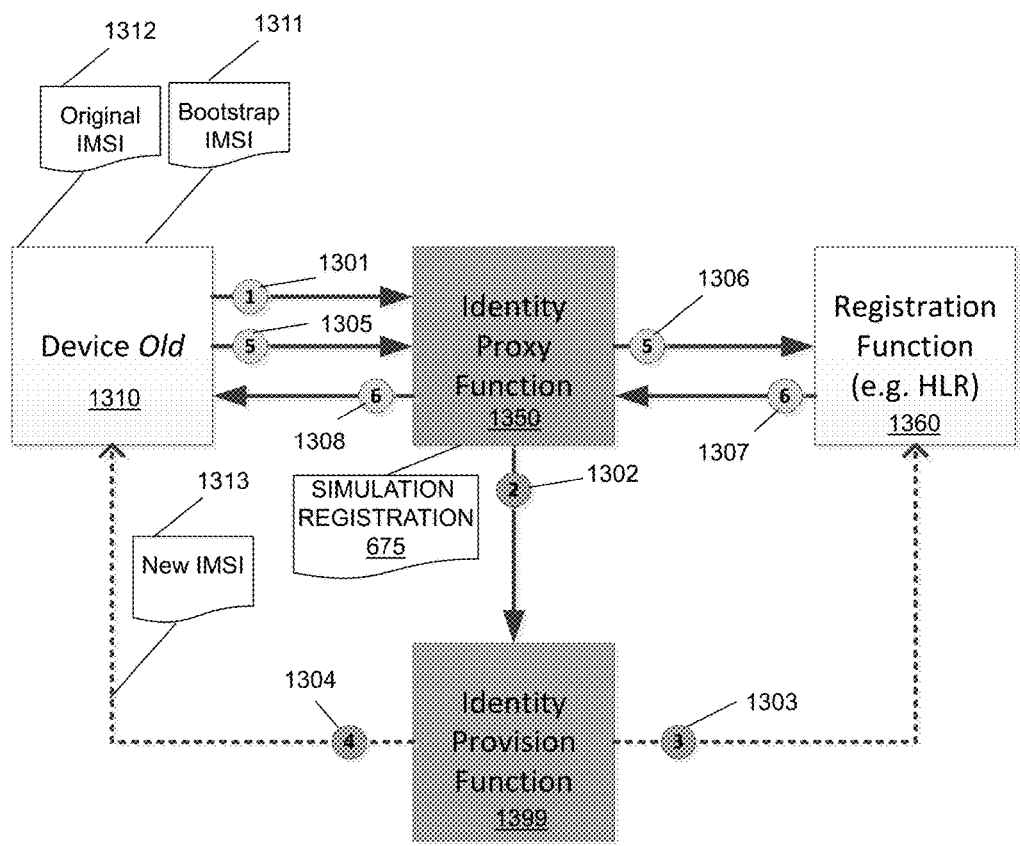
FIG. 13 depicts an illustrative embodiment of a system that provides for reassignment of mobile subscriber identification information.

FIG. 13 illustrates a portion of a system 1300 that provides communication services to end user devices or other devices, such as communication device 1310. System 1300 can be part of or combined with all or a portion of system 200 of FIG. 2, system 800 of FIG. 8, system 1000 of FIG. 10, system 1100 of FIG. 11 or another network such as a GPRS or UMTS network. The communication device 1310 can be various types of devices such as a mobile phone or other devices that utilize an IMSI for establishing communication services. The types of communication services can vary including voice services, video, data and/or messaging. System 1300 enables IMSI re-use by the same or other communication devices through use of an identity proxy function 1350 (which can perform some or all of the functions described with respect to identity proxy functions 250, 850, 1050) and an identity provisioning function 1399 (which can perform some or all of the functions described with respect to identity proxy functions 350, 899, 1099). System 1300 provides for registration of communication devices through use of a registration function 1360, such as an MSC/VLR and/or HLR in a GSM network or an MME and/or HSS in an LTE network, where an IMSI may or may not be reassigned to the communication device via the identity provisioning function 1399.

System 1300 may or may not include intermediate network components in the message exchange paths. System 1300 illustrates an attempted registration by the communication device 1310 which has been flagged as inactive (e.g., services have been suspended, failure to register over threshold time period, and so forth). The identity proxy function 1350 facilitates registration of devices where the particular IMSI is a bootstrap IMSI 1311 or an IMSI 1312 that the network does not want the communication device to utilize for registration, such as an IMSI that has already been reassigned to another device. FIG. 13 illustrates both of IMSIs 1311, 1312, but the communication device 1310 can have one or the other of the IMSIs, such as stored in a UICC of the communication device. In this embodiment, the identity proxy function 1350 can intercept or otherwise receive the IMSI, such as based on intercepting a registration request (e.g., prior to the registration request being provided to an MSC/VLR and/or HLR in GSM as illustrated in FIG. 2 or prior to the registration request being provided to an MME and/or HSS in LTE as illustrated in FIG. 8). In another embodiment, the identity proxy function 1350 can intercept or otherwise receive the IMSI which is associated with a registration error, such as an authentication failure message as illustrated in FIG. 11. A bootstrap IMSI 1311 can be an IMSI that provides for limited functionality such as being limited to bootstrap functions (e.g., functions that enable communicating with the network for administrative reasons including obtaining a reassigned IMSI), a pay for service mode, and so forth. For instance, a pay for service mode can be implemented by the bootstrap IMSI 1311 by allowing registration that enables access to a webpage for selecting and paying for particular communication services, such as messaging, voice calls, and so forth. The bootstrap IMSI 1311 can differ from an original IMSI 1312 in that the original IMSI can be utilized by a device (e.g., a new device reassigned the original IMSI or the original device that is re-authorized to utilize the IMSI) for accessing a full range of available services whereas the default or bootstrap IMSI does not provide access to the full range of available services, although the default or bootstrap IMSI could provide access to a webpage for pay for service mode. In one embodiment, a same bootstrap IMSI 1311 can be utilized by numerous devices that have been flagged as inactive.

In one embodiment at 1301, the original device 1310 can request registration with the network where the identity proxy function 1350 can determine whether or not the particular IMSI is part of a group of designated IMSIs. In one embodiment, the group of designated IMSIs can include bootstrap IMSIs and/or IMSIs that the network does not want utilized by the original devices (e.g., where the IMSI has already been reassigned to another device). In one embodiment, bootstrap IMSIs can be IMSIs that provide for limited use by a communication device. For instance, the limited use of a bootstrap IMSI can include enabling communication with network element(s) for initiating or otherwise facilitating a registration process and/or provisioning of another IMSI without enabling user communication services (e.g., voice, video, data, messaging) at the communication device utilizing the bootstrap IMSI.

In one embodiment, the identity proxy function 1350 can identify the particular device requesting registration with the network. For example, device identification information (e.g., an IMEI or GUTI) can be obtained for the original device 1310, such as being received from device 1310 (e.g., in the registration request) or obtained from another network element (e.g., from an Identification Request sent to the old MME/SGSN to request the IMSI). As another example, if the IMSI has not yet been reassigned but is part of a group of IMSIs designated for potential reassignment then the identity proxy function 1350 can determine that the device requesting registration is the original device 1310 that has been flagged as inactive. In another embodiment, identification of the device can be based on simulating a registration process and forcing a generation of an SRES (in GSM) or RES (in LTE) by the communication device 1310, as described herein.

In one embodiment, registration simulation platform 675 can be utilized (e.g., positioned between the communication device 1310 and the VLR in GSM or positioned between the communication device and the MME in LTE). As described herein, the simulating network can send an OTA message to the device that can cause the modification of the device IMSI and can cause the device to perform a re-registration to the target network. For example, the simulating network can comprise a set of functional elements that exist in the target network including an MSC/VLR, a MME, a HLR or HSS, an AUC, a SMSC, an OTA platform, a SGW, a PGW, an EIR and/or any combination thereof. In one embodiment, the registration simulation platform 675 can simulate a registration of the communication device 1310, identify the communication device from the secret key and/or from other identification information (e.g., IMEI or GUTI) and/or can cause the communication device to change from the bootstrap IMSI 1311 to an active IMSI via OTA.

In one embodiment, the identity proxy function 1350 and/or the identity provisioning function 1399 can determine whether the original device 1310 is eligible for services. If the original device 1310 is not eligible for services (e.g., suspension of services for non-payment or other reasons, device/UICC is no longer compatible with network or services, and so forth) then the identity proxy function 1350 can cause or otherwise facilitate or enable provisioning information to be provided (e.g., via the identity provisioning function 1399) to the original device 1310 to cause the original device to disable its use of an original IMSI 1312. In this example, the original IMSI 1312 can then be removed from the designated listing of IMSIs and can instead be included with other IMSIs (e.g., that have never been used before) that are eligible for assignment.

In one embodiment, if the communication device 1310 is eligible for services then the identity provisioning function 1399 can implement a reassignment of another IMSI 1313 (e.g., from a listing of IMSIs that are designated for reassignment) for the device 1310. For example at 1302, responsive to a determination that an IMSI reassignment is warranted (e.g., a bootstrap IMSI is being utilized, the original IMSI has already been reassigned to another device, and/or a subscriber of the original device 1310 is eligible for services) then the identity proxy function 1350 can provide a request to the identity provisioning function 1399 for the other IMSI 1313 or the determination can be made by the identity provisioning function 1399. In one embodiment, the original device 1310 can continue to utilize its original secret key (which is mapped to the original device by the network such as in an HLR or HSS). In one embodiment, the determination of eligibility for services can be made by the identity provisioning function 1399 such that the identity proxy function 1350 automatically transmits the request to the identity provisioning function 1399 for another IMSI responsive to a determination that the IMSI is in the listing of designated IMSIs and the identity provisioning function 1399 can approve or deny the request.

Continuing with this example at 1303, the identity provisioning function 1399 can notify various network elements (e.g., the HLR 260, the AUC 270, an EIR, the HSS 860, and/or a national SIM manager) that the communication device 1310 is now associated with the particular reassigned IMSI 1313. In one embodiment, this transmitting of network provisioning data can cause the HLR 260 or HSS 860 to delete (or otherwise note the change of) an original IMSI assignment for the communication device 1310 and/or add the new IMSI assignment for the communication device 1310 in its database. In one embodiment, this notification can cause the HLR 260 or the HSS 860 to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth. In one or more embodiments, the HLR 260 and/or the HSS 860 may or may not have information corresponding to the bootstrap IMSI 1311.

In one embodiment at 1304, the identity provisioning function 1399 can provide provisioning information to the communication device 1310, such as via an OTA interface (e.g., using an SMS protocol such as through registration simulation platform 675). The provisioning information can cause the UICC to be adjusted so that the reassigned IMSI 1313 is now utilized by the communication device 1310 for communication services. At 1305, the communication device 1310 can then attempt to re-register utilizing the reassigned IMSI 1313. The identity proxy function 1350 can receive the re-registration request for the communication device 1310, which now includes the reassigned IMSI 1313, and at 1306-1308 the registration process (e.g., via the VLR 245 and the HLR 260 in system 200 or via the MME 840 and the HSS 860 in LTE) can be completed based on the reassigned IMSI 1313. In one or more embodiments, the identity provisioning function 1399 can provision an NSM with the reassigned IMSI 1313 for the original device where the secret key of the original device is already known. In another embodiment, the identity provisioning function 1399 can be integrated with equipment of the NSM. In one embodiment, a billing system can detect the change in IMSI for the UICC and can provision some or all other network elements necessary for enabling call processing (e.g., HLR 260, AUC 270, MME 840 and/or HSS 860). In one embodiment, the identity proxy function 1350 and/or the identity provisioning function 1399 can provide instructions to the communication device 1310 that causes the communication device to initiate a re-registration utilizing the re-assigned IMSI 1313.

Figure 14:
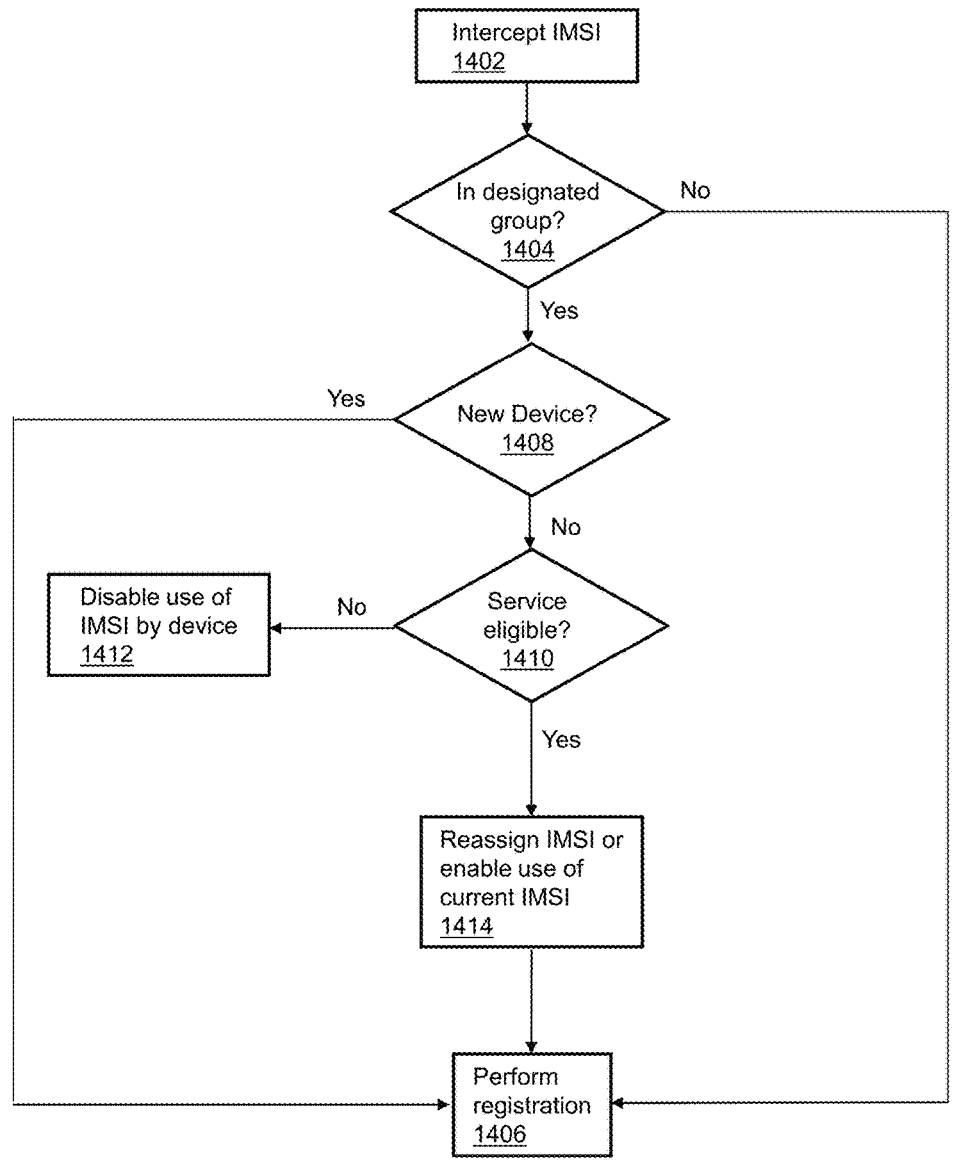
FIG. 14 depicts another illustrative embodiment of a method that provides communication services and enables reassigning mobile subscriber identification information to other devices.

FIG. 14 depicts an illustrative embodiment of a method 1400 used by system 1300 for facilitating the reassignment of IMSIs where a device is attempting to register utilizing a bootstrap IMSI or utilizing an IMSI that the network does not want the device to continue to utilize. One or more of the steps of method 1400 can be performed by the identity proxy function 1350, the identity provisioning function 1399 and/or by other devices described in FIGS. 2-6, 8-11 and 13. At 1402, an IMSI can be received that is associated with a communication device. For instance, the IMSI can be part of a registration request that is generated by or caused to be generated by the communication device 1310 or can be associated with an authentication failure caused by use of the particular IMSI (e.g., the IMSI has been reassigned and the IMSI/original secret key combination is no longer valid and thus cannot be authenticated). At 1404, a determination of the status of the IMSI can be made. For example, the identity proxy function 1350 can determine whether the IMSI is included in a designated group of IMSIs (e.g., a bootstrap IMSI or an IMSI that the network does not want the device to continue to utilize). In one embodiment, if the IMSI is not part of the designated group of IMSIs then the registration process can be continued by forwarding the registration request and/or IMSI to the registration function 1360 (e.g., MSC/VLR in GSM or MME in LTE) to perform the registration at 1406. If on the other hand the IMSI is part of the designated group of IMSIs then a determination can be made at 1408 as to whether the registration request is for an original device that was associated with the IMSI (e.g., prior to being reassigned) or whether the registration request is for another device (e.g., a new device that has been reassigned the IMSI). The identification of the particular device can be performed in a number of different ways, such as based on device identification information (e.g., IMEI or GUTI), simulating a registration process to force an SRES or RES generation by the device from which the device identification can be determined, and so forth.

In one embodiment, if the registration request and the IMSI are from a new device that has been reassigned the IMSI then the registration process can be continued by forwarding the registration request and/or IMSI to the MSC/VLR (in GSM) or the MME (in LTE) to perform the registration at 1406. In another embodiment, if the registration request and the IMSI are from another device that has not been authorized to utilize the IMSI (and which is not the original device associated with that IMSI) then an authentication failure can be generated. In one embodiment, provisioning information can be sent to that particular communication device which is not authorized to utilize the IMSI, where the provisioning information causes nullification of the use of that particular IMSI by the UICC of that particular communication device.

If on the other hand the registration request and the IMSI are from an original device (e.g., a device that the IMSI was previously associated with prior to being added to the listing of designated IMSIs) then a determination can be made at 1410 as to whether the subscriber of the original device is eligible for communication services. Eligibility for services can be based on various factors and can be determined by various components or a combination of components, such as based on billing, device hardware requirements, device software requirements, user requests, and so forth. In one embodiment, if the subscriber of the original device is not eligible for communication services then at 1412 provisioning information can be provided to the original device (e.g., via OTA provisioning by the identity provisioning function 1399 such as through use of registration simulation platform 675) that causes disabling the use of the particular IMSI by the original device (e.g., where the IMSI is not bootstrap IMSI 1311 but rather is original IMSI 1312). In one embodiment, if the IMSI 1312 has not already been reassigned and the IMSI 1312 is not to be utilized by the communication device 1310 then it can be removed from the listing of designated IMSIs to be provided to another communication device.

If on the other hand the subscriber of the original device is eligible for communication services then at 1414 the original device can be authorized to utilize the particular IMSI (e.g., if it is determined that the particular IMSI has not yet been reassigned) or the original device can be provisioned (e.g., utilizing registration simulation platform 675) with another IMSI (e.g., if it is determined that the original IMSI has already been reassigned to another device or if the IMSI is the bootstrap IMSI 1311). In one embodiment, the new IMSI 1313 that is reassigned to the original device 1310 can be selected from a listing of designated IMSI that are to be reassigned to devices. Method 1400 can then proceed to 1406 where the registration process is completed, such as by forwarding instructions to the communication device 1310 to cause a re-registration. In one embodiment, if the original device 1310 is utilizing the bootstrap IMSI 1311 and eligibility for services is approved then a new IMSI or the original IMSI 1312 will need to be utilized by the original device to access services since the bootstrap IMSI does not provide direct access to the services.

While for purposes of simplicity of explanation, the respective processes are shown and described as a series of blocks in FIG. 14, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, eligibility for services can be determined according to a viability of the UICC, such as whether the UICC can comply with requirements of the network (e.g., it can perform certain security functions, provide certain notifications requested by the network, and/or can facilitate certain communication services). In one embodiment, if it is determined that the UICC is not viable or otherwise is incompatible with the network then the subscriber of the original device can be provided with a request to upgrade the UICC (which may or may not utilize the same IMSI), such as forwarding a message including an offer to the original device. In one embodiment, confirmation that a particular IMSI is no longer being utilized by a communication device can result in that particular IMSI being removed from the listing of designated IMSIs. One or more of the determinations described with respect to any of the exemplary embodiments can be made by the identity proxy function 1350, the identity provisioning function 1399, or another network device.

In one or more embodiments, the communication device 1310 can have both a bootstrap IMSI 1311 and an original IMSI 1312 (e.g., stored in the UICC). In one embodiment, the communication device 1310 or the UICC can switch from utilizing the original IMSI 1312 to utilizing the bootstrap IMSI 1311 responsive to detecting a triggering event. For example, a communication device 1310 can monitor for a time period from a last successful registration of the communication device utilizing the original IMSI 1312. If the time period exceeds a particular threshold (e.g., six months) then the communication device and/or the UICC can switch to utilizing the bootstrap IMSI 1311.

In one or more embodiments, the communication device 1310 can be provisioned with the bootstrap IMSI 1311 and may or may not continue to store and/or utilize the original IMSI 1312 (e.g., stored in the UICC). For example, bootstrap IMSIs can be provisioned to all or some devices via the identity provisioning function 1399 utilizing an OTA interface, such as via SMS protocol (e.g., through use of registration simulation platform 675). In one embodiment, particular communication devices can be selected for receiving bootstrap IMSIs based on various criteria, such as based on older devices that are predicted to be going offline in the near future, subscriber billing history, and so forth.

In one or more embodiments, the communication device 1310 can be provisioned with a bootstrap IMSI 1311 at the time that the device receives its IMSI such as a reassigned IMSI 1313. In one or more embodiments, the group of designated IMSIs can include a first subset of IMSIs designated for limited use (e.g., bootstrap IMSIs), a second subset of IMSIs designated as having been reassigned to other communication devices, and/or a third subset of IMSIs designated for potential reassignment but that have not yet been reassigned to other communication devices.

In one or more embodiments, the bootstrap IMSI 1311 can be utilized for providing a subscriber with an option to obtain a reassigned IMSI (e.g., via OTA provisioning by the identity provisioning function 1399 such as by utilizing registration simulation platform 675) and/or to obtain pay for services, such as access to a website that allows purchasing particular services for particular lengths of times, and so forth. In one embodiment, the same bootstrap IMSI can be utilized for multiple device. In another embodiment, different bootstrap IMSIs can be utilized for different devices.

Figure 15:
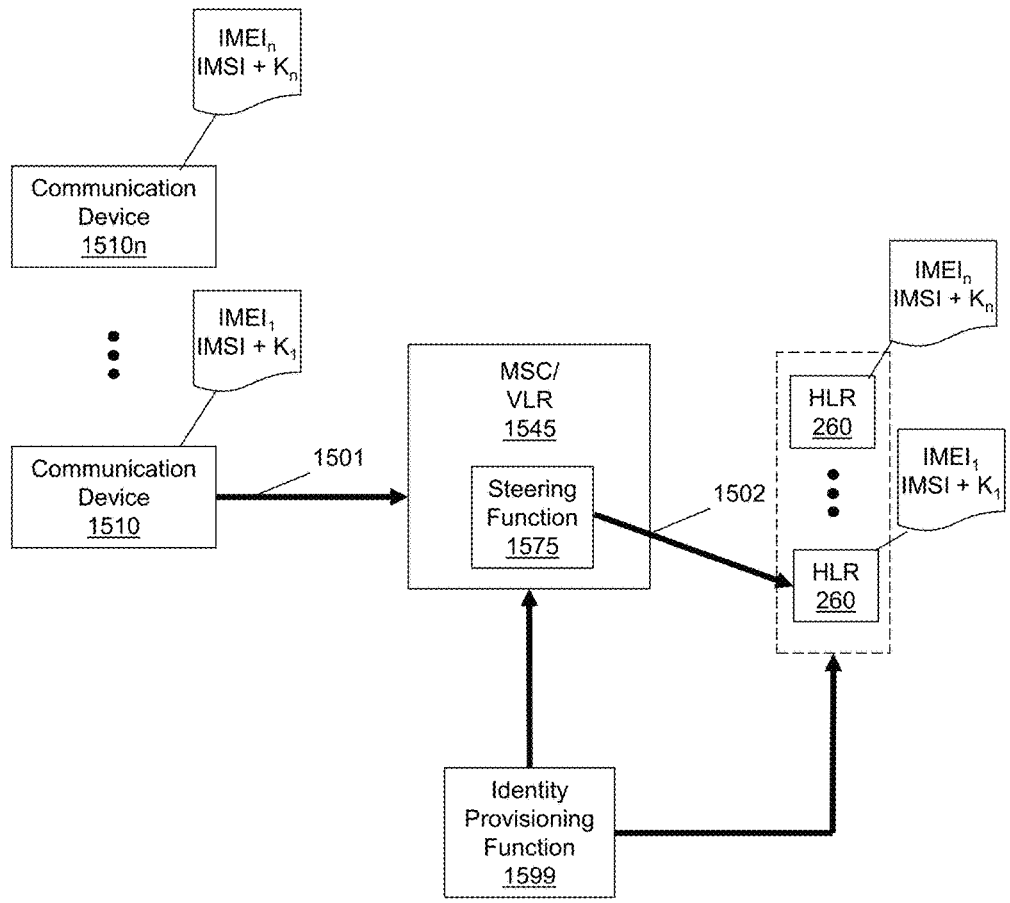
FIG. 15 depicts an illustrative embodiment of a system that provides for use of a same mobile subscriber identification information by more than one communication device.

FIG. 15 illustrates a portion of a system 1500 that provides communication services to end user devices or other devices, such as communication devices 1510-1510*n*. System 1500 can be part of or combined with all or a portion of system 200 of FIG. 2, system 1000 of FIG. 10, system 1100 of FIG. 11, system 1300 of FIG. 13, or another network such as an EPS, GPRS or UMTS network. The communication devices 1510-1510*n* can be various types of devices such as an M2M device, an IoT device, a smart appliance, a utility meter, a fixed device, a mobile device, a vehicle communication system, or other devices that utilize an IMSI for establishing communication services. The types of communication services can vary including voice services, video, data and/or messaging. System 1500 enables the same IMSI to be utilized by more than one communication device such as through use of a steering function in conjunction with unique device identifiers. System 1500 provides for registration of communication devices through use of a registration function, such as an MSC/VLR and/or HLR in a GSM network.

System 1500 may or may not include intermediate network components in the message exchange paths. System 1500 illustrates a registration by a communication device 1510 utilizing an IMSI that is shared with one or more other communication devices (illustrated as 1510*n*). Each of the communication devices 1510-1510n can have unique device identification information (e.g., an IMEI, eUICC platform ID, MAC address, and so forth) and can also utilize their own secret keys for initiating and/or performing the registration process (e.g., generating an SRES).

In one embodiment at 1501, a first communication device 1510 can request registration with the network where the registration request is received by the MSC/VLR 1545. In this embodiment the MSC and VLR are shown as one device but in another embodiment could also be separate devices. In one embodiment, the first communication device 1510 can send both an IMSI and a unique device identifier (e.g., an IMEI) to the MSC/VLR 1545. In another embodiment, this unique device identifier can be identification associated with an eUICC. In another embodiment, a location update message can be utilized for delivering this information to the MSC/VLR 1545. Other techniques for obtaining the unique device identifier can also be employed by system 1500, including use of registration simulation platform 675 of FIG. 6. In one embodiment, the MSC/VLR 1545 can store the IMSI and the device identifier (e.g., indexed to each other), and can use them to uniquely identify the first communication device 1510 (against one or more other communication devices 1510n that may attempt to register utilizing the same IMSI but would have different device identifiers). In one embodiment, the MSC/VLR 1545 can have the capability of distinguishing between a set of IMSI instances using the IMSI and a unique device identifier.

In one embodiment, the MSC/VLR 1545 can generate an authentication request directed to an HLR 260, such as using (or otherwise including) both the IMSI and the device identifier. In one embodiment, a steering function 1575 can intercept the authentication request and at 1502 can steer it or otherwise transmit it to an HLR based on network policies for the IMSI and device identifier combination. In one embodiment, the steering function 1575 can be integrated with the MSC/VLR 1545. In another embodiment, the steering function 1575 can be a separate device, such as interfacing with the MSC/VLR 1545 via a Diameter Routing Agent. As an example and as illustrated in FIG. 15, multiple HLRs 260 can be utilized where each HLR contains a single instance of a shared IMSI. In this example, the steering function 1575 can determine the appropriate HLR for receiving the authentication request according to the IMSI and the device identifier. Continuing with this example, the HLR 260 may not need to utilize (and/or know) the unique device identifier since it only has one instance of the IMSI and can rely on that IMSI for its database lookup. In another embodiment, a single HLR 260 can be used for shared IMSIs, where the single HLR has the capability of distinguishing communication devices based on an IMSI and a mapping to a unique device identifier as shown in the example of stored data at the HLR shown in FIG. 16.

In one or more embodiments, the combination of IMSI and device identifier would be known by the MSC/VLR 1545, the steering function 1575 and/or the HLR 260 (e.g., where a single HLR is being utilized) prior to an attempt at registration. Once the HLR 260 receives the authentication request, the target HLR can provide authentication triplets to the MSC/VLR 1545 based on the IMSI (e.g., where multiple HLRs are being utilized that each have only one instance of the IMSI) and/or based on the combination of IMSI and unique device identifier (e.g., where a single HLR is being utilized that has multiple instances of the IMSI that are each indexed by a different unique device identifier). In one embodiment, the HLR 260 can communicate with the AUC 270 for obtaining the authentication triplets. The MSC/VLR 1545 can receive the authentication triplets from the HLR 260 and can initiate the authentication procedure with the first communication device 1510. In one embodiment once authentication is successful, the MSC/VLR 1545 can assign a unique temporary ID, such as a P-TMSI, to the first communication device 1510. This unique temporary ID can allow each of the communication devices 1510-1510n using the shared IMSI to be paged on its own.

In one embodiment, system 1500 can operate without utilizing the registration simulation platform 675 (e.g., illustrated in FIG. 6). In another embodiment, system 1500 can operate without utilizing the identity proxy function 250 (e.g., illustrated in FIGS. 2 and 6) positioned between the MSC/VLR 1545 and the communication device 1510. In one embodiment, the functionality of the MSC/VLR 1545 and/or the HLR 260 can be adjusted so that IMSI use by different devices can be distinguished according to unique device identifiers (e.g., an IMEI). In one embodiment, the combination of the IMSI and the unique device identifier is known and stored by various network elements (e.g., one or more of the MSC/VLR 1545, the steering function 1575, the HLR 260 and so forth) such as prior to any registration attempt. In one or more embodiments, system 1500 can utilize an identity provisioning function 1599 to provide various network elements (e.g., one or more of the MSC/VLR 1545, the steering function 1575, the HLR 260 and so forth) with network provisioning data such as combinations of IMSIs and unique device identifiers.

Figure 17:
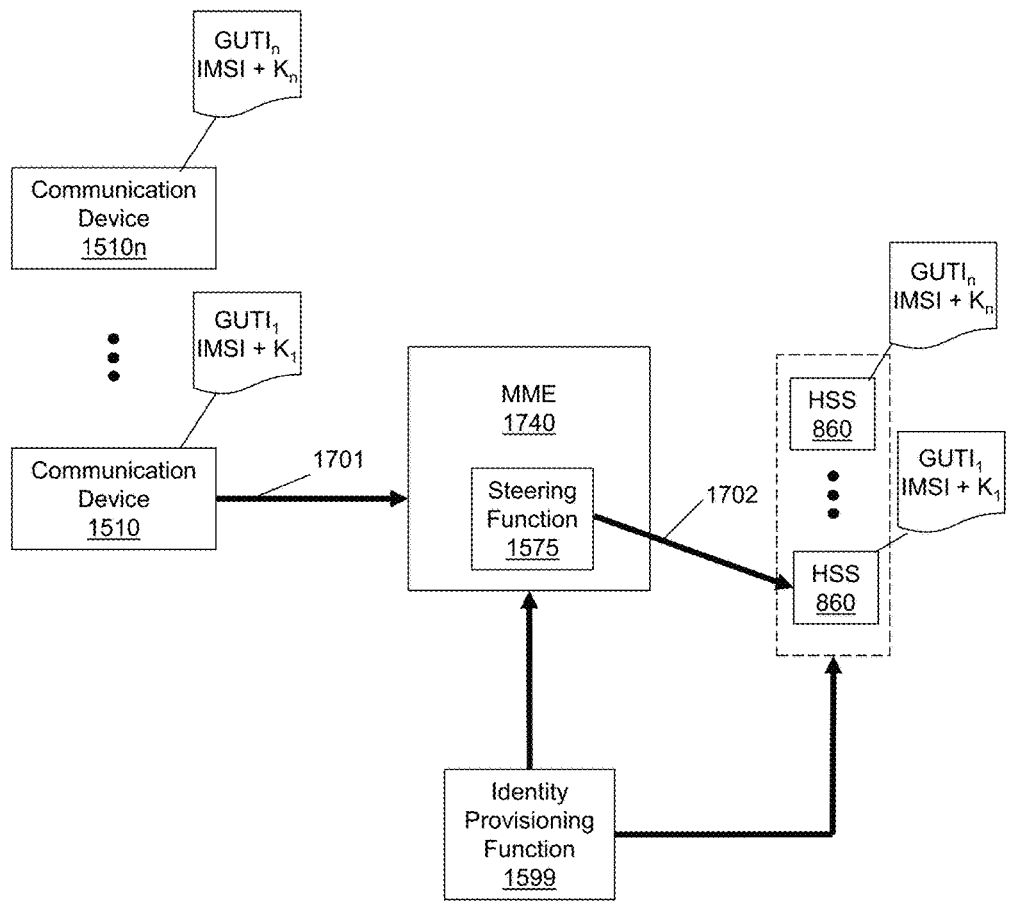
FIG. 17 depicts another illustrative embodiment of a system that provides for use of a same mobile subscriber identification information by more than one communication device.

FIG. 17 illustrates a portion of a system 1700 that provides communication services to end user devices or other devices, such as communication devices 1510-1510n. System 1700 can be part of or combined with all or a portion of system 800 of FIG. 8, system 1000 of FIG. 10, system 1100 of FIG. 11, system 1300 of FIG. 13, or another network such as an EPS, GPRS or UMTS network. System 1700 can operate similar to system 1500 but can utilize protocols and components associated with LTE communications. The communication devices 1510-1510n can be various types of devices such as an M2M device, an Iot device, a smart appliance, a utility meter, a fixed device, a mobile device, a vehicle communication system, or other devices that utilize an IMSI for establishing communication services. The types of communication services can vary including voice services, video, data and/or messaging. System 1700 enables the same IMSI to be utilized by more than one communication device such as through use of the steering function 1575 in conjunction with unique device identifiers. System 1700 provides for registration of communication devices through use of a registration function, such as an MME and/or HSS in an LTE network. System 1700 may or may not include intermediate network components in the message exchange paths. System 1700 illustrates a registration by a communication device 1510 utilizing an IMSI that is shared with one or more other communication devices (illustrated as 1510n). Each of the communication devices 1510-1510n can have unique device identification information, such as a GUTI, and can also utilize their own secret keys for initiating and/or performing the registration process.

In one embodiment at 1701, a first communication device 1510 can request registration with the network where the registration request is received by the MME 1740. In one embodiment, the first communication device 1510 can send both an IMSI and a unique device identifier (e.g., a GUTI) to the MME 1740, such as during an initial Attach procedure. In one embodiment, this unique device identifier can be an eUICC platform ID. In another embodiment, multiple messages (Attach Request (IMSI) and Identify Response (GUTI)) can be utilized for delivering this information from the communication device 1510 to the MME 1740. Although, any number of messages can be utilized for obtaining the IMSI and unique device identification, such as a single message or two or more messages. Other techniques can be utilized for obtaining the unique device identification, such as an Identification Request sent to an old MME/SGSN and/or use of registration simulation platform 675 of FIG. 6 for forcing a RES generation. In one embodiment, the MME 1740 can store the IMSI and the device identifier together (e.g., mapped to each other), and can use them to uniquely identify the first communication device 1510 (against one or more other communication devices 1510n that may attempt to register utilizing the same IMSI but with different device identifiers). In one embodiment, the MME 1740 can have the capability of distinguishing between a set of IMSI instances using the IMSI and a unique device identifier.

In one embodiment, the MME 1740 can generate an authentication request directed to an HSS 860, such as using (or otherwise including) both the IMSI and the device identifier. In one embodiment, the steering function 1575 can intercept the authentication request and at 1702 can steer it or otherwise transmit it to an HSS based on policies for the IMSI and device identifier combination. In one embodiment, the steering function 1575 can be integrated with the MME 1740. In another embodiment, the steering function 1575 can be a separate device, such as interfacing with the MME 1740 via a Diameter Routing Agent. As an example and as illustrated in FIG. 17, multiple HSSs 860 can be utilized where each HSS contains a single instance of a shared IMSI. In this example, the steering function 1575 can determine the appropriate HSS for receiving the authentication request according to the IMSI and device identifier. Continuing with this example, the HSS 860 may not need to utilize (and/or know) the unique device identifier since it only has one instance of the IMSI and can rely on that IMSI. In another embodiment, a single HSS 860 can be used for shared IMSIs, where the single HSS has the capability of distinguishing communication devices based on IMSI and a mapping to a unique device identifier (similar to the example of stored data shown in FIG. 16).

In one or more embodiments, the combination of IMSI and device identifier would be known by the MME 1740, the steering function 1575 and/or the HSS 860 (e.g., where a single HSS is being utilized), such as prior to an attempt at registration. Once the HSS 860 receives the authentication request, the target HSS can provide authentication vectors to the MME 1740 based on the IMSI (e.g., where multiple HSSs are being utilized that each have only one instance of the IMSI) and/or based on the combination of IMSI and unique device identifier (e.g., where a single HSS is being utilized that has multiple instances of the IMSI that are each indexed by a unique device identifier). The MME 1740 can receive the authentication vectors from the HSS 860 and can initiate the authentication procedure with the first communication device 1510. In one embodiment once authentication is successful, the MME 1740 can assign a unique temporary ID, such as a P-TMSI or GUIT, to the first communication device 1510. This unique temporary ID can allow each of the communication devices 1510-1510n using the shared IMSI to be paged on its own or to otherwise facilitate network services. For instance the unique temporary ID can be assigned to the first communication device 1510 after a successful authentication or at some other time during or after registration.

In one embodiment, system 1700 can operate without utilizing the registration simulation platform 675. In another embodiment, system 1700 can operate without utilizing the identity proxy function 850 positioned between the MME 1740 and the communication device 1510. In one embodiment, the functionality of the MME 1740 and/or the HSS 860 can be adjusted so that IMSI use by different devices can be distinguished according to unique device identifiers (e.g., a GUTI). In one embodiment, the combination of the IMSI and the unique device identifier is known and stored by various network elements (e.g., one or more of the MME 1740, the steering function 1575, the HSS 860 and so forth) such as prior to any registration attempt. In one or more embodiments, system 1700 can utilize an identity provisioning function 1599 to provide various network elements (e.g., one or more of the MME 1740, the steering function 1575, the HSS 860 and so forth) with network provisioning data such as combinations of IMSIs and unique device identifiers.

Figure 18:
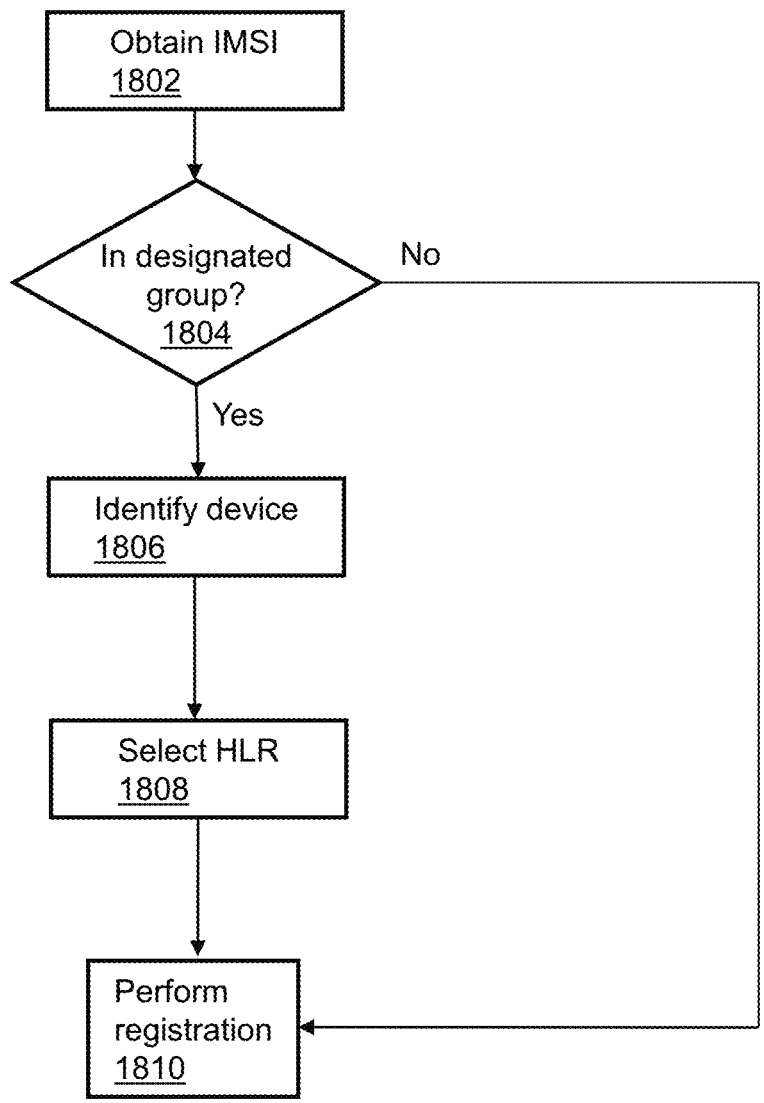
FIG. 18 depicts another illustrative embodiment of a method that provides communication services and enables use of the same mobile subscriber identification information by multiple communication devices.

FIG. 18 depicts an illustrative embodiment of a method 1800 used by systems 1500 and/or 1700 for facilitating the use of a same IMSI by more than one communication device. One or more of the steps of method 1800 can be performed by various network elements, such as a steering function, a registration function, a VLR, an HLR, an MME, an HSS, and/or by other devices described in FIGS. 2-6, 8-11, 13, 15 and 17. At 1802, an IMSI can be received that is associated with a first communication device attempting to register with a network, where the IMSI has been assigned to one or more other communication devices which may or may not be registered with that network. The one or more other communication devices can be located remotely from the first communication device and/or can be located in proximity thereto, such as at the same premises. In one embodiment, the IMSI can be shared by communication devices associated with the same subscriber. In another embodiment, the IMSI can be shared by communication devices of a same type (e.g. a smart meter) which may or may not be associated with the same subscriber and which may or may not be located in proximity or at the same premises. In one embodiment, HLRs and/or HSSs can be established per subscriber and/or per groups of subscribers. In another embodiment, HLRs and/or HSSs can be established per premises, per groups of premises and/or per geographic locations. In another embodiment, the HLRs and/or HSSs can be established according to device types (e.g. a smart meter) which may or may not be associated with the same subscriber and which may or may not be located in proximity or at the same premises.

For instance, the IMSI can be part of a registration request that is generated by or caused to be generated by the communication device 1510. At 1804, a determination of the status of the IMSI can be made. For example, a VLR or MME can determine that the IMSI is included in a designated group of IMSIs that are shared by multiple devices. In one embodiment, if the IMSI is not part of the designated group of IMSIs then the registration process can be continued (with or without obtaining unique device identification information for the device) by forwarding the registration request and/or IMSI to the registration function to perform the registration at 1806. If on the other hand the IMSI is part of the designated group of IMSIs then a determination of an identity of the particular device requesting registration can be performed. For example, the identification of the particular device can be performed in a number of different ways, such as by receiving or requesting device identification information (e.g., IMEI or GUTI) including via an Attach Request and/or Identify Response in an EPS system, simulating a registration process to force an SRES or RES generation by the device from which the device identification can be determined, and so forth.

In one embodiment at 1808 where multiple registration functions are being utilized that each include only one instance of the IMSI, a selection of a first registration function from among a group of registration functions according to the device identification information can be performed. For instance, the group of registration functions (e.g., HLRs or HSSs) can store subscriber information including IMSIs that are indexed to device identifications. At 1810, an authentication request can be transmitted to the selected first registration function (without being transmitted to any of the other registration functions), where the first registration function stores first subscriber information including the IMSI that is indexed to the first communication device and where a second registration function of the group of registration functions stores second subscriber information including the single IMSI that is indexed to the second communication device. In this example, the second registration function does not store the first subscriber information and the first registration function does not store the second subscriber information. The transmitting of the authentication request to the first registration function can enable the first communication device to complete a registration process. The use of the same IMSI for more than one device as described with respect to FIGS. 15-18 can also be utilized with one or more features described with respect to other embodiments herein, such as OTA provisioning utilizing a registration simulation, bootstrap IMSIs for enabling provisioning of a same IMSI to more than one device, disabling devices from utilizing a shared IMSI such as for suspension of services, and so forth. In one or more embodiments, an identity proxy function and/or an identity provisioning function can be used in conjunction with the steering function 1575 for enabling various features described with respect to the embodiments of FIGS. 2-14.

Figure 19:
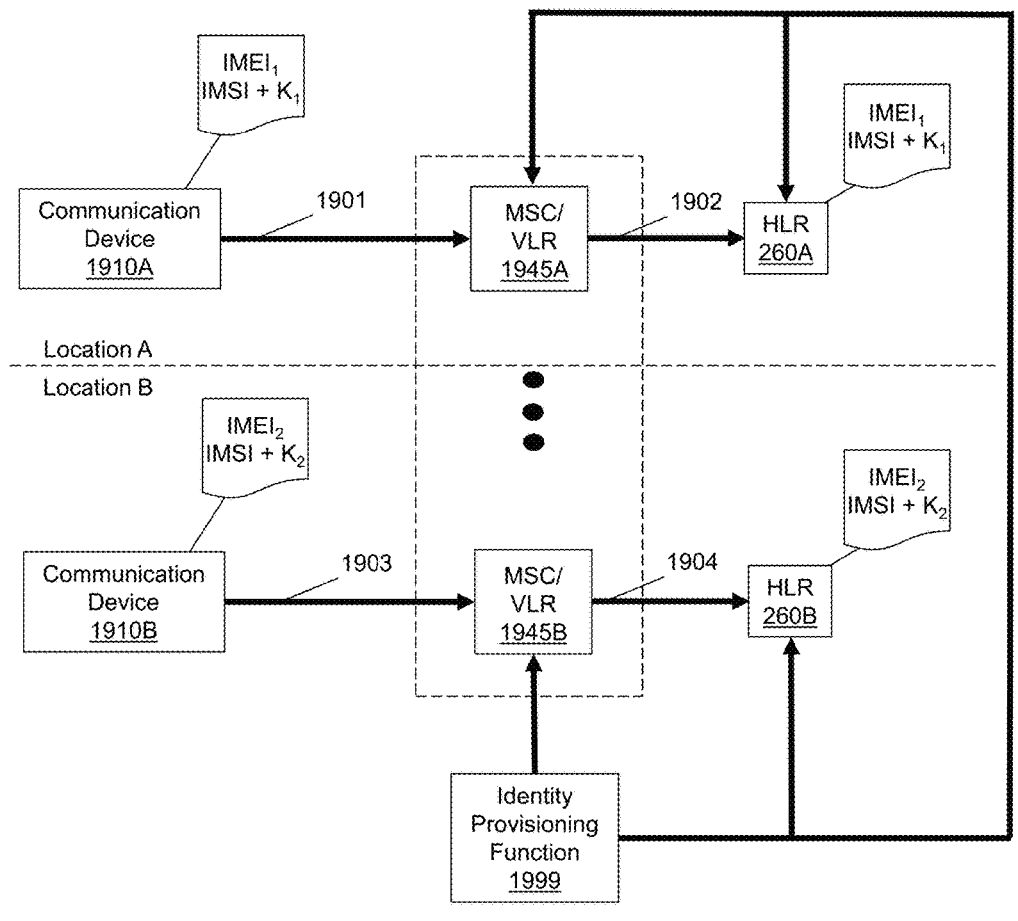
FIGS. 19-20 depict illustrative embodiments of systems that provide for use of a same mobile subscriber identification information by more than one communication device at different locations.

FIG. 19 illustrates a portion of a system 1900 that provides communication services to end user devices or other devices, such as communication devices 1910A and 1910B. System 1900 can be part of or combined with all or a portion of system 200 of FIG. 2, system 1000 of FIG. 10, system 1100 of FIG. 11, system 1300 of FIG. 13, or another network such as an EPS, GPRS or UMTS network. The communication devices 1910A and 1910B can be various types of devices such as an M2M device, an IoT device, a smart appliance, a utility meter, a fixed device, a mobile device, a vehicle communication system, or other devices that utilize an IMSI for establishing communication services. The types of communication services can vary including voice services, video, data and/or messaging. System 1900 enables the same IMSI to be utilized by more than one communication device by segregating the locations of the devices using the same IMSI. System 1900 provides for registration of communication devices through use of a registration function, such as an MSC/VLR and/or HLR in a GSM network.

System 1900 may or may not include intermediate network components in the message exchange paths. System 1900 illustrates a registration by a communication device 1910A utilizing an IMSI that is shared with one or more other communication devices (illustrated as 1910B). Each of the communication devices 1910A and 1910B can have unique device identification information (e.g., an IMEI, eUICC ID information, MAC address, and so forth) and can also utilize their own secret keys for initiating and/or performing the registration process (e.g., generating an SRES).

In one embodiment at 1901, a first communication device 1910A can request registration with the network where the registration request is received by the MSC/VLR 1945A. In this embodiment the MSC and VLR are shown as one device but in another embodiment could also be separate devices. In one embodiment, the first communication device 1910A can send an IMSI to the MSC/VLR 1945A.

In one embodiment, system 1900 can be configured such that a device with a shared IMSI does not or should not register with an MSC/VLR that already has a device with the same IMSI registered to it (or otherwise designated to that registration service area). For example, device 1910A can be operating in Location Area A where the MSC/VLR 1945A is not part of an overlapping pool of MSC/VLRs into (or otherwise does not have a registration service area that covers) Location Area B. In one embodiment, the particular MSC/VLR 1945A can be selected from among a group of MSC/VLRs based on the IMSI (or an IMSI hash) and/or other determinative information including location data, such as by a Radio Network Controller (RNC). The Location Area can be a non-overlapping grouping of cell sites within a VLR service area. In this example, there can be only one instance of a shared IMSI per MSC/VLR registration service area such as a Location Area (e.g., location A or Location B). In another embodiment, the particular communication device (e.g., device 1910A) can be intended to operate within that designated registration service area and/or movement of the particular communication can be monitored to detect if the particular device moves out of this designated registration service area. In one embodiment, the mapping of the IMSI to an HLR can be static and hard coded in the selected MSC/VLR 1945A. In another embodiment, the process utilized in system 1900 can be for GSM devices that do not support GPRS, LTE and/or EPS communications.

In one or more embodiments, unique device identification information may not be initially obtained with the IMSI. In one or more embodiments, unique device identification information may be obtained to facilitate the registration process such as an IMEI, a unique device identifier associated with an eUICC, and so forth. In another embodiment, a location update message can be utilized for delivering the device identification information to the MSC/VLR 1945A. Other techniques for obtaining the unique device identifier can also be employed by system 1900, including use of registration simulation platform 675 of FIG. 6.

In one embodiment at 1902, the MSC/VLR 1945A can generate an authentication request directed to an HLR 260A, such as using (or otherwise including) the IMSI. Continuing with this example, the HLR 260A may not need to utilize (and/or know) any unique device identifier since it only has one instance of the IMSI and can rely on that IMSI for its database lookup. Once the HLR 260A receives the authentication request, the HLR can provide authentication triplets to the MSC/VLR 1945A based on the IMSI. In one embodiment, the HLR 260A can communicate with the AUC 270 for obtaining the authentication triplets. The MSC/VLR 1945A can receive the authentication triplets from the HLR 260A and can continue the authentication procedure with the first communication device 1910A to enable completion of the registration process. In one embodiment, there can be one AUC per HLR. In another embodiment, the AUC can have a mapping of the IMSI, HLR, and secret key.

In one embodiment, system 1900 may or may not operate without utilizing the registration simulation platform 675 (e.g., illustrated in FIG. 6). In another embodiment, system

1900 may or may not operate without utilizing the identity proxy function 250 (e.g., illustrated in FIGS. 2 and 6) positioned between the MSC/VLR 1945A and the communication device 1910A.

In one embodiment at 1903, a second communication device 1910B can request registration with the network where the registration request is received by the MSC/VLR 1945B. In this embodiment the MSC and VLR are shown as one device but in another embodiment could also be separate devices. In one embodiment, the second communication device 1910B can send an IMSI to the MSC/VLR 1945B. In one or more embodiments, a same VLR can process multiple instances of an IMSI based on having access to and supporting additional information, such as device identity and/or location information.

In one embodiment, system 1900 can be configured such that a device with a shared IMSI does not or should not register with an MSC/VLR that already has a device with the same IMSI registered to it. For example, device 1910B can be operating in Location B where the MSC/VLR 1945B is not part of an overlapping pool of MSC/VLRs into (or otherwise does not have a registration service area that covers) Location A.

In one embodiment at 1904, the MSC/VLR 1945B can generate an authentication request directed to an HLR 260B, such as using (or otherwise including) the IMSI. In this example, HLR 260A includes subscriber information for device 1910A (e.g., IMSI and $IMEI_1$) and does not include subscriber information for device 1910B. HLR 260B includes subscriber information for device 1910B (e.g., IMSI and $IMEI_2$) and does not include subscriber information for device 1910A. Authentication triplets can be obtained and the registration process can be completed for device 1910B.

In one or more embodiments, system 1900 can utilize an identity provisioning function 1999 to provide various network elements (e.g., one or more of the MSC/VLR 1945A, 1945B, the HLR 260A, 260B, and/or other network elements) with network provisioning data such one or more of IMSIs, unique device identifiers, and so forth.

In one or more embodiments, movement of a communication device can be monitored. Responsive to a determination that the communication device has moved into a different registration service area (e.g., of an MSC/VLR or MME), actions can be taken to eliminate or mitigate any registration problems. For example, another IMSI can be reassigned to the device that has newly moved into the registration service area if the previous IMSI is already being used by another device in that registration area. In one embodiment, the reassigning of the new IMSI can be via an OTA interface, such as through use of the registration simulation platform 675. For example, an identity proxy function can determine that a device with a shared IMSI has moved into another registration service area. In another embodiment, an MSC/VLR or MME can initiate an IMSI change. In one or more embodiments, an RNC can select the MSC/VLR from a pool based on two factors, the IMSI and location area. In one embodiment, the initial LOCATION UPDATE message can include the IMSI and location area. In another embodiment, an address of the HLR can be hardcoded into the MSC/VLR for the IMSI. In another embodiment, an address of the HLR can be hardcoded into the MSC/VLR for a combination of an IMSI and device location. In one embodiment, if the AUC is separate from the HLR, then the AUC can be mapped to one and only one HLR or the AUC can able to distinguish subscribers/users through the combination of IMSI, HLR address, and secret keys. In one embodiment, the identity provisioning function can create the mappings between the IMSI, location, MSC/VLR, HLR, AUC (e.g., if separate), and/or any other device identifier. In another embodiment, if the MSC/VLRs are not pooled, then the RNC can simply forward the registration message to the MSC/VLR it is attached to. In another embodiment, the movement of devices with shared IMSIs across MSC/VLR borders can be supported with the identity proxy function. If one of these devices is moved to the location of another device, the identity proxy function can prevent "duplicate registrations" if the MSC/VLR is not capable of supporting multiple instances of the same IMSI. One or more of these examples described herein can be applied to an MME as opposed to the MSC/VLR.

Figure 20:
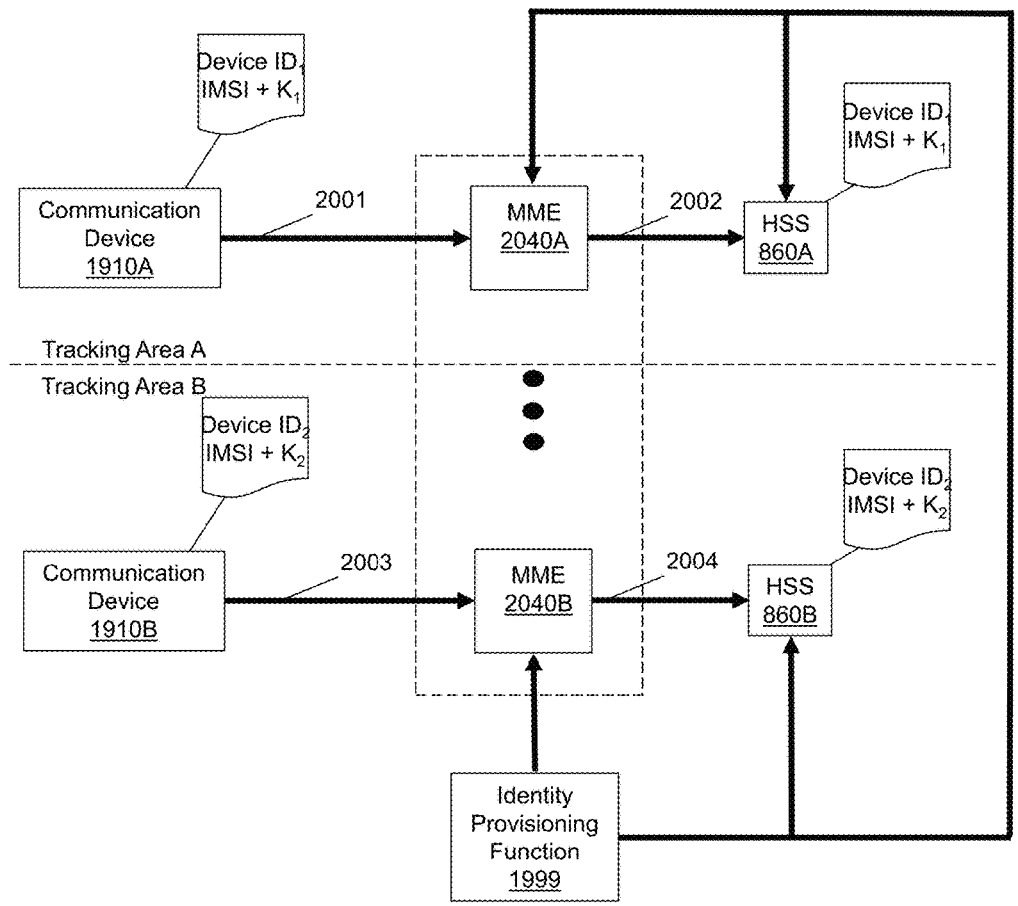

FIG. 20 illustrates a portion of a system 2000 that provides communication services to end user devices or other devices, such as communication devices 1910A and 1910B. System 2000 can be part of or combined with all or a portion of system 800 of FIG. 8, system 1000 of FIG. 10, system 1100 of FIG. 11, system 1300 of FIG. 13, or another network such as an EPS, GPRS or UMTS network. The communication devices 1910A and 1910B can be various types of devices such as an M2M device, an IoT device, a smart appliance, a utility meter, a fixed device, a mobile device, a vehicle communication system, or other devices that utilize an IMSI for establishing communication services. The types of communication services can vary including voice services, video, data and/or messaging. System 2000 enables the same IMSI to be utilized by more than one communication device by segregating the locations of the devices using the same IMSI. System 2000 provides for registration of communication devices through use of a registration function, such as an MME and/or HSS in an LTE network.

System 2000 may or may not include intermediate network components in the message exchange paths. System 2000 illustrates a registration by a communication device 1910A utilizing an IMSI that is shared with one or more other communication devices (illustrated as 1910B). Each of the communication devices 1910A and 1910B can have unique device identification information (e.g., a GUTI, eUICC ID information, MAC address, and so forth) and can also utilize their own secret keys for initiating and/or performing the registration process (e.g., generating an RES).

In one embodiment at 2001, a first communication device 1910A can request registration with the network where the registration request is received by the MME 2040A. In one embodiment, the first communication device 1910A can send an IMSI to the MME 2040A.

In one embodiment, system 2000 can be configured such that a device with a shared IMSI does not or should not register with an MME that already has a device with the same IMSI registered to it (or otherwise designated to that registration service area). In one embodiment, an identity proxy function can prevent or otherwise mitigate a shared IMSI from registration to an MME that already has the shared IMSI registered for a different device. In one embodiment, there is only one IMSI per MME service area unless the MME can support multiple instances of an IMSI. The constraint of one IMSI instance per Tracking Area (TA) can relate to the process in which an eNB selects the MME.

In one embodiment, device 1910A can be operating in Tracking Area A where the MME 2040A is not part of an overlapping pool of MMEs into (or otherwise does not have a registration service area that covers) Tracking Area B. In another embodiment, the particular MME 2040A can be selected from among a group of MMEs based on the IMSI (or an IMSI hash) and/or other determinative information including location data (e.g., TA), such as by the eNB. In this example, there can be only one instance of a shared IMSI per MME registration service area such as the TA area (e.g., Tracking Area A or Tracking Area n B). In another embodiment, the particular communication device (e.g., device 1910A) can be intended to operate within that designated registration service area and/or movement of the particular communication can be monitored to detect if the particular device moves out of this designated registration service area. In one embodiment, the mapping of the IMSI to an HSS can be static and hard coded in the selected MME 2040A. In one embodiment as part of the UE Attach, the eNB can query a Domain Name Server (DNS) Server using the TA for the address of the MME it should provide to that UE. In one embodiment, the query to the DNS server can be based on IMSI and TA.

In one or more embodiments, unique device identification information may not be initially obtained with the IMSI. In one or more embodiments, unique device identification information may be obtained to facilitate the registration process such as a GUTI, a unique device identifier associated with an eUICC, and so forth. In another embodiment, an Identify Response can be utilized for delivering this information from the communication device 1910A to the MME 2040A. Other techniques for obtaining the unique device identifier can also be employed by system 2000, including use of registration simulation platform 675 of FIG. 8.

In one embodiment at 2002, the MME 2040A can generate an authentication request directed to an HSS 860A, such as using (or otherwise including) the IMSI. Continuing with this example, the HSS 860A may not need to utilize (and/or know) any unique device identifier since it only has one instance of the IMSI and can rely on that IMSI for its database lookup. Once the HSS 860A receives the authentication request, the HSS can provide authentication vectors to the MME 2040A based on the IMSI. The MME 2040A can receive the authentication vectors from the HSS 860A and can continue the authentication procedure with the first communication device 1910A to enable completion of the registration process.

In one embodiment, system 2000 may or may not operate without utilizing the registration simulation platform 675 (e.g., illustrated in FIG. 8). In another embodiment, system 2000 may or may not operate without utilizing the identity proxy function 850 (e.g., illustrated in FIG. 8) positioned between the MME 2040A and the communication device 1910A.

In one embodiment at 2003, a second communication device 1910B can request registration with the network where the registration request is received by the MME 2040B. In one embodiment, the second communication device 1910B can send an IMSI to the MME 2040B.

In one embodiment, system 2000 can be configured such that a device with a shared IMSI does not or should not register with an MME that already has a device with the same IMSI registered to it. For example, device 1910B can be operating in Tracking Area B where the MME 2040B is not part of an overlapping pool of MMEs into (or otherwise does not have a registration service area that covers) Tracking Area B.

In one embodiment at 2004, the MME 2040B can generate an authentication request directed to an HSS 860B, such as using (or otherwise including) the IMSI. In this example, HSS 860A includes subscriber information for device 1910A (e.g., IMSI and device identification) and does not include subscriber information for device 1910B. HSS 860B includes subscriber information for device 1910B (e.g., IMSI and device identification) and does not include subscriber information for device 1910A. Authentication vectors can be obtained and the registration process can be completed for device 1910B.

In one or more embodiments, system 2000 can utilize an identity provisioning function 1999 to provide various network elements (e.g., one or more of the MME 1945A, 1945B, the HSS 860A, 860B, and/or other network elements) with network provisioning data such one or more of IMSIs, unique device identifiers, and so forth.

In one or more embodiments, movement of a communication device can be monitored. Responsive to a determination that the communication device has moved into a different registration service area (e.g., of an MSC/VLR or MME), actions can be taken to eliminate or mitigate any registration problems. For example, another IMSI can be reassigned to the device that has newly moved into the registration service area if the previous IMSI is already being used by another device in that registration area. In one embodiment, the reassigning of the new IMSI can be via an OTA interface, such as through use of the registration simulation platform 675.

Figure 21:
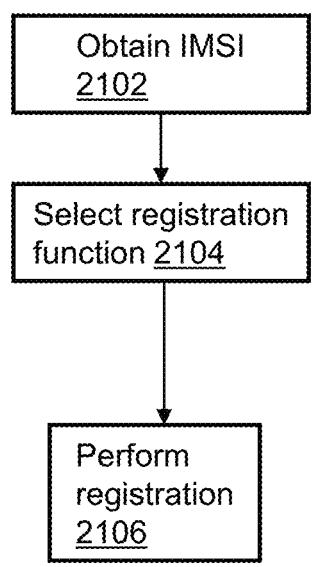
FIG. 21 depicts another illustrative embodiment of a method that provides communication services and enables use of the same mobile subscriber identification information by multiple communication devices at different locations.

FIG. 21 depicts an illustrative embodiment of a method 2100 used by systems 1900 and/or 2000 for facilitating the use of a same IMSI by more than one communication device (e.g., Iot devices, M2M devices, fixed communication devices, or other types of communication devices). One or more of the steps of method 2100 can be performed by various network elements, such as a registration function, a VLR, an HLR, an MME, an HSS, and/or by other devices described in FIGS. 2-6, 8-11, 13, 15, 17, 19 and 20. At 2102, an IMSI can be received that is associated with a first communication device attempting to register with a network. The IMSI can be assigned to more than one communication device. The communication devices can be located remotely from each other, such as in different registration service areas. In one embodiment, the IMSI can be shared by communication devices of a same type (e.g. a smart meter). In one embodiment, the HLRs and/or HSSs can be established according to device types (e.g. utility reading devices).

For instance, the IMSI can be part of a registration request that is generated by or caused to be generated by a communication device. At 2104, an appropriate network element, registration function or other server (e.g., an MSC/VLR or MME) can be selected (e.g., from among an available group) for processing the registration request. For example, the communication device can be operating in an area where either the MSC and/or MME are not part of an overlapping pool. In another embodiment for EPS, the eNBs can use both TA and IMSI to select the MME (e.g., from among an available group). In another embodiment, a selection of the MSC/VLR (e.g., from among an available group) can be based on the IMSI (or IMSI hash) by the RNC. In these examples, there can be only one instance of a shared IMSI per MSC or MME area and the device corresponding to this IMSI is intended not to move from this area. In one embodiment, a determination of whether the IMSI is a shared IMSI can be made such as based on provisioning data provided by an identity proxy function that notifies various network elements of shared IMSIs, intended device locations, and so forth. For example, an MSC/VLR or MME can determine that the IMSI is included in a designated group of IMSIs that are shared by multiple devices according to a list provided by the identity proxy function. In this example, if the IMSI is not part of the designated group of IMSIs then the registration process can be continued (with or without selecting a particular MSC/VLR or MME).

In one embodiment at 2106 the registration process can be performed such as by transmitting an authentication request from the selected MSC/VLR or MME to an HLR or HSS (respectively), where the HLR or HSS stores first subscriber information including the IMSI that is indexed to the first communication device without storing second subscriber information including the single IMSI that is indexed to a second communication device. In this example, a second registration function can store the second subscriber information but does not store the first subscriber information. The transmitting of the authentication request can enable the first communication device to complete a registration process. The use of the same IMSI for more than one device as described with respect to FIGS. 19-21 can also be utilized with one or more features described with respect to other embodiments herein, such as OTA provisioning utilizing a registration simulation, bootstrap IMSIs for enabling provisioning of a same IMSI to more than one device, disabling devices from utilizing a shared IMSI such as for suspension of services, and so forth. In one or more embodiments, an identity proxy function and/or an identity provisioning function can be used for enabling various features described with respect to the embodiments of FIGS. 2-21.

In one or more embodiments, the use of shared IMSIs can be subject to a screening process during registration to eliminate or mitigate any registration problems. For example, an identity proxy function 250, 850 (illustrated in FIGS. 2 and 8, respectively) can be utilized so that if a device moves into a registration service area where that shared IMSI is already being utilized then the identity proxy function can take appropriate action, such as disabling use of the shared IMSI by the device that has moved and/or reassigned another IMSI to that particular device. In one embodiment, the identity proxy function 250, 850 can have a list of shared IMSIs and/or unique device identifiers for shared IMSIs and their corresponding devices that are being utilized in that registration service area. This information can be utilized as part of the screening process by obtaining the necessary information for comparison to the listing as described herein in other embodiments.

In one or more embodiments, identity proxy and/or provisioning functions can be used for management of shared IMSIs among two or more devices, including where one of the devices moves into a service area (e.g., a registration service area of a VLR or MME) of another device. For example, an identity proxy function can determine that a registration request is coming from a "new" device, such as a smart appliance that has been moved into a new service area (as opposed to a smart appliance that has already registered and/or is re-registering with the network). In one embodiment, the identity proxy function can intercept all registration attempts using a shared IMSI and can then determine or otherwise identify the device that is requesting registration. For example, the identity proxy function can have policies (e.g., logic with registration rules) instructing it to do so. In one embodiment, the identity proxy function can simulate a registration and can cause the IMSI used by the device to be changed to another value (i.e., a new IMSI), such as where it is determined that the shared IMSI should not be used by the device (e.g., the shared IMSI is already being utilized by a device in the particular service area, a limited use or pay-for-service IMSI is intended to be used by the particular device, and so forth).

In one or more embodiments, devices can move "locally" (i.e., within a VLR or MME service area) and re-register with the network. In this example, if there are no other instances of the shared IMSI in use (e.g., the IMSI is not already registered via the VLR or MME with the network) then the identity proxy function can verify the identity of the device and can allow the registration request to go through (e.g., to the VLR or MME) to complete the registration process. If an IMSI adjustment is desired or needed, then an OTA can be implemented to change the IMSI if necessary.

In one or more embodiments, the device may move into a different VLR or MME service area. The identity of the device seeking registration can be determined using the identity proxy function. For example, the identity proxy function can be provisioned with logic to know that it needs to perform this check. If the IMSI is not in use in this service area, and/or other requirements are met (e.g., the particular subscriber is authorized to move the device into this service area), the device can be permitted to register utilizing the IMSI. If on the other hand there is another use of the same IMSI by another device in that service area, then the identity proxy function can cause a registration simulation to enable an OTA change of the IMSI for the new device seeking registration. This OTA change information can also be propagated to other network elements to facilitate registration or a subsequent registration (at this service area or at a different service area). In one or more embodiments, the "binding" or designation between a device and its intended location can be reflected in policies (e.g., information) that are provided to the identity proxy function. In one or more embodiments, notification of movement by a device into a new service area and/or reassignment of a new IMSI to a device can be provided to the subscriber of the particular device, such as via a user interface of the device, a billing statement, a user interface of another device of the subscriber and so forth. In another embodiment, the reassignment of the IMSI to a device can be performed seamlessly without any notification to the subscriber.

In one or more embodiments, the network can send out a single OTA message to two or more devices using a designated transport key (e.g., a single transport key), where the two or more devices are utilizing the same IMSI. In this example, a first device can already be registered with the network and the second device can be the device that has moved into the service area and is registering. Further to this example, only the device with the corresponding transport key can interpret the message (e.g., a message causing the UICC to change the IMSI). The other device(s) will not have the correct transport key and will not be able to interpret the message so that their IMSI(s) remain unchanged. In one embodiment, this OTA technique can be utilized with alternate access network such as Wi-Fi, Bluetooth, NFC, and/or a wired broadband connection. In one or more embodiments, paging a shared IMSI can result in a response(s) being rejected by the VLR or MME, which are then intercepted by the identity proxy function. In one embodiment, paging a shared IMSI can be performed by the network to determine how many instances of the IMSI are in use in a particular area. In one embodiment, the VLR or MME can ignore a duplicate paging response. For instance, the identity proxy function can maintain a record of the initial page which can be correlated to a response from the intended recipient of the device (i.e., the device that is intended to be reassigned a different IMSI).

Figure 22:
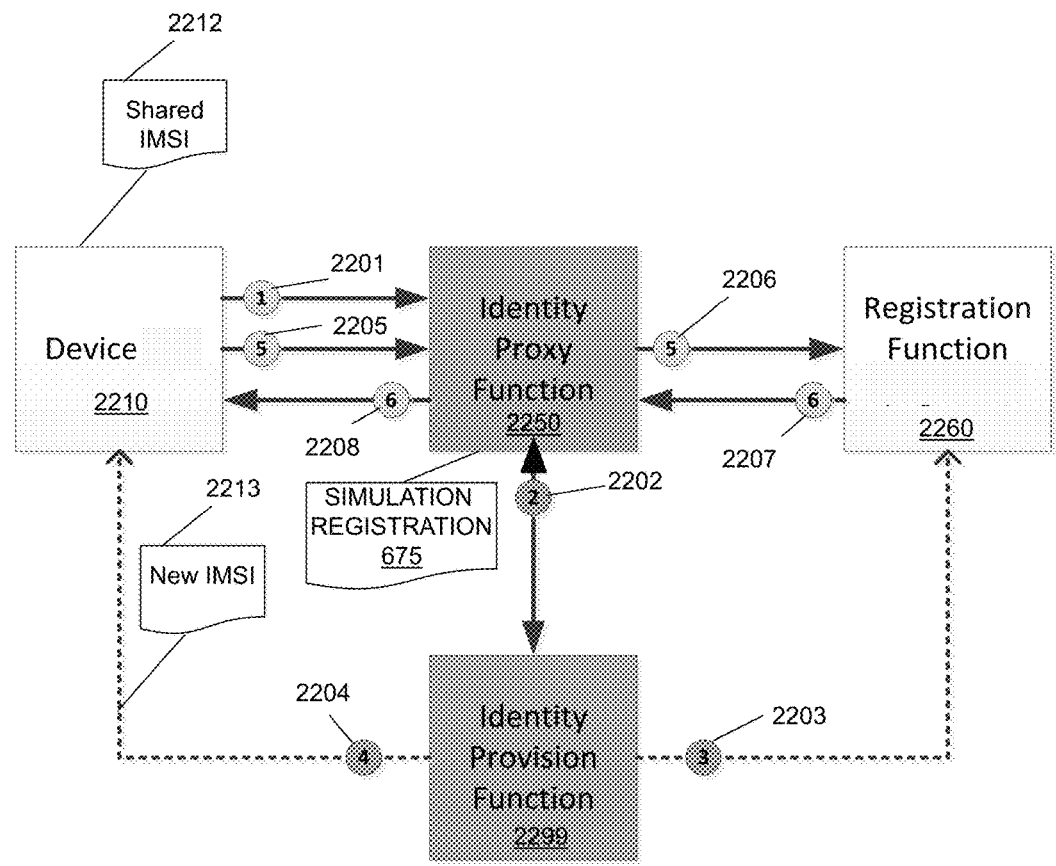
FIG. 22 depicts another illustrative embodiment of a system that provides for use of a same mobile subscriber identification information by more than one communication device.

FIG. 22 illustrates a portion of a system 2200 that provides communication services to end user devices or other devices, such as communication device 2210. System 2200 can be part of or combined with all or a portion of system 800 of FIG. 8, system 1000 of FIG. 10, system 1100 of FIG. 11, system 1300 of FIG. 13, or another network such as an EPS, GPRS or UMTS network. The communication device 2210 can be various types of devices such as an M2M device, an IoT device, a smart appliance, a utility meter, a fixed device, a mobile device, a vehicle communication system, or other devices that utilize an IMSI for establishing communication services. The types of communication services can vary including voice services, video, data and/or messaging. In one embodiment, system 2200 enables the same IMSI to be utilized by more than one communication device based on intended locations of devices. A Reassignment of an IMSI can be implemented where it is detected that two or more devices utilizing a same IMSI are present in a same area, such as if a smart appliance is moved to a different home that is in a same registration area of a VLR or MME of another smart appliance that utilizes the same IMSI. System 2200 can provide for registration of communication devices through use of a registration function, such as an MCS/VLR and/or HLR in a GSM network or an MME and/or HSS in an LTE network.

System 2200 may or may not include intermediate network components in the message exchange paths. System 2200 illustrates a registration by the communication device 2210 utilizing an IMSI 2212 that is shared with one or more other communication devices (not shown). Each of the communication devices sharing the same IMSI can have unique device identification information (e.g., a IMEI, GUTI, eUICC ID information, MAC address, and so forth) and can also utilize their own secret keys for initiating and/or performing the registration process (e.g., generating a SRES or a RES).

In the example of system 2200, the IMSI 2212 being utilized by communication device 2210 is also being utilized by another communication device (which may or may not be already registered with the network). In this embodiment, an identity proxy function 2250 can intercept or otherwise receive the IMSI, such as based on intercepting a registration request (e.g., prior to the registration request being provided to an MSC/VLR and/or HLR in GSM as illustrated in FIG. 2 or prior to the registration request being provided to an MME and/or HSS in LTE as illustrated in FIG. 8). In one embodiment, the IMSI 2212 can be a shared bootstrap IMSI that provides for limited functionality such as being limited to bootstrap functions (e.g., functions that enable communicating with the network for administrative reasons including obtaining another IMSI), a pay for service mode, and so forth.

In one embodiment at 2201, the communication device 2210 can request registration with the network where the identity proxy function 2250 can determine whether or not the particular IMSI is part of a group of designated IMSIs. In one embodiment, the group of designated IMSIs can include IMSIs that have been shared among more than one device. In another embodiment, the shared IMSIs are intended to be utilized by devices that are in different locations so that registration conflicts do not arise. For instance, the same IMSI can be utilized to register two different communication devices without creating a registration conflict where the devices are in different registration areas associated with different registration functions, such as different VLRs or different MMEs and different HLRs or different HSSs.

In one embodiment, the identity proxy function 2250 can identify the particular device requesting registration with the network. For example, device identification information (e.g., an IMEI or GUTI) can be obtained for the communication device 2210, such as being received from device 2210 (e.g., in the registration request) or obtained from another network element (e.g., from an Identification Request sent to the old MME/SGSN to request the IMSI). In one embodiment, identification of the communication device 2210 can be based on simulating a registration process and forcing a generation of an SRES (in GSM) or RES (in LTE) by the communication device 2210, as described herein.

In one embodiment, registration simulation platform 675 can be utilized (e.g., positioned between the communication device 2210 and the VLR in GSM or positioned between the communication device and the MME in LTE). As described herein, the registration simulation platform 675 can send an OTA message to the communication device 2210 that can cause the modification of the device IMSI and can cause the device to perform a re-registration to the target network. For example, the registration simulation platform 675 can comprise a set of functional elements that exist in the target network including an MSC/VLR, a MME, a HLR or HSS, an AUC, a SMSC, an OTA platform, a SGW, a PGW, an EIR and/or any combination thereof. In one embodiment, the registration simulation platform 675 can simulate a registration of the communication device 2210, identify the communication device from the secret key and/or from other identification information (e.g., IMEI or GUTI) and/or can cause the communication device to change from the IMSI 2211 to a new IMSI 2213 via OTA. The new IMSI 2213 can be from various sources, such as from a listing of IMSIs that are designated for reassignment and not to be shared, a listing of IMSIs that are designated for reassignment and are to be shared such as a shared IMSI that is currently being utilized in a different service area, and so forth.

In one embodiment, the identity proxy function 2250 and/or the identity provisioning function 2299 can determine whether the original device 2210 is eligible for services. If the device 2210 is not eligible for services (e.g., device is not authorized to operate in the service area of the particular VLR or MME, suspension of services for non-payment or other reasons, device/UICC is not compatible with network or services, and so forth) then the identity proxy function 2250 can cause or otherwise facilitate or enable provisioning information to be provided (e.g., via the identity provisioning function 2299) to the device 2210 to cause the device to disable its use of the IMSI 2212. In one embodiment, the IMSI 2212 can then be removed from the designated listing of shared IMSIs.

In one embodiment, if the communication device 2210 is eligible for services but the shared IMSI is already being utilized in the service area by another device then the identity provisioning function 2299 can implement a reassignment of another IMSI 2213 for the device 2210. For example at 2202, responsive to a determination that an IMSI reassignment is warranted, the identity proxy function 2250 can provide a request to the identity provisioning function 2299 for the other IMSI 2213 or the determination can be made by the identity provisioning function 2299. In one embodiment, the device 2210 can continue to utilize its original secret key (which is mapped to the original device by the network such as in an HLR or HSS). In one embodiment, the determination of eligibility for services can be made by the identity provisioning function 2299 such that the identity proxy function 2250 automatically transmits the request to the identity provisioning function 2299 for another IMSI responsive to a determination that the shared IMSI is being utilized by a device that is new to the service area and/or that another device is already registered with the shared IMSI, and the identity provisioning function 2299 can approve or deny the request.

Continuing with this example at 2203, the identity provisioning function 2299 can notify various network elements (e.g., the HLR 260, the AUC 270, an EIR, the HSS 860, and/or a national SIM manager) that the communication device 2210 is now associated with the particular reassigned IMSI 2213. In one embodiment, this transmitting of network provisioning data can cause the HLR 260 or HSS 860 to delete (or otherwise note the change of) an original IMSI assignment for the communication device 2210 and/or add the new IMSI assignment for the communication device 2210 in its database. In one embodiment, this notification can cause the HLR 260 or the HSS 860 to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth.

In one embodiment at 2204, the identity provisioning function 2299 can provide provisioning information to the communication device 2210, such as via an OTA interface (e.g., using an SMS protocol such as through registration simulation platform 675). The provisioning information can cause the UICC to be adjusted so that the reassigned IMSI 2213 is now utilized by the communication device 2210 for communication services. At 2205, the communication device 2210 can then attempt to re-register utilizing the reassigned IMSI 2213. The identity proxy function 2250 can receive the re-registration request for the communication device 2210, which now includes the reassigned IMSI 2213, and at 2206-2208 the registration process (e.g., via the VLR 245 and the HLR 260 in system 200 or via the MME 840 and the HSS 860 in LTE) can be completed based on the reassigned IMSI 2213. In one or more embodiments, the identity provisioning function 2299 can provision an NSM with the reassigned IMSI 2213 for the device 2210 where the secret key of the device 2210 is already known. In another embodiment, the identity provisioning function 2299 can be integrated with equipment of the NSM. In one embodiment, a billing system can detect the change in IMSI for the UICC and can provision some or all other network elements necessary for enabling call processing (e.g., HLR 260, AUC 270, MME 840 and/or HSS 860). In one embodiment, the identity proxy function 2250 and/or the identity provisioning function 2299 can provide instructions to the communication device 2210 that causes the communication device to initiate a re-registration utilizing the re-assigned IMSI 1313.

In one embodiment, the identity proxy function 2250 and/or the identity provisioning function can determine that the communication device 2210 has been moved to a different location (i.e., a different service area of a VLR or MME). The different location can be one where another device is using the same shared IMSI. In one embodiment, a temporary or particular IMSI can be reassigned to devices entering the different location. For instance, a reassigned temporary IMSI can limit services of the device while it is present in the different location, such as limiting type, amount and/or time of services. In one embodiment, the device can be reassigned the previous shared IMSI upon returning to its original location. In one embodiment, the identity proxy function 2250 can determine whether the device has been moved based on information associated with a registration request, such as the location area, tracking area, etc.

Figure 23:
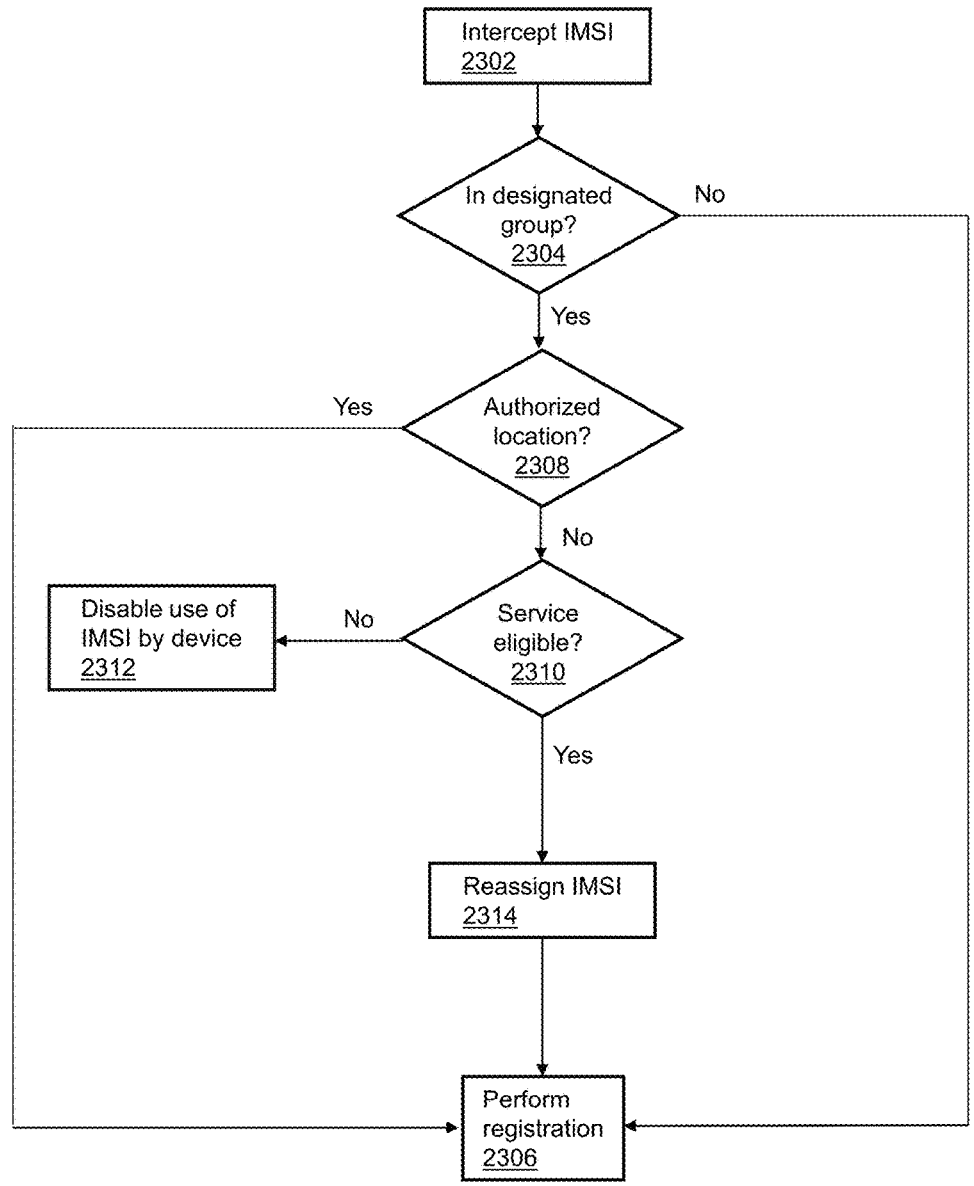
FIG. 23 depicts another illustrative embodiment of a method that provides communication services and enables use of the same mobile subscriber identification information by multiple communication devices.

FIG. 23 depicts an illustrative embodiment of a method 2300 used by system 2200 for facilitating the reassignment of IMSIs where a device is attempting to register in a location where the same IMSI is being used by another device. One or more of the steps of method 2300 can be performed by the identity proxy function 2250, the identity provisioning function 2299 and/or by other devices described in FIGS. 2-6, 8-11, 13, 15, 17, 19-20, and 22. At 2302, an IMSI can be received that is associated with a communication device. For instance, the IMSI can be part of a registration request that is generated by or caused to be generated by the communication device 2210. At 2304, a determination of the status of the IMSI can be made. For example, the identity proxy function 2250 can determine whether the IMSI is included in a designated group of IMSIs that are shared amongst devices (e.g., devices that are intended to operate in different service areas of a VLR or MME). In one embodiment, if the IMSI is not part of the designated group of IMSIs then the registration process can be continued by forwarding the registration request and/or IMSI to the registration function 2260 (e.g., MSC/VLR in GSM or MME in LTE) to perform the registration at 2306. If on the other hand the IMSI is part of the designated group of IMSIs then a determination can be made at 2308 as to whether the registration request is for a device that is operating in an authorized location. The identification of the particular device can be performed in a number of different ways, such as based on device identification information (e.g., IMEI or GUTI), simulating a registration process to force an SRES or RES generation by the device from which the device identification can be determined, and so forth. In one embodiment, the identity proxy function 2250 can have access to a mapping of devices that have shared IMSIs and that are authorized to operate in the particular service area of the VLR or MME.

In one embodiment at 2308, if the registration request and the IMSI are from a device that is authorized to operate in the service area then the registration process can be continued by forwarding the registration request and/or IMSI to the MSC/VLR (in GSM) or the MME (in LTE) to perform the registration at 2306. For instance, a smart appliance may be moved within a premises or otherwise become unregistered with the network and may be seeking re-registration. If on the other hand, the registration request and the IMSI are from another device that has not been authorized to operate in the service area then a determination can be made at 2310 as to whether the subscriber of the device is eligible for communication services. Eligibility for services can be based on various factors and can be determined by various components or a combination of components, such as based on billing, device hardware requirements, device software requirements, user requests, and so forth.

In one embodiment, if the subscriber of the device is not eligible for communication services then at 2312 provisioning information can be provided to the original device (e.g., via OTA provisioning by the identity provisioning function 2299 such as through use of registration simulation platform 675) that causes disabling the use of the particular IMSI by the device. If on the other hand, the subscriber of the device is eligible for communication services then at 2314 the device can be provisioned (e.g., utilizing registration simulation platform 675) with another IMSI. In one embodiment, the new IMSI 2213 that is reassigned to the device 2210 can be selected from a listing of designated IMSI that are to be reassigned to devices and/or that may be shared with another device in a different service area. Method 2300 can then proceed to 2306 where the registration process is completed, such as by forwarding instructions to the communication device 2210 to cause a re-registration. In one embodiment, the device 2210 upon detecting that it is outside of its intended service area can utilize a bootstrap IMSI for registration and a new IMSI can be utilized by the device to access services since the bootstrap IMSI may not provide direct access to the services.

In another embodiment, a second communication device can be re-assigned a temporary IMSI (with full or limited services) when a first communication device is already registered to the network using the shared IMSI. In another embodiment, when the first communication device is no longer registered to the network then the second communication device can be reassigned the original IMSI that is previously had utilized.

While for purposes of simplicity of explanation, the respective processes are shown and described as a series of blocks in FIG. 23, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one embodiment, a first device can register with a shared IMSI and the identity proxy function can intercept a registration request from a second device attempting to register with the same IMSI. If the IMEI (or other device identification) of the second device is not provided during registration and/or is not in an accessible database, then the identity proxy function can simulate operations of a VLR or MME to cause an SRES or RES to identify the second device. In one embodiment, the second device can register with a simulated VLR or MME. The simulated VLR or MME can perform device paging. In one embodiment, a paging area can be reduced to mitigate or avoid a registration conflict, where the paging area is focused on a particular location of the second device to avoid paging the first device. In one embodiment, the identity provisioning function can provide OTA provisioning to the second device using a transport key of the second device. The first device can ignore the OTA message because the transport key of the first device is different from the transport key in the OTA message. The second device can receive and comprehend the OTA messaging because it uses the corresponding transport key. The OTA provisioning can cause a new IMSI (e.g., a temporary IMSI or another shared IMSI where it is shared with a device in a different service area) to be programmed in second device to avoid conflict while both devices are in the same service area (i.e., on the same VLR or MME). In one embodiment, the reassignment of IMSIs is performed on devices having a UICC that is programmed with a transport key. In another embodiment, the identity proxy function and/or identity provisioning function can determine whether a re-located device attempting to register with a shared IMSI has a transport key as a condition for reassignment of an IMSI.

In one embodiment, a first device has registered with the network and is pageable through its IMSI. The first device may not be assigned a TMSI or GUTI. If the first device is assigned a TMSI or GUTI, the network, after failed paging attempts, can page the largest area possible with the IMSI. Continuing with this example, a second device attempts to register with the same IMSI. This registration can be intercepted by the identity proxy function and can be diverted to a registration simulation platform 675. The registration simulation platform 675 can simulate a registration. In one embodiment, the registration simulation platform 675 can assign a unique TMSI or GUTI, thus minimizing the likelihood of a duplicate page response. In one embodiment, the registration simulation platform 675 can be set up to not page using the IMSI and to limit the size of the paging area it uses. This can prevent or mitigate the first device from responding to a page intended for the second device. In one embodiment, the registration simulation platform 675 can instruct the second device to change its IMSI. This can happen during the simulated registration or after the simulated registration through the use of paging and OTA. Once the second device has a different IMSI, then there is no longer a situation where paging either IMSI results in multiple responses. In one or more embodiments, paging and OTA provisioning are facilitated by assignment of a TMSI or GUTI by the registration simulation platform 675 and by not using the IMSI for paging. In one embodiment, once the second device successfully registers with the registration simulation platform 675 utilizing the original shared IMSI 2212, a trigger can be sent (e.g., via the identity proxy function 2250) to an OTA platform with its IMSI and/or other information. The OTA platform can then send an update using the keys of the original IMSI (e.g., where there is no more than one additional IMSIs).

In one or more embodiments, the network and/or communication devices can be adapted to support paging where multiple devices are utilizing the same IMSI in a particular service area. In one example, the paging can be performed utilizing the shared IMSI and also including some other information that is unique to the intended recipient device, such as a device identification. In this example, a response to the page can be generated by the intended recipient device while another device using the same IMSI will not respond to the page because the unique identifier will not match this other device. Continuing with this example, the network element(s) can be adapted to adjust paging techniques to include this unique device identification information and the communication devices can be adapted to respond to paging that is directed to the particular device.

In another embodiment, the network can be adapted to allow for paging via an IMSI where the network can distinguish which device is providing the response. For instance, the network can have access to device identification information mapped to particular IMSIs and authorized locations can determine whether the responding device is the unauthorized device that is being reassigned a new IMSI.

In one embodiment, a first device can register with its IMSI and the IMSI is not changed by the network, and a second device registration with the same IMSI can be intercepted, simulated by a registration simulation platform 675, and the IMSI is not yet changed by the registration simulation platform 675. In this example, both devices are registered using their IMSIs. In one embodiment, when either network pages the device, the exemplary embodiments can mitigate or prevent both devices responding to the page, such as paging using a unique device identifier or paging utilizing a TMSI or GUTI. In one embodiment, if the registration simulation platform 675 pages the second device to change the IMSI, it can restrict its paging message to a small area (i.e., where the registration came from) to avoid the page being received by the first device. If the first device were to respond to the page, it would be responding to the network, not the registration simulation platform 675. The network would have no record of paging the first device and therefore the network could ignore the page response from the first device.

In one or more embodiments, device location can be monitored by the network such as via the identity proxy function, the identity provisioning function or some other device to facilitate determining whether a device is authorized or otherwise intended to be operating in a particular location.

Figure 24:
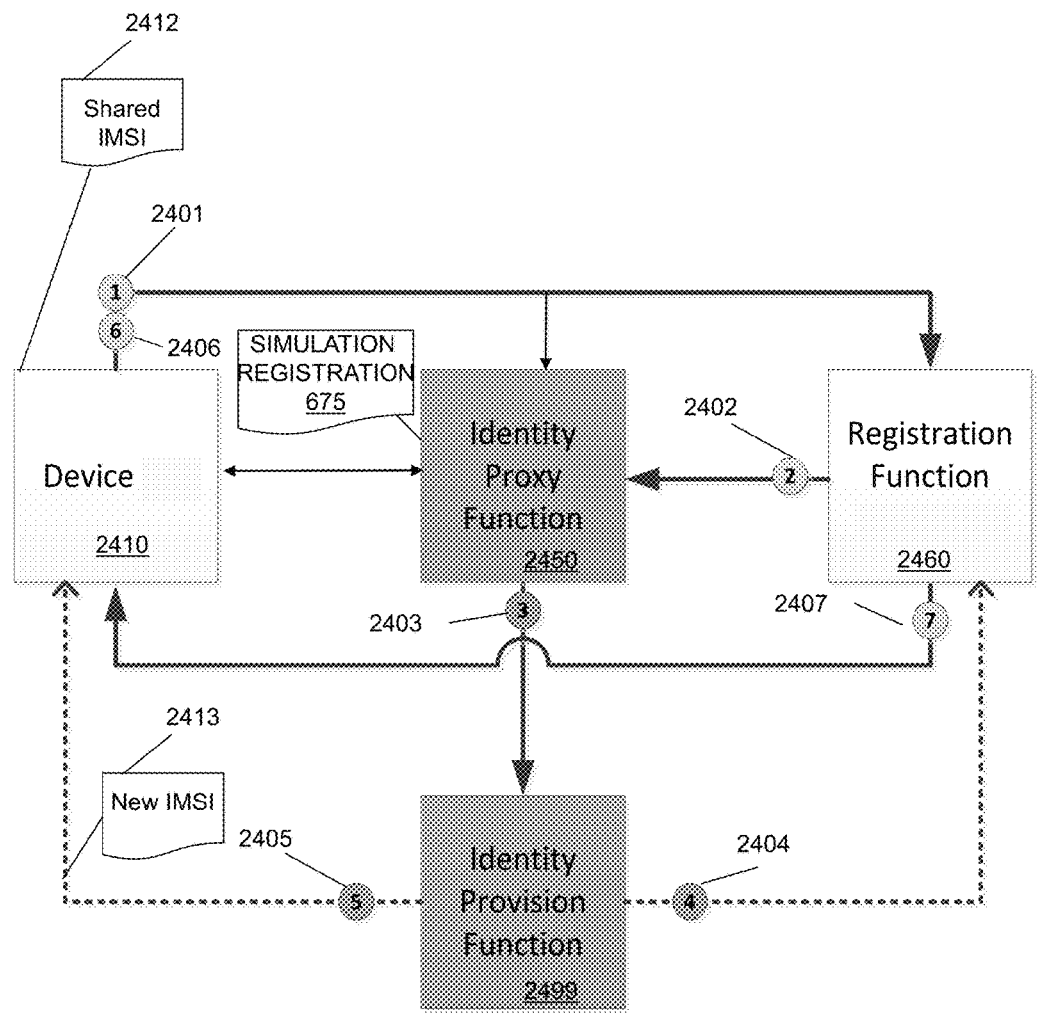
FIG. 24 depicts another illustrative embodiment of a system that provides for use of a same mobile subscriber identification information by more than one communication device according to registration errors.

FIG. 24 illustrates a portion of a system 2400 that provides communication services to end user devices or other devices, such as communication device 2410. System 2400 can be part of or combined with all or a portion of system 800 of FIG. 8, system 1000 of FIG. 10, system 1100 of FIG. 11, system 1300 of FIG. 13, or another network such as an EPS, GPRS or UMTS network. The communication device 2410 can be various types of devices such as an M2M device, an IoT device, a smart appliance, a utility meter, a fixed device, a mobile device, a vehicle communication system, or other devices that utilize an IMSI for establishing communication services. The types of communication services can vary including voice services, video, data and/or messaging.

In one embodiment, system 2400 enables the same IMSI to be utilized by more than one communication device based on intended locations of devices where management of those IMSIs is based on registration error messages. A reassignment of an IMSI can be implemented where it is detected that two or more devices utilizing a same IMSI are present in a same area, such as if a smart appliance is moved to a different home that is in a same registration area of a VLR or MME of another smart appliance that utilizes the same IMSI. System 2400 can provide for registration of communication devices through use of a registration function, such as an MSC/VLR and/or HLR in a GSM network or an MME and/or HSS in an LTE network.

System 2400 may or may not include intermediate network components in the message exchange paths. System 2400 illustrates an attempted registration by the communication device 2410 utilizing an IMSI 2412 that is shared with another communication devices (not shown). The other communication device may or may not be registered with the network. Each of the communication devices sharing the same IMSI can have unique device identification information (e.g., an IMEI, GUTI, eUICC ID information, MAC address, and so forth) and can also utilize their own secret keys for initiating and/or performing the registration process (e.g., generating a SRES or a RES). In one or more embodiments, the secret keys can be known to other network elements (e.g., various registration functions) and/or can be statically linked to, and maintained by, the communication devices.

In one embodiment at 2401, the communication device 2410 can request registration with the network. A registration request (e.g., based upon a shared IMSI that is among a listing of designated shared IMSIs known to the network) can be received by the registration function 2460 (e.g., an MSC/VLR in a GSM network or an MME in an LTE network). In one embodiment, the registration request can also be received by the identity proxy function 2450. For instance, the registration request can be intercepted, or otherwise received by, the identity proxy function 2450 and then forwarded to the registration function 2460.

A registration process can be initiated according to the shared IMSI 2412 and a secret key that is associated with the communication device 2410. The registration function 2460 can be aware of, or otherwise have access to, the secret key that is associated with the communication device 2410. Various registration processes can be applied to ensure authentication of the device and/or subscriber, such as the registration processes described herein with respect to GSM or LTE networks, including a comparison of SRES in GSM or a comparison of RES in LTE or a comparison of XRES in UMTS environment. In one embodiment, the group of designated IMSIs is limited to sharing IMSIs between only two devices. In another embodiment, the group of designated IMSIs can include IMSIs that have been shared among more than two devices.

In one embodiment, the shared IMSIs are intended to be utilized by devices that are in different locations so that registration conflicts are avoided or otherwise mitigated. For instance, the same IMSI can be utilized to register two different communication devices without creating a registration conflict where the devices are in different registration areas associated with different registration functions, such as different VLRs or different MMEs and different HLRs or different HSSs.

In one embodiment at 2402, a registration error can be generated by the registration function 2460 (e.g., an authentication failure message generated by the MSC/VLR and/or HLR in GSM or by the MME and/or HSS in LTE) and can be received by the identity proxy function 2450 from the registration function 2460. In this example, the identity proxy function 2450 can intercept the authentication failure message prior to it being received by the communication device 2410. The particular messaging that makes up the registration request, the registration process and/or the registration error can vary. In one embodiment, the identity proxy function 2450 can determine that the registration error is a valid registration failure for a device that should not be attempting to use the IMSI, such as a third device that is not the original device authorized for the particular location and is not a new device that is new to the location and is sharing the IMSI. In this example, the identity proxy function 2450 can allow the error process (e.g., an authentication failure messaging) to proceed, including delivering a registration error to this third device which is not authorized to be sharing the IMSI.

In one embodiment, where the error message does not include any device identification information and/or the IMSI, the identity proxy function 2450 can ascertain the device identification information and/or IMSI from the registration request that was previously received or intercepted. For instance, when the identity proxy function 2450 detects a registration error message, the identity proxy function 2450 can detect within the message addressing information, message ID information, correlation ID information, and so forth, and can further correlate the error message with the stored registration request previously intercepted. This enables the IMSI and/or device identification information (e.g., GUTI or IMEI) to be determined.

In one embodiment, the identity proxy function 2450 can identify the particular device requesting registration with the network according to device identification information (e.g., an IMEI or GUTI) obtained for the communication device 2410, such as being received from device 2410 (e.g., in the registration request) or obtained from another network element (e.g., from an Identification Request sent to the old MME/SGSN to request the IMSI). In one embodiment, identification of the communication device 2410 can be based on simulating a registration process and forcing a generation of an SRES (in GSM) or RES (in LTE) by the communication device 2410, as described herein.

In another embodiment at 2403, a request for reassignment of another IMSI (e.g., from the listing of the designated IMSIs) or authorization to utilize the shared IMSI 2412 can be provided to the identity provisioning function 2499 from the identity proxy function 2450. For instance, the identity proxy function 2450 can (e.g., in response to receiving the error message) compare the shared IMSI 2412 associated with communication device 2410 to the list of designated IMSIs. The identity proxy function 2450 can further determine the identity of the communication device 2410 (authorized at the present location vs new to the present location) based on device identification information (e.g., an IMEI, GUTI and so forth).

Reassignment of another IMSI 2413 or authorization to use the shared IMSI 2412 (e.g., where the shared IMSI is not being utilized in the particular service area) can be implemented. In one embodiment, the identity provisioning function 2499 can notify the HLR or HSS that the user is valid and the HLR or HSS can perform a database update to enable a subsequent registration utilizing the reassigned IMSI 2413 by the device 2410. In this example, the identity proxy function 2450 can also take action, such as preventing forwarding of the failed registration to the device 2410, to cause the device to reattempt the registration.

In one embodiment, a determination of a subscriber's eligibility for services can be made. Eligibility for services can be based on various factors such as suspension of services for non-payment or other reasons, the device/UICC is no longer compatible with network or services, and so forth. In another embodiment, a determination of a compatibility of service with a UICC of the communication device 2410 can be made. One or both of these determinations can be part of deciding whether to reassign another IMSI 2413, to authorize use of the original IMSI 2412, or to deny services at this particular location to the communication device 2410. These determinations can be made by the identity provisioning function 2499 or can be made by another network element.

If it is determined that the new IMSI 2413 is to be reassigned to the communication device 2410, then at 2404 provisioning information can be provided by the identity provisioning function 2499 to the registration function 2460 which will enable the communication device to register with the network utilizing the reassigned IMSI in conjunction with an original secret key that is associated with the communication device. In one embodiment, if it is determined that the communication device 2410 is to be permitted to reuse its original IMSI 2412 (where the original IMSI 2412 is not being used in this service area), then provisioning information can be provided by the identity provisioning function 2499 to the registration function 2460 which will enable the communication device to register with the network utilizing the original IMSI 2412 in conjunction with the original secret key that is associated with the communication device.

If it is determined that the new IMSI 2413 is to be provisioned to the communication device 2410, then at 2405 provisioning information can be provided by the identity provisioning function 2499 to the communication device 2410 which will include the reassigned IMSI 2413. As an example, the identity provisioning function 2499 can provide the reassigned IMSI 2413 to the communication device 2410 utilizing an OTA interface according to an SMS protocol such as through use of the registration simulation platform 675. Other protocols can also be utilized for the OTA interface including being HTTP-based.

In one embodiment, if it is determined that the communication device 2410 is not to be permitted to reuse its original IMSI 2412, then provisioning information can be provided by the identity provisioning function 2499 to the communication device 2410 to prevent the communication device from attempting to register with the network utilizing the original IMSI 2412. In one embodiment, the identity provisioning function 2499 can further communicate with various network elements (e.g., the identity proxy function 2450, HLR, HSS, EIR, and so forth) so that the network elements are informed of the current state of IMSIs and/or communication devices. For example, if an original device is reassigned another IMSI 2413 or an original device is nullified from using the original IMSI 2412 via provisioning information then the identity provisioning function 2499 can remove the original IMSI (of that original device) from the listing of designated IMSIs. In these examples, the original IMSI 2412 can also then be assigned to another device (if not already reassigned). The device 2410 can be registered in order for the identity provisioning function to change the device's IMSI. This can be part of a simulated registration. In one embodiment, other techniques can be employed that enable OTA interfacing with devices, such as special registration. For example, National Identity Register (NIR) equipment can register devices as warm devices (i.e., providing limited services for non-customers) that allow OTA (e.g. via SMS protocol) to occur. In one or more embodiments, the provisioning of the new IMSI can be performed by utilizing a limited registration that results in the device being a warm device while the IMSI is being provisioned via OTA to that device.

At 2406 if IMSI 2410 has been reassigned to the communication device 2410, then the communication device 2410 can re-register. For example, the provisioning information provided by the identity provisioning function 2499 to the communication device 2410 can cause the communication device to initiate a re-registration. The re-registration request can be received and processed by the registration function 2460 and based on the provisioning procedures at steps 2404 and 2405, a successful registration message can be provided to the communication device 2410 at 2407.

In one or more embodiments, the identity provisioning function 2499 can provision an NSM with the reassigned IMSI 2413 for the device 2410 where the secret key of the device 2410 is already known. In another embodiment, the identity provisioning function 2499 can be integrated with equipment of the NSM. In one embodiment, a billing system can detect the change in IMSI for the UICC and can provision some or all other network elements necessary for enabling call processing (e.g., HLR 260, AUC 270, MME 840 and/or HSS 860). In one embodiment, the identity proxy function 2450 and/or the identity provisioning function 2499 can provide instructions to the communication device 2410 that causes the communication device to initiate a re-registration utilizing the re-assigned IMSI 2413.

In one embodiment, the identity proxy function 2450 and/or the identity provisioning function can determine that the communication device 2410 has been moved to a different location (i.e., a different service area of a VLR or MME). The different location can be one where another device is using the same shared IMSI. In one embodiment, a temporary or particular IMSI can be reassigned to devices entering the different location. For instance, a reassigned temporary IMSI can limit services of the device while it is present in the different location, such as limiting type, amount and/or time of services. In one embodiment, the device can be reassigned the previous shared IMSI upon returning to its original location. In one embodiment, the identity proxy function 2450 can determine whether the device has been moved based on information associated with a registration request, such as the location area, tracking area, etc.

In one or more embodiments, paging and OTA provisioning are facilitated by assignment of a TMSI or GUTI by the registration simulation platform 675 and by not using the IMSI for paging. In one embodiment, once a new device successfully registers with the registration simulation platform 675 utilizing the original shared IMSI 2412, a trigger can be sent (e.g., via the identity proxy function 2450) to an OTA platform. The OTA platform can then send an update using the keys of the original IMSI (e.g., where there is no more than one additional IMSIs). In one or more embodiments, the network and/or communication devices can be adapted to support paging where multiple devices are utilizing the same IMSI in a particular service area. In one example, the paging can be performed utilizing the shared IMSI and also including some other information that is unique to the intended recipient device, such as a device identification.

In another embodiment, the network can be adapted to allow for paging via an IMSI where the network can distinguish which device is providing the response. For instance, the network can have access to device identification information mapped to particular IMSIs and authorized locations, and can determine whether the responding device is the unauthorized device that is being reassigned a new IMSI. In one or more embodiments, device location can be monitored by the network such as via the identity proxy function, the identity provisioning function or some other device to facilitate determining whether a device is authorized or otherwise intended to be operating in a particular location.

Figure 25:
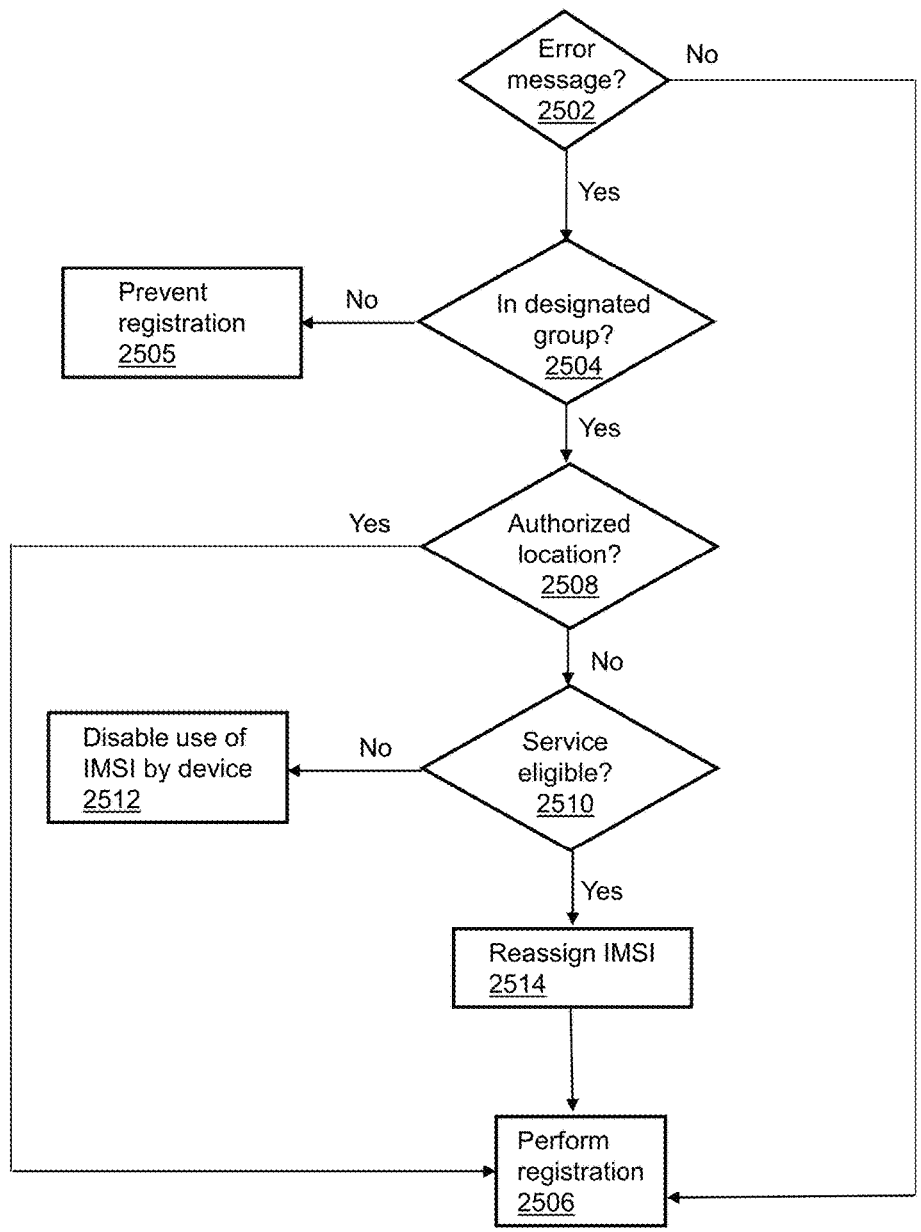
FIG. 25 depicts another illustrative embodiment of a method that provides communication services and enables use of the same mobile subscriber identification information by multiple communication devices according to registration errors.

FIG. 25 depicts an illustrative embodiment of a method 2500 used by system 2400 for facilitating the reassignment of IMSIs where a device is attempting to register in a location where the same IMSI is being used by another device. One or more of the steps of method 2500 can be performed by the identity proxy function 2450, the identity provisioning function 2499 and/or by other devices described in FIGS. 2-6, 8-11, 13, 15, 17, 19-20, 22, and 24. At 2502, a registration error message can be detect or intercepted. For instance, the error message can result from a registration request that is generated by or caused to be generated by a communication device utilizing: one or more of a shared IMSI that is part of the listing of designated IMSIs, a shared IMSI which is already registered to the network at that particular location, a shared IMSI where the device is not authorized to register at that particular location, and so forth. As an example in GSM, the identity proxy function 2450 can receive an authentication failure message from a VLR. As another example in LTE, the identity proxy function 2450 can receive an authentication failure message from an MME.

In one or more embodiments if there is no determination of an error (e.g., the IMSI is not included in the listing of designated IMSIs or the IMSI is a shared IMSI being utilized by a device that is authorized to register at the particular location) then method 2500 can proceed to 2516 so that the registration process can be completed (using the original IMSI) which enables the communication device to obtain services via the network at that particular location.

At 2504, a determination can be made as to whether the error is based on a shared IMSI, such as comparing the IMSI to a list of designated shared IMSIs (e.g., being utilized by devices that are intended to operate in different service areas of a VLR or MME). In one embodiment, if the IMSI is not part of the designated group of IMSIs or it is otherwise determined that the registration error was due to another reason (e.g., the IMSI is a shared IMSI but the device is an unauthorized device) then the registration can be prevented or otherwise terminated at 2505, such as via forwarding a registration failure message to the device and/or notifying a network administrator device of the registration error.

If on the other hand the IMSI is part of the designated group of IMSIs then a determination can be made at 2508 as to whether the registration request is for a device that is operating in an authorized location. The identification of the particular device can be performed in a number of different ways, such as based on device identification information (e.g., IMEI or GUTI), simulating a registration process to force an SRES or RES generation by the device from which the device identification can be determined, and so forth. In one embodiment, the identity proxy function 2450 can have access to a mapping of devices that have shared IMSIs and that are authorized to operate in the particular service area of the VLR or MME.

In one embodiment, if the registration request and the IMSI are from a device that is authorized to operate in the service area then the registration process can be continued by forwarding the registration request and/or IMSI to the MSC/VLR (in GSM) or the MME (in LTE) to perform the registration at 2506. For instance, a utility meter may become unregistered with the network and may be seeking re-registration. If on the other hand, the registration request and the IMSI are from another device that has not been authorized to operate in the service area then a determination can be made at 2510 as to whether the subscriber of the device is eligible for communication services. Eligibility for services can be based on various factors and can be determined by various components or a combination of components, such as based on billing, device hardware requirements, device software requirements, user requests, and so forth.

In one embodiment, if the subscriber of the device is not eligible for communication services then at 2512 provisioning information can be provided to the device (e.g., via OTA provisioning by the identity provisioning function 2599 such as through use of registration simulation platform 675) that causes disabling the use of the particular IMSI by the device. If on the other hand, the subscriber of the device is eligible for communication services then at 2514 the device can be provisioned (e.g., utilizing registration simulation platform 675) with another IMSI.

In one embodiment, the new IMSI 2413 that is reassigned to the device 2410 can be selected from a listing of designated IMSI that are being shared with another device(s) in a different service area so that further registration conflicts are minimized or eliminated. Method 2500 can then proceed to 2506 where the registration process is completed, such as by forwarding instructions to the communication device 2410 to cause a re-registration utilizing the new IMSI 2413.

In one or more embodiments, reassignment of an IMSI for a device that has been re-located to a new service area can be based on other factors. For instance, a type of device can be detected and the decision to reassign can be based on that type, such as allowing reassignment of IMSIs for a smart appliance that has moved to a new location but preventing reassignment of an IMSI for a utility meter that is being used in a new location. In another embodiment, reassignment of IMSIs for devices that have re-located can be limited, such as allowing only a particular number of reassignments or reassigning an IMSI that provides for limited services.

While for purposes of simplicity of explanation, the respective processes are shown and described as a series of blocks in FIG. 25, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 26:
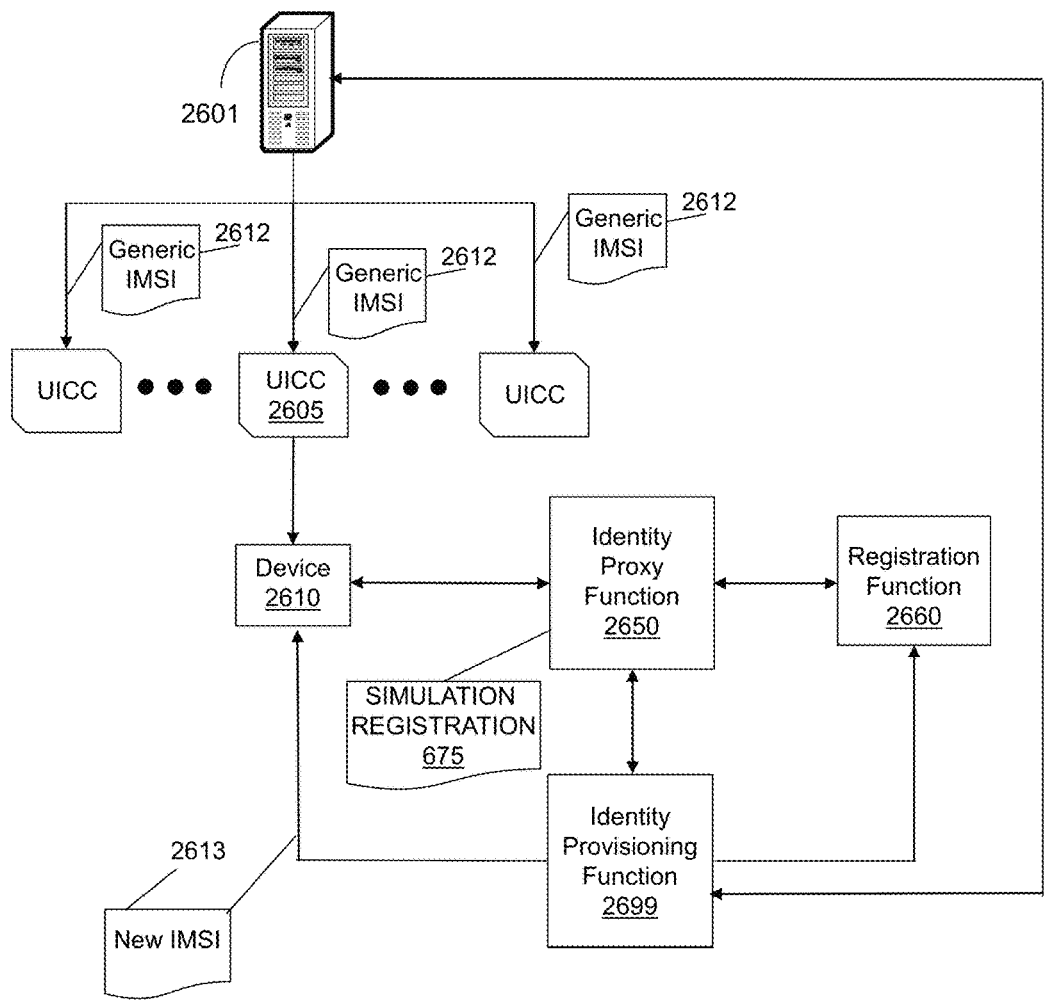
FIGS. 26-27 depict illustrative embodiments of systems that provide for switching between generic and non-generic mobile subscriber identification information.

FIG. 26 illustrates a portion of a system 2600 that provides communication services to end user devices or other devices, such as communication device 2610. System 2600 can be part of or combined with all or a portion of system 200 of FIG. 2, system 800 of FIG. 8, other systems described herein, or another network such as an EPS, GPRS or UMTS network. The communication device 2610 can be various types of devices such as an M2M device, an IoT device, a smart appliance, a utility meter, a fixed device, a mobile device, a vehicle communication system, or other devices that utilize an IMSI for establishing communication services. The types of communication services can vary including voice services, video, data and/or messaging.

In one embodiment, system 2600 provides for provisioning (e.g., via equipment 2601 of an entity such as a vendor or manufacturer of UICCs) of a generic IMSI 2612 (e.g., a single IMSI reserved for use by the manufacturer of the UICCs) to a group of UICCs. The group of UICCs can then be provided to communication devices, such as UICC 2605 being provided to the communication device 2610 to enable the same IMSI 2612 to be utilized by more than one communication device during a registration process that results in reassignment of new IMSIs (e.g., IMSI 2613 reassigned to UICC 2605 of communication device 2610).

In one embodiment, the generic IMSI 2612 can be received by the equipment 2601 of the entity from equipment of a service provider (e.g., the service provider that is operating the identity proxy function 2650, the registration function 2660 and the identity provisioning function 2699). In one embodiment, the identity provisioning function 2699 can provide the generic IMSI 2612 to the equipment 2601 of the entity. In one embodiment, the service provider can provide different generic IMSIs to different vendors or manufacturers of the UICCs. In this example, new IMSIs are not assigned to a device until the device registers with the network (via the generic IMSI 2612) so that if a device (or UICC) does not register with the network (via the generic IMSI) the service provider is not losing use of an IMSI. The new IMSI 2613 can be a full service IMSI which enables any services at the communication device for which the user of the device is subscribed. In one or more embodiments, the generic IMSI 2612 can be a limited service IMSI (e.g., a bootstrap IMSI) that enables communication with network elements but does not enable subscriber services (which are enabled for the communication device 2610 after it registers with the network utilizing the new IMSI 2613). In one or more embodiments, the equipment 2601 of the entity can receive multiple generic IMSIs and can assign different generic IMSIs to different types of UICCs (e.g., a first group of UICCs that are intended to be used in IoT devices receive generic IMSI X while a second group of UICCs that are intended to be used in mobile phone devices receive generic IMSI Y).

In one or more embodiments, other information can be provisioned to the UICCs (e.g., by the equipment 2601) such as secret keys that are to be utilized in registering with a network (e.g., a secret key that enables generating a RES, SRES, or XRES for authentication during registration). In one or more embodiments, secret key mapping information can be provided by the equipment 2601 of the entity to the network, such as to the identity provisioning function 2699. In this example, the secret key mapping information can be utilized as part of an authentication process, such as comparison of a RES, SRES or XRES, confirmation of identification information being received in a registration request, and so forth. In one embodiment, other mapping information (e.g., eUICC or UICC identification) can be provided by the equipment 2601 of the entity to the network with or without the secret key mapping information.

System 2600 can provide for registration of communication devices through use of a registration function 2660, such as an MCS/VLR and/or HLR in a GSM network or an MME and/or HSS in an LTE network. System 2600 may or may not include intermediate network components in the message exchange paths. System 2600 illustrates a first registration by the communication device 2610 utilizing generic IMSI 2612 that is shared by other UICCs manufactured by the entity. In one or more embodiments, each of the UICCs sharing the generic IMSI 2612 can have unique identification information (e.g., an Integrated Circuit Card Identifier (ICCID) or eUICC ID information) and can also utilize their own secret keys for initiating and/or performing the registration process (e.g., generating an SRES, RES or XRES). As described herein, this unique information can be provided to the network so that the network can identify UICCs that are attempting to register with the network using the generic IMSI 2612.

In the example of system 2600, the identity proxy function 2650 can intercept or otherwise receive the IMSI, such as based on intercepting a registration request (e.g., prior to the registration request being provided to an MSC/VLR and/or HLR in GSM as illustrated in FIG. 2 or prior to the registration request being provided to an MME and/or HSS in LTE as illustrated in FIG. 8). In one embodiment, the generic IMSI 2612 can be a shared bootstrap IMSI that provides for limited functionality such as being limited to bootstrap functions (e.g., functions that enable communicating with the network for administrative reasons including obtaining another IMSI). In one embodiment, the first registration request can include the identification information (e.g., ICCID or eUICC ID information) along with the generic IMSI 2612. In one embodiment, the device 2610 can be adapted so that it includes the identification information and/or the generic IMSI 2612 in the first registration request. In one embodiment, the identity proxy function 2650 can determine that the generic IMSI 2612 is a shared IMSI. In one or more embodiments, the identity proxy function 2650 can identify (or confirm an identity of) the particular device and/or the particular UICC requesting registration with the network based on various techniques. For example, the identity proxy function 2650 can have access to a mapping of information including the generic IMSI 2612, the identification information and/or secret key information.

In another embodiment, identification of (or confirmation of the identity of) the communication device 2610 can be based on simulating a registration process and forcing a generation of an SRES, RES or XRES by the communication device 2610, as described herein. In one embodiment, registration simulation platform 675 can be utilized (e.g., positioned between the communication device 2610 and the VLR in GSM or positioned between the communication device and the MME in LTE). For example, the registration simulation platform 675 can comprise a set of functional elements that exist in the target network including an MSC/VLR, MME, HLR or HSS, AUC, SMSC, OTA platform, SGW, PGW, EIR and/or any combination thereof. In one embodiment, the registration simulation platform 675 can simulate a registration of the communication device 2610 and can identify the communication device from the secret key and/or from other identification information (e.g., ICCID or eUICC ID information).

In one embodiment, the identity proxy function 2650 and/or the identity provisioning function 2699 can determine whether the communication device 2610 is eligible for services. If the device 2610 is not eligible for services (e.g., suspension of services for non-payment or other reasons, device/UICC is not compatible with network or services, and so forth) then the identity proxy function 2650 can cause or otherwise facilitate or enable provisioning information to be provided (e.g., via the identity provisioning function 2699) to the device 2610 to cause the device to disable its use of the generic IMSI 2612. In one embodiment, this can be performed via a simulated registration (e.g., using the registration simulation platform 675) that utilizes the generic IMSI 2612.

In one embodiment, if the communication device 2610 is eligible for services then the identity provisioning function 2699 can implement a reassignment of a new IMSI 2613 for the device 2610. The new IMSI 2613 can be a full service IMSI which enables any services at the communication device for which the user of the device is subscribed. In one embodiment, the new IMSI 2613 can be an IMSI that is not shared by any other device or shared by any other UICC. In another embodiment, the new IMSI 2613 can be a shared IMSI that is being shared by another device(s) that is located in a different registration service area, such as described with respect to systems 1900 and 2000 of FIGS. 19 and 20.

In one embodiment, responsive to a determination that an IMSI reassignment is warranted, the identity proxy function 2650 can provide a request to the identity provisioning function 2699 for the new IMSI 2613 or the determination can be made by the identity provisioning function 2699. In one embodiment, the communication device 2610 can continue to utilize its original secret key (which can be mapped to the communication device 2610 by the network such as in an HLR or HSS according to the secret key mapping information). In one embodiment, the determination of eligibility for services can be made by the identity provisioning function 2699. For example, the identity proxy function 2650 can automatically transmit a request to the identity provisioning function 2699 for another IMSI responsive to a determination that the generic IMSI 2612 is being utilized by a device. The determination to whether the new IMSI 2613 can be provisioned would then be made by the identity provisioning function 2699.

As described herein, the registration simulation platform 675 can enable sending an OTA message to the communication device 2610 that can cause the modification of the device IMSI (e.g., storing the new IMSI 2613 in the UICC 2605 and/or disabling use of the generic IMSI 2612 by the device) and can cause the device to perform a re-registration to the target network using the new IMSI 2613. In one embodiment, the identity proxy function 2650 and/or the identity provisioning function 2699 can provide instructions to the communication device 2610 that causes the communication device to initiate the re-registration utilizing the re-assigned IMSI 2613.

In one embodiment, the simulated registration can be performed based on mapping information that was received by the network from the equipment 2601 of the entity. For example, the identity proxy function 2650 can have access to mapping information that indicates what UICCs are using a particular generic IMSI 2612 and further indicates the secret key being utilized by that particular UICC. Based on this information, the identity proxy function 2650 can facilitate the generation of a RES, SRES, XRES utilizing the correct secret key so that a comparison can be made to a received response which includes the RES, SRES, XRES generated by the communication device 2610. In one embodiment, the equipment 2601 of the entity can update the mapping information provided to the network responsive to additional manufacturing of UICCs (e.g., additional provisioning of the generic IMSI 2612 and other secret keys to other UICCs that have been manufactured).

Continuing with this example, the identity provisioning function 2699 can notify various network elements (e.g., an HLR, AUC, EIR, HSS, and/or NSM) that the communication device 2610 is now associated with the particular reassigned IMSI 2613. In one embodiment, this transmitting of network provisioning data can cause the HLR or HSS to delete (or otherwise note the change of) a generic IMSI assignment for the communication device 2610 and/or add the new IMSI assignment for the communication device 2610 in its database. In one embodiment, this notification can cause the HLR or the HSS to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth. In one embodiment, the simulated registration can be performed by the registration simulation platform using the generic IMSI 2612 (without being performed by the registration function 2660) and the second registration can be performed by the registration function 2660 using the new IMSI 2613 (without being performed by the registration simulation platform 675).

Figure 27:
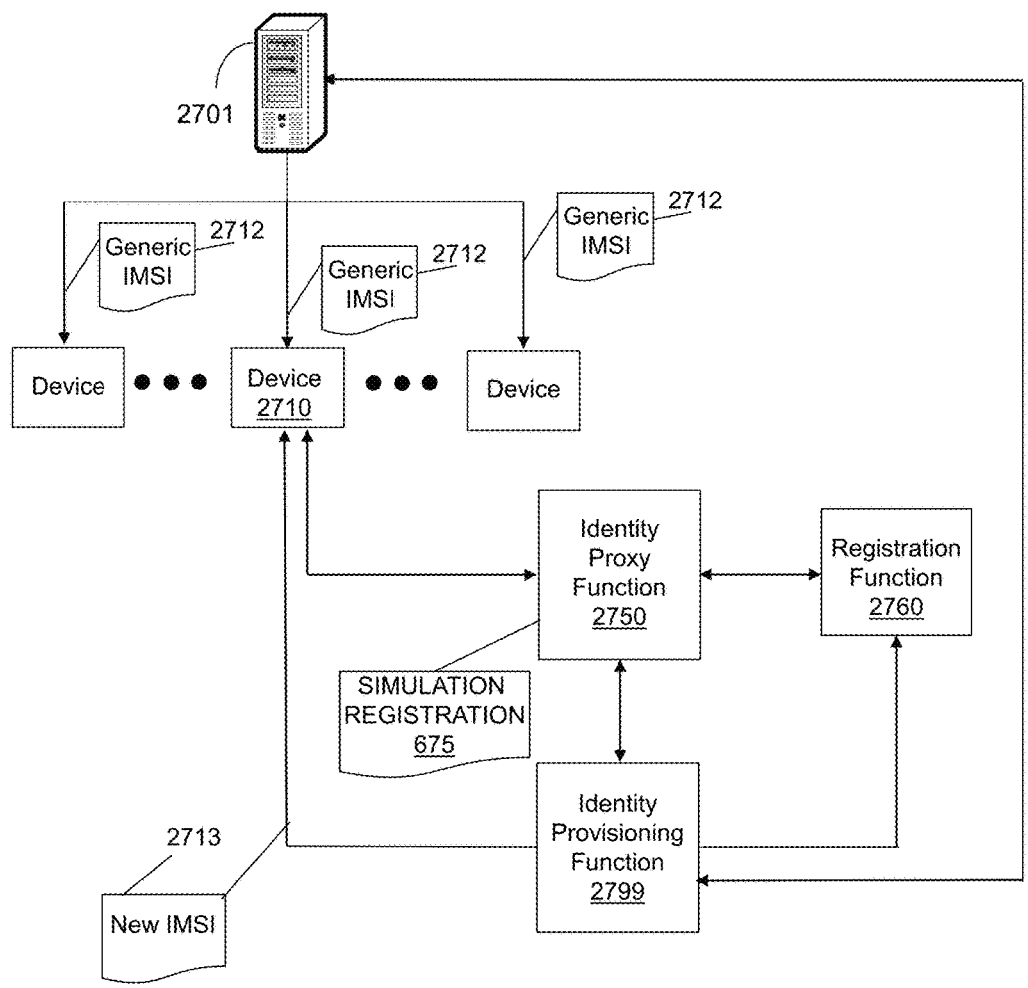

FIG. 27 illustrates a portion of a system 2700 that provides communication services to end user devices or other devices, such as communication device 2710. System 2700 can be part of or combined with all or a portion of system 200 of FIG. 2, system 800 of FIG. 8, other systems described herein, or another network such as an EPS, GPRS or UMTS network. In one embodiment, system 2700 provides for provisioning (e.g., via equipment 2701 of an entity such as a vendor or manufacturer of IoT devices) of a generic IMSI 2712 (e.g., a single IMSI reserved for use by a device manufacturer) to a group of devices, such as communication device 2710 to enable the same IMSI 2712 to be utilized by more than one communication device during a registration process that results in reassignment of new IMSIs (e.g., IMSI 2713 reassigned to communication device 2710). The communication device 2710 can be various types of devices such as an M2M device, an IoT device, a smart appliance, a utility meter, a fixed device, a mobile device, a vehicle communication system, or other devices that utilize an IMSI for establishing communication services. The types of communication services can vary including voice services, video, data and/or messaging.

In one embodiment, the generic IMSI 2712 can be received by the equipment 2701 of the entity from equipment of a service provider (e.g., the service provider that is operating the identity proxy function 2750, the registration function 2760 and the identity provisioning function 2799). In one embodiment, the identity provisioning function 2699 can provide the generic IMSI 2712 to the equipment 2701 of the entity. In one embodiment, the service provider can provide different generic IMSIs to different manufacturers of devices. In this example, new IMSIs are not assigned to a device until the device registers with the network (via the generic IMSI 2712) so that if a device does not register with the network (via the generic IMSI) the service provider is not losing use of an IMSI. The new IMSI 2713 can be a full service IMSI which enables any services at the communication device for which the user of the device is subscribed.

In one or more embodiments, the generic IMSI 2712 can be a limited service IMSI (e.g., a bootstrap IMSI) that enables communication with network elements but does not enable subscriber services (which are enabled for the communication device 2710 after it registers with the network utilizing the new IMSI 2713). In one or more embodiments, the equipment 2701 of the entity can receive multiple generic IMSIs and can assign different generic IMSIs to different types of devices (e.g., a first group of smart utility meters receive generic IMSI X while a second group of smart washing machines receive generic IMSI Y).

In one or more embodiments, other information can be provisioned to the devices (e.g., by the equipment 2701) such as secret keys that are to be utilized in registering with a network (e.g., a secret key that enables generating a RES, SRES, or XRES for authentication during registration). In one or more embodiments, secret key mapping information can be provided by the equipment 2701 of the entity to the network, such as to the identity provisioning function 2799. In this example, the secret key mapping information can be utilized as part of an authentication process, such as comparison of a RES, SRES or XRES, confirmation of identification information being received in a registration request, and so forth. In one embodiment, other mapping information (e.g., eUICC, UICC, IMEI, GUTI, MAC address) can be provided by the equipment 2701 of the entity to the network with or without the secret key mapping information.

System 2700 can provide for registration of communication devices through use of a registration function 2760, such as an MCS/VLR and/or HLR in a GSM network or an MME and/or HSS in an LTE network. System 2700 may or may not include intermediate network components in the message exchange paths. System 2700 illustrates a first registration by the communication device 2710 utilizing generic IMSI 2712 that is shared by other devices manufactured by the entity. In one or more embodiments, each of the devices sharing the generic IMSI 2712 can have unique identification information (e.g., IMEI, GUTI, MAC address) and can also utilize their own secret keys for initiating and/or performing the registration process (e.g., generating an SRES, RES or XRES). As described herein, this unique information can be provided to the network so that the network can identify devices that are attempting to register with the network using the generic IMSI 2712.

In the example of system 2700, the identity proxy function 2750 can intercept or otherwise receive the generic IMSI 2712 such as in a first registration request which also includes the identification information (e.g., IMEI, GUTI, MAC address). In one or more embodiments, separate messages can be utilized for delivering the generic IMSI 2712 and the unique device identification to the network. In another embodiment, a single message (e.g., a registration request) can be utilized for delivering the generic IMSI 2712 and the unique device identification to the network, such as in different fields of the message.

In one embodiment, the identity proxy function 2750 can determine that the generic IMSI 2712 is a shared IMSI. In one or more embodiments, the identity proxy function 2750 can identify (or confirm an identity of) the particular device requesting registration with the network based on various techniques. For example, the identity proxy function 2750 can have access to a mapping of information including the generic IMSI 2712, the identification information and/or secret key information.

In another embodiment, identification of (or confirmation of the identity of) the communication device 2710 can be based on simulating a registration process and forcing a generation of an SRES, RES or XRES by the communication device 2710, as described herein utilizing registration simulation platform 675. For instance, the registration simulation platform 675 can simulate a registration of the communication device 2710 and can identify the communication device from the secret key and/or from other identification information (e.g., IMEI, GUTI, MAC address).

In one embodiment, the identity proxy function 2750 and/or the identity provisioning function 2799 can determine whether the communication device 2710 is eligible for services. If the device 2710 is not eligible for services (e.g., suspension of services for non-payment or other reasons, device/UICC is not compatible with network or services, and so forth) then the identity proxy function 2750 can cause or otherwise facilitate or enable provisioning information to be provided (e.g., via the identity provisioning function 2799) to the device 2710 to cause the device to disable its use of the generic IMSI 2712, such as via OTA messaging using the simulated registration.

In one embodiment, if the communication device 2710 is eligible for services then the identity provisioning function 2799 can implement a reassignment of a new IMSI 2713 for the device 2710. The new IMSI 2713 can be a full service IMSI which enables any services at the communication device for which the user of the device is subscribed. In one embodiment, the new IMSI 2713 can be an IMSI that is not shared by any other device or any other UICC. In another embodiment, the new IMSI 2713 can be a shared IMSI that is being shared by another device(s) that is located in a different registration service area, such as described with respect to systems 1900 and 2000 of FIGS. 19 and 20. In one embodiment, the communication device 2710 can continue to utilize its original secret key (which can be mapped to the communication device 2710 by the network such as in an HLR or HSS according to the secret key mapping information).

As described herein, the registration simulation platform 675 can enable sending an OTA message to the communication device 2710 that can cause the modification of the device IMSI (e.g., storing the new IMSI 2713 in a UICC of the device 2710 and/or disabling use of the generic IMSI 2712 by the device) and can cause the device to perform a re-registration to the target network using the new IMSI 2713. In one embodiment, the identity proxy function 2750 and/or the identity provisioning function 2799 can provide instructions to the communication device 2710 that causes the communication device to initiate a re-registration utilizing the re-assigned IMSI 2713. In one embodiment, the simulated registration can be performed by the registration simulation platform using the generic IMSI 2712 (without being performed by the registration function 2760) and the second registration can be performed by the registration function 2760 using the new IMSI 2713 (without being performed by the registration simulation platform 675).

In one embodiment, the simulated registration can be performed based on mapping information that was received by the network from the equipment 2701 of the entity. For example, the identity proxy function 2750 can have access to mapping information that indicates what devices are using a particular generic IMSI 2712 and further indicates the secret key being utilized by that particular device. Based on this information, the identity proxy function 2750 can facilitate the generation of a RES, SRES, XRES utilizing the correct secret key so that a comparison can be made to a received response which includes the RES, SRES, XRES generated by the communication device 2710. In one embodiment, the equipment 2701 of the entity can update the mapping information provided to the network responsive to additional manufacturing of device (e.g., additional provisioning of the generic IMSI 2712 and other secret keys to other IoT devices).

Continuing with this example, the identity provisioning function 2799 can notify various network elements (e.g., an HLR, AUC, EIR, HSS, and/or NSM) that the communication device 2710 is now associated with the particular reassigned IMSI 2713. In one embodiment, this transmitting of network provisioning data can cause the HLR or HSS to delete (or otherwise note the change of) a generic IMSI assignment for the communication device 2710 and/or add the new IMSI assignment for the communication device 2710 in its database. In one embodiment, this notification can cause the HLR or the HSS to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth.

Figure 28:
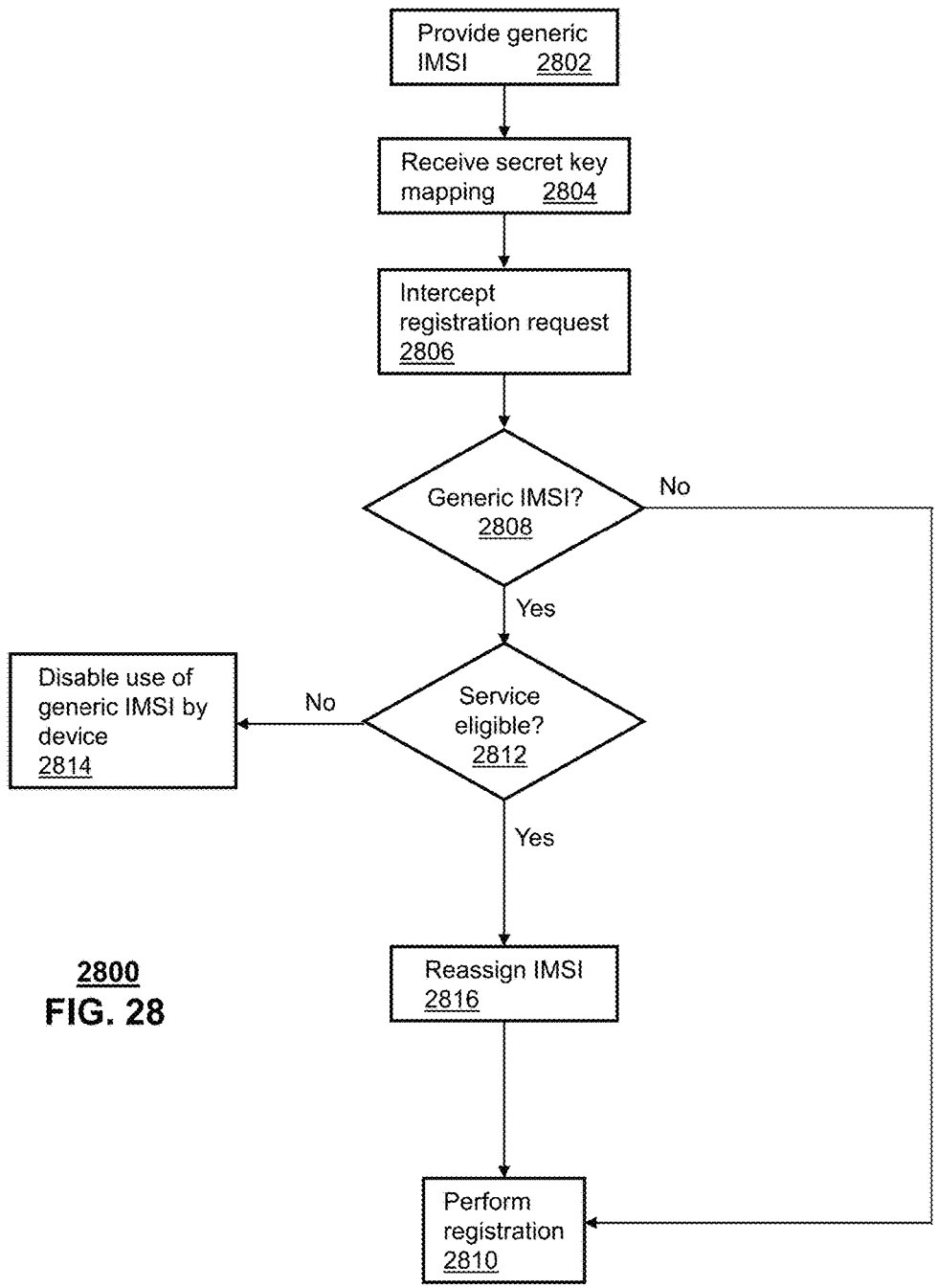
FIG. 28 depicts another illustrative embodiment of a method that provides communication services and enables use of a generic mobile subscriber identification information by multiple communication devices.

FIG. 28 depicts an illustrative embodiment of a method 2800 used by systems 2600 and 2700 for facilitating registration of communication devices and the reassignment of IMSIs. One or more of the steps of method 2800 can be performed by an identity proxy function of a service provider, an identity provisioning function of the service provider, equipment of a vendor or manufacturer and/or by other devices described in FIGS. 2-6, 8-11, 13, 15, 17, 19-20, 22, 24 and 26-27. In one or more embodiments, the entity and the service provider are distinct entities.

At 2802, a generic IMSI can be provided by the service provider to the entity so that the entity can provision UICCs and/or devices with the generic IMSI. In one embodiment, the provisioning of the UICCs and/or devices can be part of a manufacturing process of the UICCs and/or devices. Other information can be provisioned to the UICCs and/or device by equipment of the entity, such as a secret key for use in a registration/authentication process (e.g., to generate a RES, SRES, XRES response). In one or more embodiments, the service provider can utilize different generic IMSIs for different entities that manufacture and/or provision UICCs and/or devices. In one or more embodiments, the service provider can provide multiple generic IMSIs to a single entity for use in provisioning of the UICCs and/or devices. For instance, the entity can apply different generic IMSIs to different types of UICCs and/or devices. In another embodiment, the entity can apply different generic IMSIs to UICCs and/or devices that are expected to first register in a single registration service area. By providing different generic IMSIs, this can reduce the likelihood of a registration problem that could arise from two devices that attempt to register at the same time with the same generic IMSI in the same registration service area.

At 2804, the entity (e.g., via equipment of the entity) can provide mapping information to the network that is associated with the generic IMSI(s). For instance, the entity can transmit or otherwise provide the network (e.g., the identity provisioning function) with mapping information that indexes the generic IMSI to a unique identification and to a secret key for each of a group of UICCs and/or devices. The mapping information can be updated as other UICCs and/or devices are manufactured, provisioned, sold or are otherwise made ready to register with the network. In one or more embodiments, the information from the entity can include the IMSI and the secret key, and may include other information.

At 2806, a generic IMSI can be intercepted or otherwise obtained by the identity proxy function, such as in a registration request, and at 2808 the identity proxy function can determine that the received IMSI is a generic IMSI being shared among other UICCs and/or devices. If the IMSI was not a generic IMSI then method 2800 can proceed to 2810 to register the device including performing an authentication utilizing the non-generic IMSI. If on the other hand the IMSI is a generic IMSI, method 2800 can proceed to 2812 to confirm service eligibility. Eligibility for services can be based on various factors such as suspension of services for non-payment or other reasons, the device/UICC is not compatible with network or services, and so forth.

If the device or user is not eligible for service then at 2814 use of the generic IMSI at the device can be disabled. For example, OTA messaging can be provided to the device that causes the device to disable the use of the generic IMSI. In one embodiment, the OTA messaging can be enabled by simulating a registration (e.g., via registration simulation platform 675) using the generic IMSI and then disabling the subsequent use of that generic IMSI by the device via the OTA messaging.

If on the other hand the device or user is eligible for service, then at 2816 a new IMSI can be reassigned to the device via an OTA interface. In one embodiment, the OTA messaging causes the device to store the new IMSI and causes the device to provide a second registration request to the network that utilizes the new IMSI in order to complete the registration at 2810.

In one embodiment, the generic IMSI can be a limited service or bootstrap IMSI that does not enable access to subscriber services but rather enables communicating with network elements (e.g., the identity proxy function). The new IMSI can be a full service IMSI that enables access to any services that the user is subscribed to upon completion of the registration. In one or more embodiments, the OTA interface can utilize a transport key stored by the communication device.

While for purposes of simplicity of explanation, the respective processes are shown and described as a series of blocks in FIG. 28, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 29:
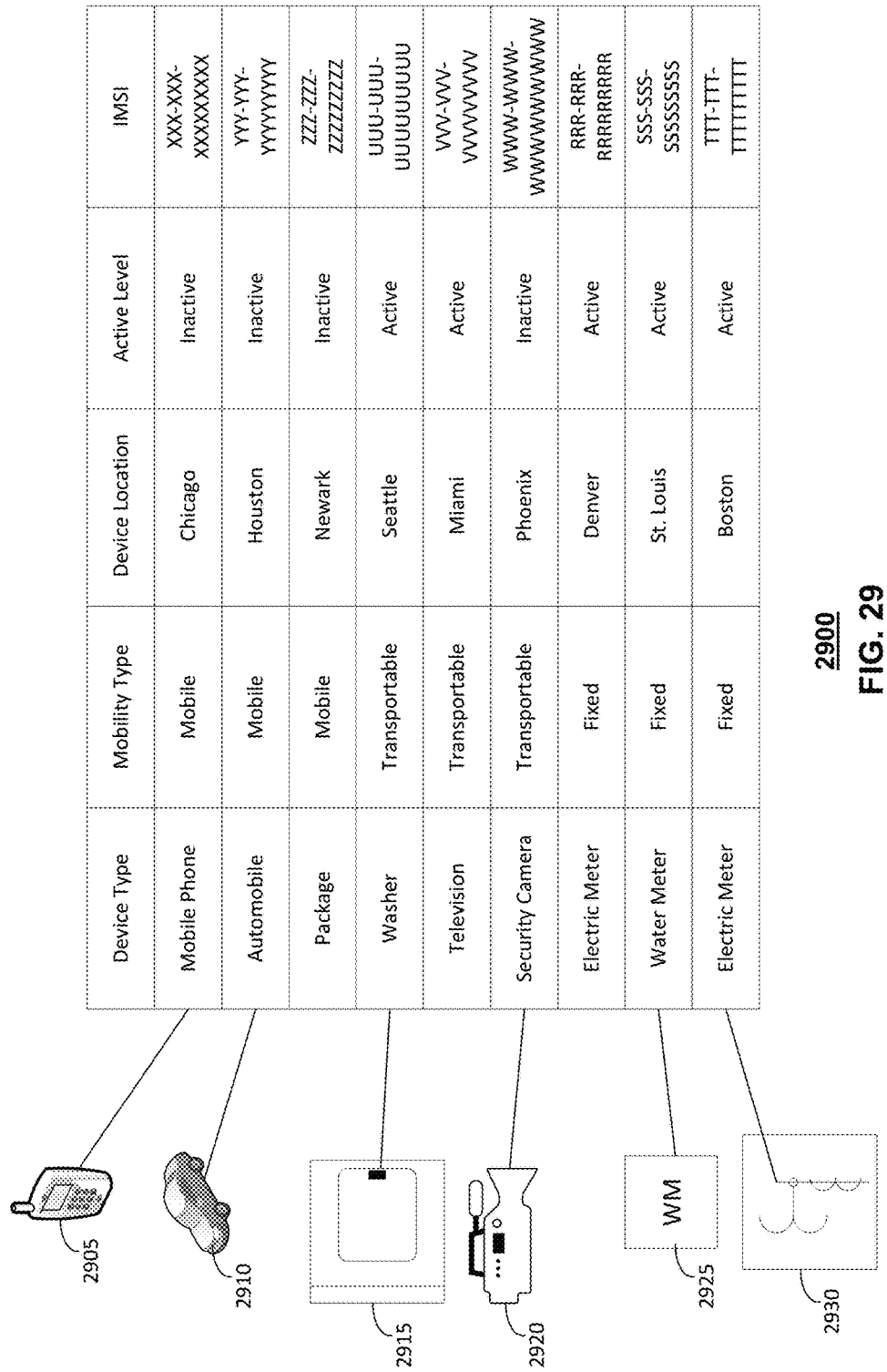
FIG. 29 depicts an illustrative embodiment of classifying IMSIs for different devices according mobility and device location.

FIG. 29 depicts an illustrative embodiment of classifying IMSIs for different devices according to mobility and/or device location. In one or more embodiments, an IMSI can be assigned to different devices by an identity provisioning function on a network device as described herein. These devices can be of the same or different types, such as a mobile phone 2905, an automobile 2910, and a package (e.g., to track delivery). Further, an IMSI can be assigned to different appliances such as a washer 2915, television, and security camera 2920. In addition, an IMSI can be assigned to different utility meters such as a water meter 2925 and an electric meter.

In one or more embodiments, each device associated with an IMSI can be classified by the identity provisioning function according to device type, mobility type or roaming capability, device location, and/or active level. In some embodiments, the identity provisioning function can reuse an IMSI assigned to one device and assign it also to another device according to one of a mobility type, device location, and/or active level. Such reusable IMSIs can be generated or otherwise selected by the identity provisioning function.

Further, the reusable IMSIs can be placed on a list of designated IMSIs provided by the identity provisioning function to the identity proxy function.

In one or more embodiments, the identity provisioning function can analyze the mobility type, location, and/or active level of a device associated with an IMSI for possible reuse. In some embodiments, from such analysis, the identity provisioning function can determine to reuse an IMSI associated with a device having an inactive active level. Reuse of an IMSI from an inactive device may have a relatively low likelihood to have a registration error (e.g. IMSI collision) as compared with reusing an IMSI from an active device. An IMSI collision is a registration error that occurs in which two active devices with the same IMSI attempt to register with the same registration function on a network device (e.g. register, Home Location Register (HLR), Visitor Location Register (VLR), etc.). For example, if the identity provisioning function assigns an IMSI to a first mobile phone where the IMSI is reused from an inactive second mobile phone (e.g., inactive due to unpaid bills for a period of time exceeding a threshold of time), then the likelihood that the inactive mobile phone would be active again resulting in a registration error may be low. However, if the second mobile phone is reactivated (e.g., the user has paid bills in full), and second mobile phone attempts to register its IMSI with the registration function, an IMSI collision can occur. Such an IMSI collision or registration error can be resolved or mitigated as described herein.

In or more embodiments, reusing an IMSI between two active devices with particular mobility types and/or device locations can reduce the likelihood of a registration error. The mobility types can describe the relative mobility or stationary nature of the device. In some embodiments, the mobility type can be fixed, transportable, and mobile. A device with a fixed mobility type is stationary and would not move into a different location during its use. Thus, such a device registers with a registration function associated with its location and would not be expected to move to another location to register with another registration function. A device with a transportable mobility type is usually stationary at a particular location but may be moved to another stationary location during its use. For example, an appliance such as a washer or television can have a transportable mobility type. A device with a mobile mobility type can move from one location to another often during its use. Devices such as mobile phones, automobiles and trackers that are associated with package delivery can be associated with a mobile mobility type.

In other embodiments, the list of designated IMSI for reuse can include the entity associated with the device. For example, a first device is associated with a first entity and a second device is associated with a second entity. Further, devices associated with the first entity are in a first predefined area of locations and the devices associated with the second entity are in a second predefined area of locations separate from the first predefined area. Thus, a device in a first predefined area and associated with the first entity would not move into the second predefined area associated with the second entity. The identity provisioning function can reuse IMSIs from devices associated with different entities to reduce the likelihood of a registration error.

In one example pertaining to selecting IMSI reuse according to mobility type and/or device location, an IMSI associated with an electric meter may be reused and assigned to the first mobile phone. The mobility type of the electric meter can be fixed while mobile phone mobility type is mobile. In further embodiments, the device location of the first mobile phone can be used to assign a reused IMSI from a device that would not likely create a registration error (e.g. IMSI collision). That is, if the electric meter is in Denver and the first mobile phone is in Chicago, the likelihood of generating a registration error is low because there is a low chance that the mobile device in Chicago can overlap into the geographic area of the electric meter in Denver, thereby having a low likelihood in creating a registration error. In other embodiments, the identity provisioning function and the identity proxy function can provision a reused IMSI from a fixed device (i.e., a device with mobility type fixed) to a device such as an appliance with a transportable mobility type. Further, the fixed device may be in a location that is different than the location of the transportable device. In some embodiments, the identity provisioning function selects an IMSI for reuse, not only according to the mobility type of each device, but also according to the location of each device. For example, the identity provisioning function can select an IMSI for reuse associated with a fixed water meter in St. Louis and provision the reused IMSI to a transportable washer appliance located in Seattle. The selection is made according to both the mobility type and location of each device because the likelihood that the washer is moved to the same location (e.g., St. Louis) as the fixed water meter to create a registration error is low. In other embodiments, the identity provisioning function can select an IMSI for reuse according to the distance between two devices exceeding a predetermined threshold. For the example above with a fixed water meter in St. Louis and the washer appliance in Seattle, the predetermined threshold can be 1000 miles. The identity provisioning function can determine that the distance between fixed water meter and the washer appliance exceeds 1000 miles and thereby assigns the IMSI to both the fixed water meter and the washer appliance.

Figure 30:
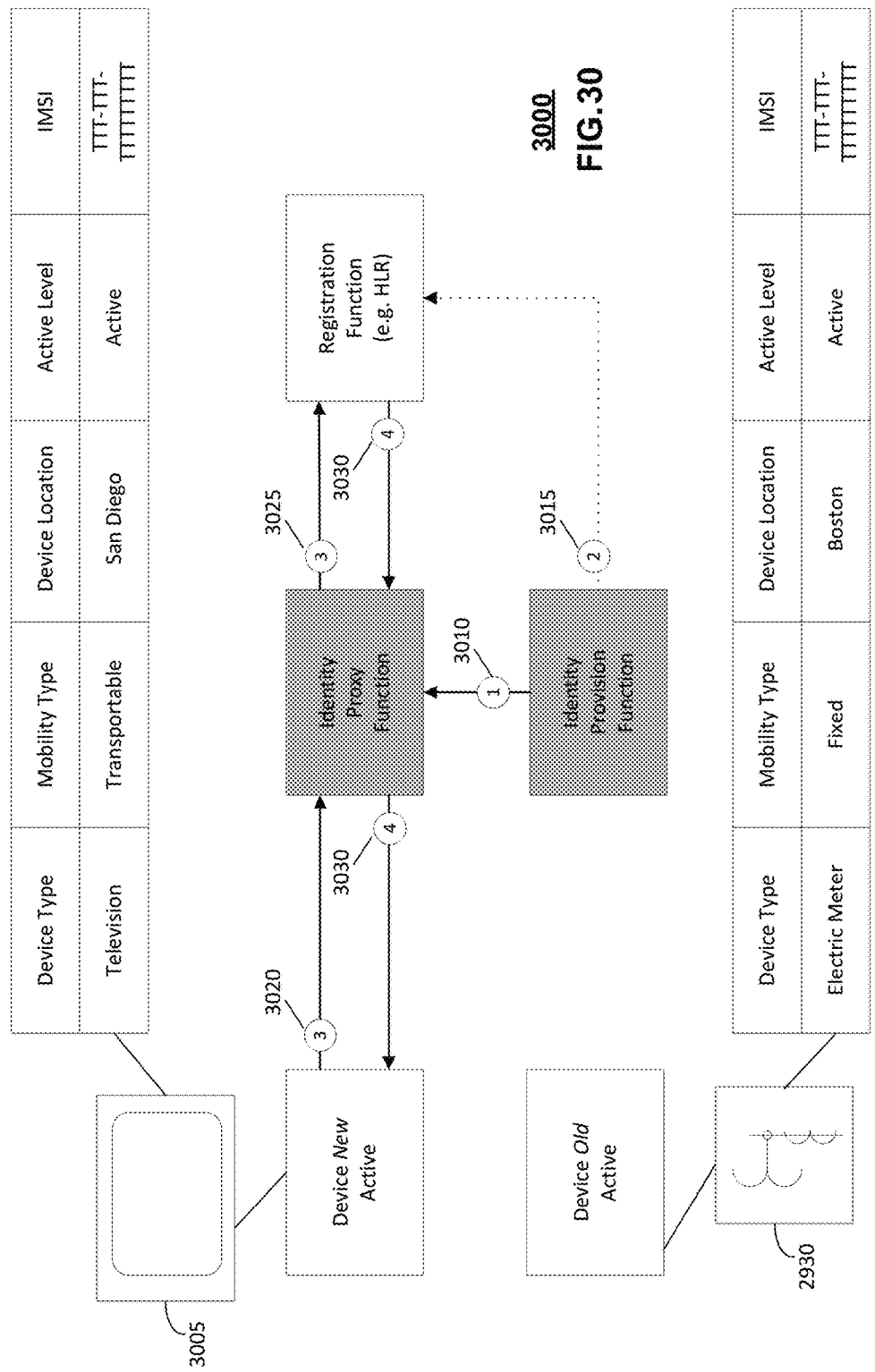
FIGS. 30-32 depict illustrative embodiments of reusing IMSIs according to mobility and location of different communication devices.
Figure 31:
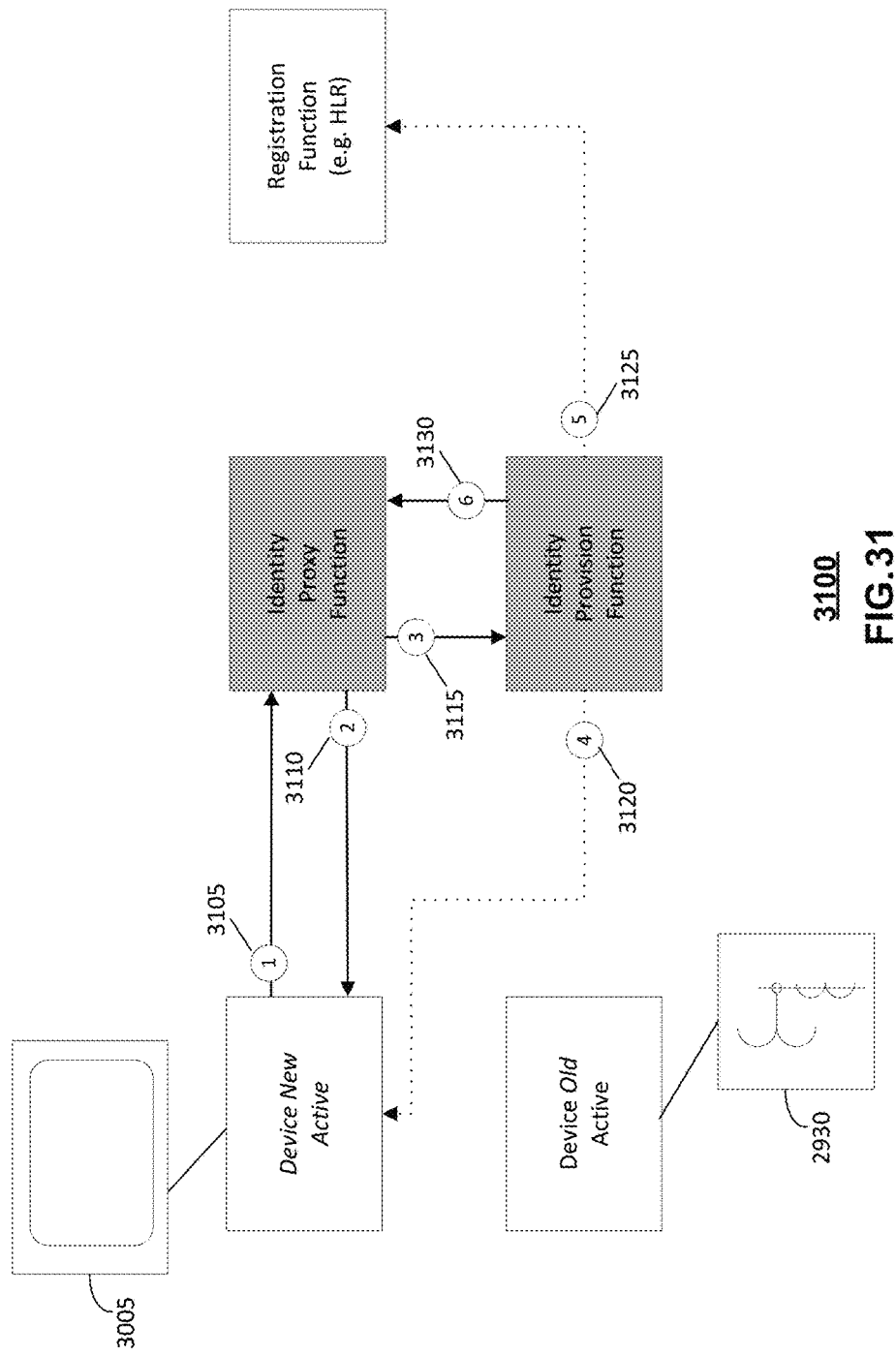
Figure 32:
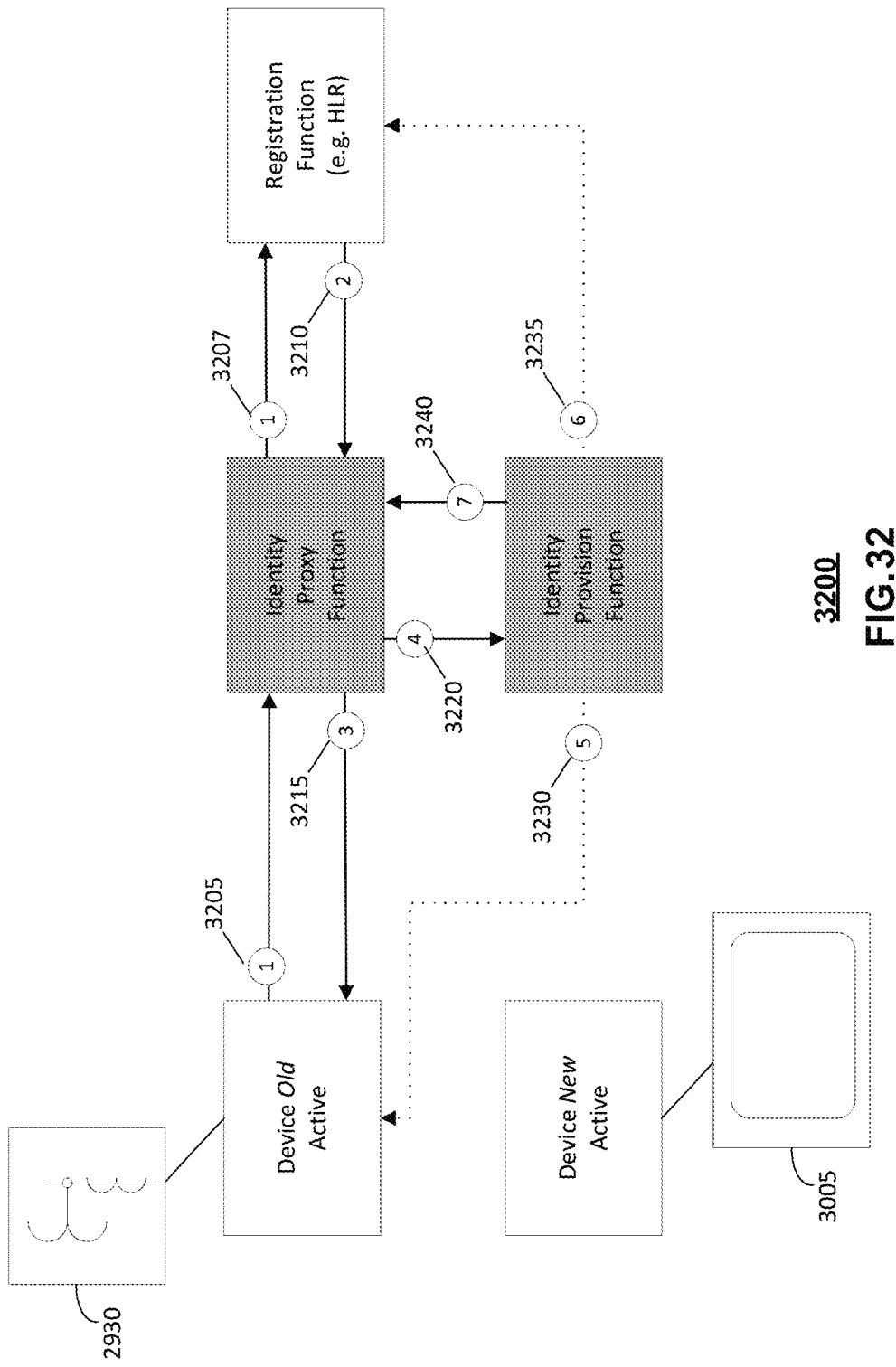

FIGS. 30-32 depict illustrative embodiments of reusing IMSIs according to mobility and location of different communication devices. Referring to FIG. 30, the system 3000 incorporates the functions discussed in describing, inter alia, FIGS. 3, 4, 5, 6, 10, and 11. In one or more embodiments, the identity provisioning function assigns a new device 3005 with a reused IMSI that has been assigned to an old device 2930. The IMSI can be selected according to the mobility type and location of both the new device 3005 and the old device 2930. That is, for example, if each device has a transportable or fixed mobility type and each device is in a different location, then the identity provisioning function can assign the IMSI of the old device to the new device such that there may be a low likelihood of a registration error/failure (e.g., an IMSI collision). If the old device and new device are both stationary, and if each device is in a different location, then each device would register their respective IMSIs at a different registration function having different registration services areas. For example, the old device 2930 can be an electric meter with a fixed mobility type and a location in Boston. The new device 3005 can be a television appliance with a transportable mobility type and location in San Diego. The identity provisioning function can determine that an old device 2930 having a fixed mobility type and a new device 3005 having a transportable type would reduce the likelihood of a registration error due to both devices registering at the same registration service area. That is, it is a low likelihood that the new device 3005 would move to the same location as the old device 2930 to cause a registration error (e.g. IMSI collision). For such a registration error to occur, the household having the television appliance 3005 would have to move within the same registration service area as the old device 2930 and attempt to register its IMSI to the same registration function.

In some embodiments, the identity provisioning function can select the IMSI for reuse by determining the distance between the old device 2930 and the new device 3005 in which one device has a fixed mobility type or a transportable mobility type. Further, the identity provisioning function can determine whether the distance between the old device 2930 and the new device 3005 exceeds a predetermined threshold. If the distance between the location of the old device 2930 and the new device 3005 exceeds the predetermined threshold (e.g. 1500 miles), then the identity provisioning function can assign, and thereby reuse, the IMSI of the old device 2935 to the new device 3005.

In one or more embodiments, at 3010, the identity provisioning function notifies the identity proxy function that is assigned the IMSI of the old device 2930 to the new device 3005. In some embodiments, the identity provisioning function and the identity proxy function can be on separate network devices. In other embodiments, the identity provisioning function and the identity proxy function can be on the same network device. Further, at 3015, the identity provisioning function notifies the registration function on a network device (e.g., HLR, VLR, etc.) that the IMSI of the old device 2930 is assigned to the new device 3005. At some time, the new device 3005 sends a registration request to the registration function. The registration request can be intercepted or otherwise obtained by the identity proxy function which can identify that the IMSI assigned to the new device 3005 is being reused and originally assigned to the old device 2930. However, the identity proxy function can also determine that the old device is not registered with this particular registration function, thereby no registration error (e.g. IMSI collision) can occur. Thus, at 3025, the identity proxy function relays the registration request to the registration function. At 3030, the registration function sends a message to the new device 3005 that it is registered. The identity proxy function intercepts the message and determines no registration error occurred (e.g., IMSI collision). Responsive to this determination, the identity proxy function relays the message to the new device 3005.

Referring to FIG. 31, in one or more embodiments, the new device 3005, which is assigned an IMSI that was originally assigned to and currently used by the old device 2930, is transported to a location in proximity (e.g., within the same registration area) to the old device 2930. Further, the new device 3005 attempts to register with a registration function (e.g., HLR, VLR, etc.). However, the old device 2930 has already registered the IMSI with the registration function. At 3105, the new device 3005 sends a registration request to the registration function. The identity proxy function intercepts the registration request. Further, the identity proxy function determines that the new device 3005 has the same IMSI as the old device 2930 and the old device has registered its IMSI with the registration function; the same registration function that the new device 3005 has sent its registration request. The identity proxy function determines that a registration error would occur if the registration request sent by the device is sent to the registration function. In response, at 3110, the identity proxy function sends the new device a message that indicates that registration of its IMSI did not occur. Further, at 3115, the identity proxy function notifies the identity provisioning function that a registration error has occurred (or will occur) due to the new device and old device having the same IMSI and attempting to register with the same registration function. In response, at 3120, the identity provisioning function assigns a new IMSI to the new device 3005. Such a new IMSI can be from a designated list of IMSIs that are available for reuse as described herein. At 3125, the identity provisioning function can notify the registration function of the new IMSI for the new device 3005, and, at 3130, notify the identity proxy function of the new IMSI for the new device 3005.

In some embodiments, the mobility type of an old device is transportable and the mobility type of a new device is fixed. Further, the old device and the new device are in different locations and use the same IMSI. If the old device is transported to the same registration service area as the new device and attempts to register with the same registration function as the new device, a registration error would occur. Such a registration error can be resolved as described herein. Further, the old device and new device can each be of any mobility type but in different locations. In addition, if one device moves into the same registration service area of the other device and registers its IMSI with a registration function, a registration error can occur. However, any such registration error can be resolved as described herein.

Referring to FIG. 32, in one or more embodiments, the new device 3005, which is assigned a reused IMSI that was originally assigned to and currently used by the old device 2930, is transported to the same location as the old device 2930. Thus, the new device 3005 attempts to register with a registration function at a network device. However, the old device 2930 has already registered the IMSI with the registration function. At 3105, the new device 3005 sends a registration request to the registration function. The identity proxy function intercepts the registration request. Although in some embodiments, the identity proxy function can determine that a registration error would occur by the new device registering with the registration function, the identity proxy function at 3207, relays the registration request to the registration function, anticipating an error due to a registration error (e.g. IMSI collision). The registration function, at 3210, transmits a registration error generated due to the old device and the new device sharing the same IMSI (i.e., IMSI collision). The identity proxy function intercepts the error message and at 3215, the identity proxy function sends the new device a message that indicates that its registration did not occur. Further, at 3220, the identity proxy function notifies the identity provisioning function that the new device 3005 that a registration error has occurred due to the new device and old device having the same IMSI and attempting to register with the same registration function. In response, at 3230, the identity provisioning function assigns a new IMSI to the new device 3005. Such a new IMSI can be from a designated list of IMSIs that are available for reuse as described herein. At 3235, the identity provisioning function can notify the registration function of the new IMSI for the new device 3005, and, at 3240, can notify the identity proxy function of the new IMSI for the new device 3005.

Figure 33:
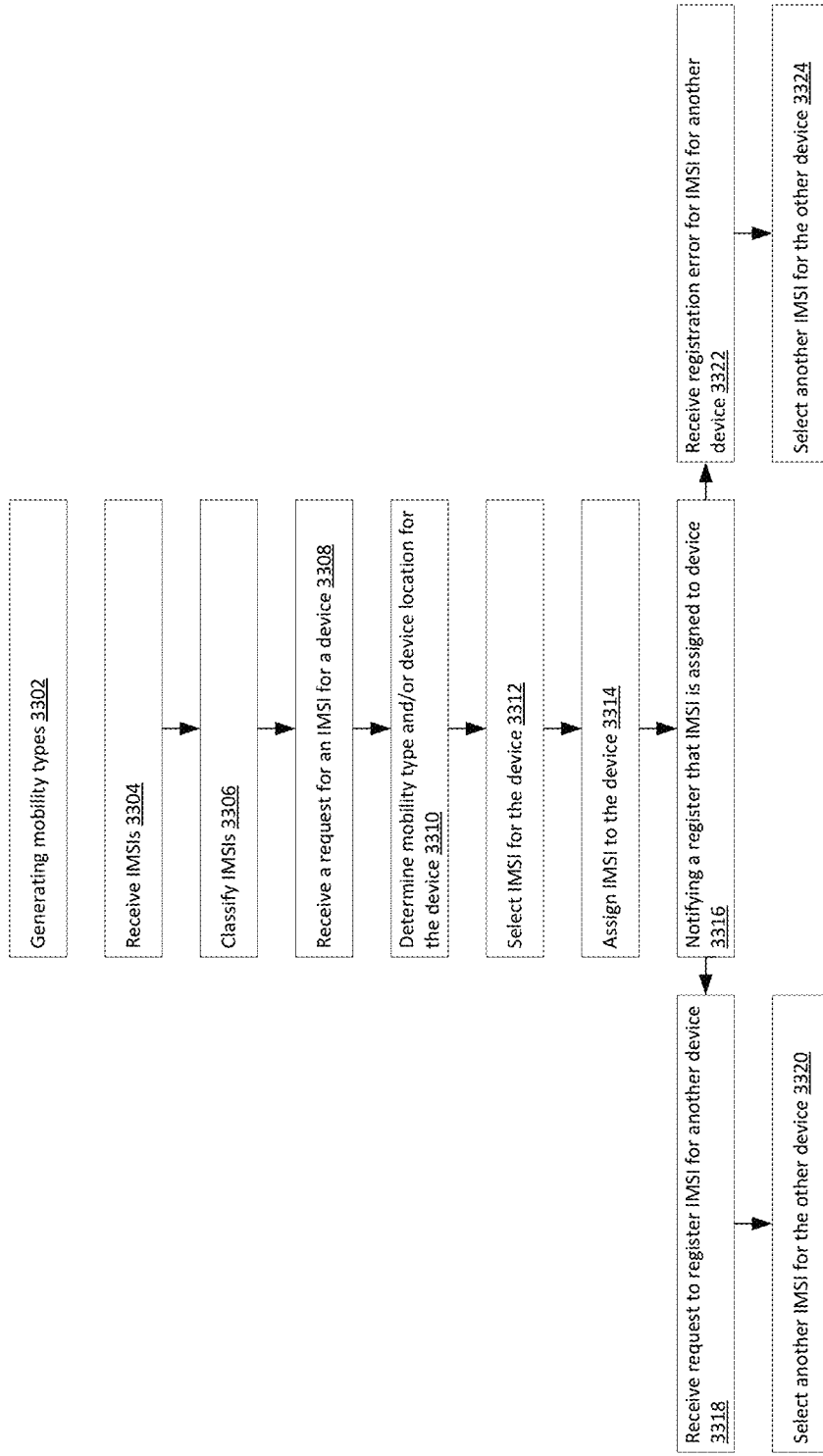
FIG. 33 depicts an illustrative embodiment of a method that reuses IMSIs according to mobility and location of different communication devices.

FIG. 33 depicts an illustrative embodiment of a method 3300 that reuses IMSIs according to mobility and location of different communication devices. The method 3300 can include an identity provisioning function on a network device, at 3302, generating and determining mobility types for devices assigned with IMSIs.

The identity provisioning function can, at 3304, receiving or generating a list of designated IMSIs to be reassigned to devices. Further, the method 3300 can include, at 3306, the identity provisioning function classifying each of the IMSIs according to one of the mobility types. In addition, the method 3300, can include the identity provisioning function, at 3308, receiving a request for an IMSI for a first device and determining, at 3310, a first mobility type and device location for the first device. Also, the method 3300 can include the identity provisioning function, at 3312, selecting a first IMSI from the list of multiple IMSIs according to the first mobility type and a second mobility type and the device location of the first device and the device location of the second device. The first IMSI is associated with a second device which has a second mobility type and a second device location as stored in the list of designated IMSIs for reuse. Further, the identity provisioning function selects the first IMSI according to the first mobility type, first device location, the second mobility type, and/or the second device location to reduce a likelihood of a registration error (e.g. IMSI collision). At 3314, the method 3300 can include the identity provisioning function assigning the first IMSI to the first device. At 3316, the method 3300 can include the identity provisioning function notifying a registration function that the first IMSI is assigned to the first device.

The method 3300 can include the identity provisioning function, at 3318, receiving a request from the second device to register the first IMSI with a registration function. If such a request is received by a registration function, a registration error (e.g. IMSI collision) would occur. Further, the method 3300 can include the identity provisioning function, at 3320, selecting a second IMSI for the second device from the multiple of IMSIs according to the second mobility type, a third mobility type, the second device location, and/or the third device location. That is, the identity provisioning function is assigning an IMSI from the list of designated IMSI for reuse that is associated with a third device having a third mobility type and a third device location. The selected IMSI can be the second IMSI that is associated with a third device. The identity provisioning function selects the second IMSI according to the second mobility type, the second device location, the third mobility type, and/or the third device location to reduce a likelihood of another registration error (e.g. IMSI collision).

The method 3300 can include the identity provisioning function, at 3322, receiving a first error message, from a registration function, associated with the (first) registration error. Further, the identity provisioning function can determine from the first error message that the second device is attempting to register the first IMSI. The method 3300, can include the identity provisioning function, at 3324, selecting a second IMSI for the second device from the multiple of IMSIs according to the second mobility type, a third mobility type, the second device location, and/or the third device location. That is, the identity provisioning function is assigning an IMSI from the list of designated IMSI for reuse that is associated with a third device having a third mobility type and a third device location. The selected IMSI can be the second IMSI that is associated with a third device. The identity provisioning function selects the second IMSI according to the second mobility type, the second device location, the third mobility type, and/or the third device location to reduce a likelihood of another registration error (e.g. IMSI collision).

Figure 34:
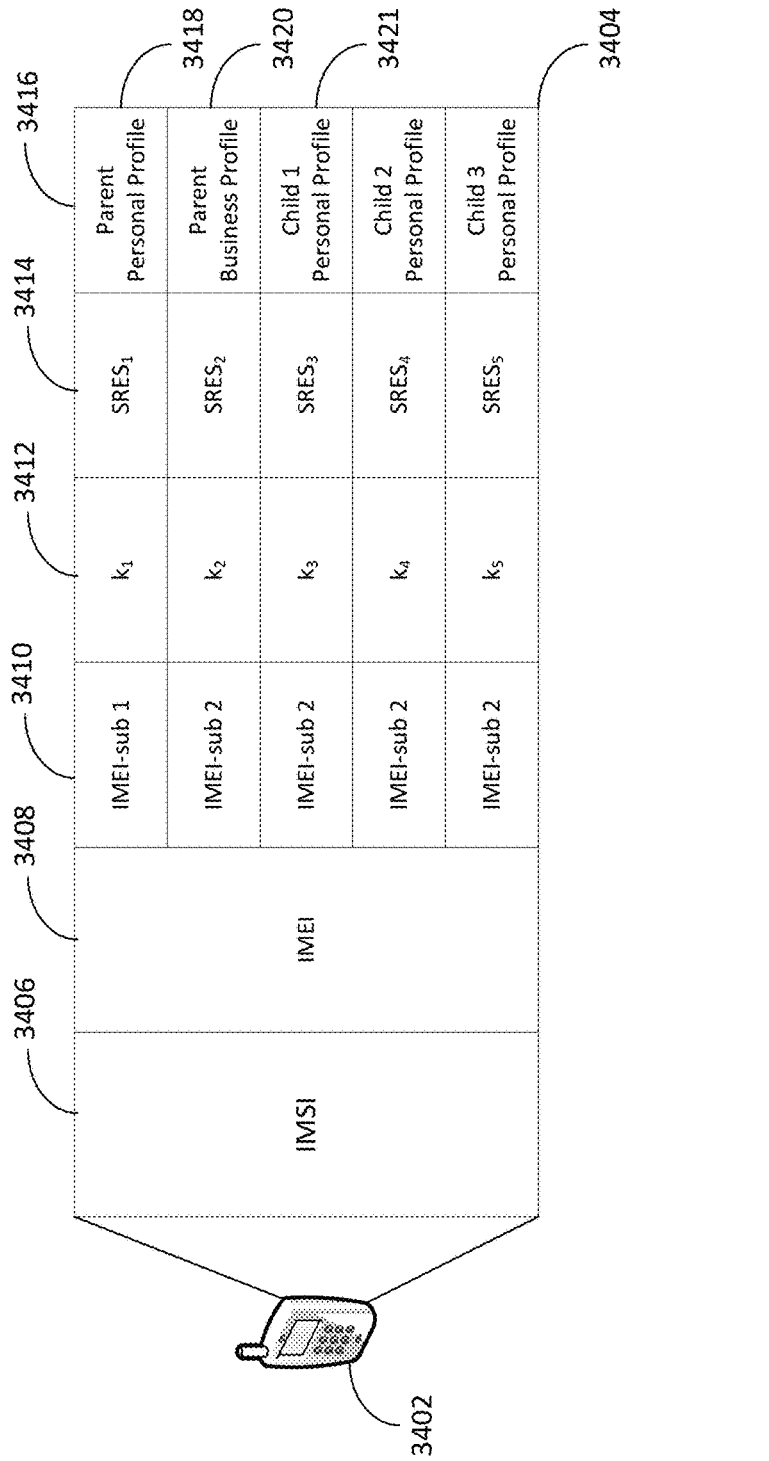
FIG. 34 depicts an illustrative embodiment of a device with an IMSI having multiple shared secret keys, $k_i$.

FIG. 34 depicts an illustrative embodiment of a device 3402 with an IMSI having multiple shared secret keys, $k_i$. In one or more embodiments, the device 3402 can be associated with IMSI reuse information 3404 that can include the IMSI 3406, a device identifier such as an IMEI 3408, multiple unique identifiers 3410, multiple shared secret keys, $k_i$ 3412, and multiple signed responses (SRESs) 3414 (or any other authentication responses). Each SRES is based on a shared secret key, $k_i$ resulting in the multiple SRESs. Although in some embodiments IMSI reuse information 3404 includes an IMEI and unique identifiers based on the IMEI, other embodiments of the IMSI reuse information 3404 can include the GUTI of the device 3402 and the unique identifiers can be based on the GUTI. Further embodiments of the IMSI reuse information 3404 can include a unique identifier associated with each of multiple $k_i$ that is not based on IMEI or GUTI of the device 3402. In addition, each unique identifier 3410, shared secret key, $k_i$, and $SRES_i$ can be associated with a device profile 3416 of the device 3402. For example, the device 3402 can be provisioned with five different device profiles 3416. The device 3402 can be shared between four different users, a parent, and three children. The device 3402 can be provisioned with a parent personal profile and a parent business profile as well as with a device profile for each of the three children. A user of device 3402 can enable or select (e.g. based on received user-generated input) any of the device profiles provisioned on the device 3402. Thus, the device 3402 can be used by more than user according to a particular device profile.

In one or more embodiments, the device 3402 can be communicatively coupled to a communication network. Network devices having a registration function within the communication network can register the device 3402 by receiving a SRES, and matching the $SRES_i$ with an SRES generated by the registration function. In addition, a device profile enabled on the device 3402 can be identified by the registration function, directly or indirectly as described herein, according to the generated SRES matching the $SRES_i$ provided by the device. In additional embodiments, the registration function can determine the shared secret key, $k_i$, based on the $SRES_i$. Also, registration function can identify the device profile enabled or selected (e.g. based on received user-generated input) on the device 3402 according to the determined shared secret key, $k_i$. Further embodiments can include the network services devices providing specific or particular services to the device 3402 based on the identified device profile.

In one or more embodiments, the registration function, identity proxy function, or identity provisioning function can be provisioned with the entirety or a portion of the IMSI reuse information 3404. In addition, the registration function, identity proxy function, or identity provisioning function can request a unique identifier responsive to receiving the $SRES_i$. Each can identify the device profile enabled by the communication device according to the unique identifier. Further, one of the registration function, identity proxy function, or identity provisioning function can provide specific or particular service for the device 3402 based on the identified device profile. For example, upon receiving $SRES_2$ and/or IMEI-sub2, at least one of the registration function, identity proxy function, or identity provisioning function can determine that the $SRES_2$ and/or IMEI-sub2 is associated with a business profile of a user. Thus, the network devices can provide business related services such as VPN services, security protections, and data encryption. In another example, upon receiving $SRES_1$ and/or IMEI-sub1, the registration function, identity proxy function, or identity provisioning function can determine that the $SRES_1$ and/or IMEI-sub1 is associated with a personal profile of the user. Thus, the registration function, identity proxy function, or identity provisioning function can provide personal services such as streaming services, parental controls, and music distribution.

The device 3402 can be, but not limited to, a smartphone, mobile phone, tablet computer, sensor, Internet of Things (IoT) device, or any other computing device. Further IMSI reuse information 3404 can be stored in a look-up table and/or database in a network device or accessed by a network device to determine or identify associations among the IMSI 3406, IMEI (or any other device identifier) 3408, unique identifier 3410, shared secret key, $k_i$, $SRES_i$ 3412, and device profiles 3416. Although embodiments discuss the authentication response can be a signed response (SRES), the authentication response can be RES and XRES (expected response) as described herein.

Figure 35:
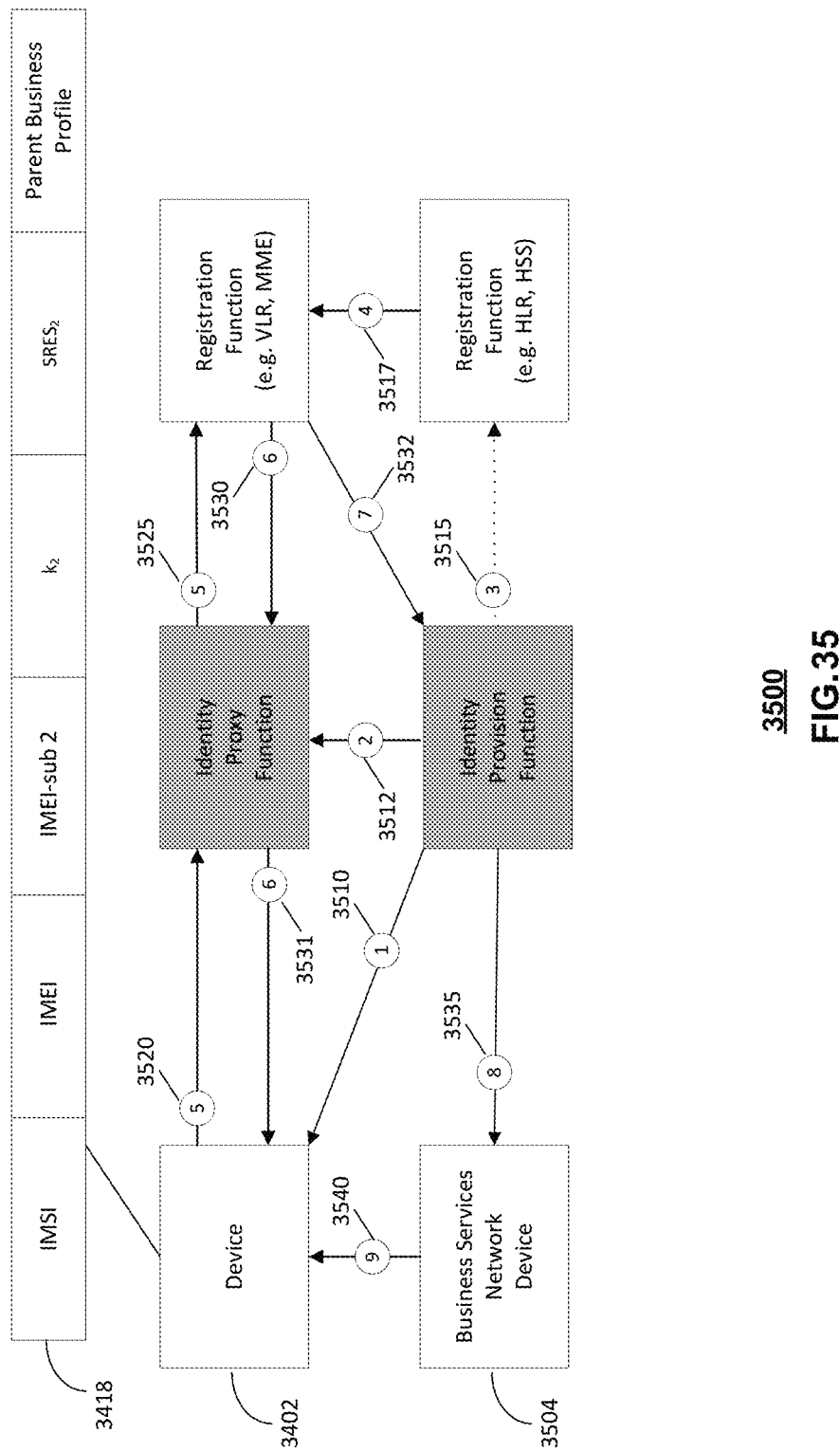
FIGS. 35-36 depict illustrative embodiments of a device registering for services according to one of a multiple shared secret keys, $k_i$ of the device.

FIG. 35 depicts an illustrative embodiment of a device registering for services according to one of a multiple $k_i$ of the device. The system 3500 incorporates the functions discussed in describing, inter alia, FIGS. 3, 4, 5, 6, 10, and 11. In one or more embodiments, the identity provisioning function assigns, at 3510, the device 3402 with IMSI reuse information 3404 including IMSI 3406 and a portion or all of IMSI reuse information 3420. In further embodiments, at 3512, the identity provisioning function notifies the identity proxy function that IMSI 3406 and IMSI reuse information 3404 is provisioned on device 3402. Such a notification can include providing the IMSI to the identity proxy function by the identity provisioning function as well as possibly providing other portions or all of the IMSI reuse information. This notifies the identity proxy function to allow a registration request from the device that includes the IMSI to be passed through or relayed to the registration function. In some embodiments, without this notification, the identity proxy function may have been notified that the IMSI was shared among multiple devices and the identity proxy function would intercept the registration request to avoid a possible registration error. However, the notification provides information to the identity proxy function that indicates there would be no registration error if the registration request was allowed to be sent to the registration function In additional embodiments, the identity provisioning function notifies, at 3515, a first registration function on a network device (e.g. HLR, HSS, etc.) that the device 3402 is assigned the IMSI 3406 as well as provisioned with the multiple $k_i$. The identity provisioning function may also share the multiple $k_i$ with the first registration function or the first registration function may be provided with the multiple $k_i$ by other network devices. In addition, the first registration function can be provided by the device profile associated with each of the multiple $k_i$. The first registration function can provide, at 3517, the IMSI, portions of the IMSI reuse information, and the device profile associated with each of the multiple $k_i$ to a second registration function (e.g. VLR, MME, etc.) for the device. The first registration function can also provide the generated authentication response, $SRES_i$ for each of the multiple $k_i$, each associated with a device profile. In some embodiments, the second registration function can be provided the generated authentication responses initially and then request the device profile with the matched generated response from the first registration function. That is, the second registration function sends a request for the device profile with the matching generated authentication response. The first registration function identifies the device profile according to the matched generated authentication response, and provide the device profile to the second registration function accordingly.

In some embodiments, the identity provisioning function and the identity proxy function can be on separate network devices. In other embodiments, the identity provisioning function and the identity proxy function can be on the same network device. In some embodiments, the first registration function and the second registration function can be on separate network devices and in other embodiments the first registration function and the second registration function can be on the same network device.

At 3520, the device 3402 sends a registration request to the registration function. The registration request can be intercepted or otherwise obtained by the identity proxy function which can identify the IMSI 3406 assigned to the device 3402. At 3525, the identity proxy function relays the registration request to the second registration function. As part of the registration process, the second registration function can generate or otherwise obtain an authentication response based on each of the multiple $k_i$ resulting in multiple generated authentication responses. Further, the registration request can include a device authentication response. Note, the registration request can comprises one or more messages exchanged among the device, identity proxy function and the second registration function.

In one or more embodiments, the second registration function compares the device authentication response to each of the generated authentication responses. Further, the second registration function identifies a generated authentication response that matches the device authentication response. In addition, the second registration function can identify or determine the device profile associated with the identified generated authentication response. Identifying the device profile can include determining the $k_i$ associated with the identified generated authentication response and the determining the device profile associated with the $k_i$.

In response to the device authentication response matching one of the multiple generated authentication responses, at 3530, the second registration function sends a message to the device 3402 that the registration function has confirmed the registration of device 3402. The identity proxy function relays the message to the device 3402, at 3531.

In some embodiments, the identity proxy function can intercept the registration request and simulate a registration. Further, the first registration function can provide the IMSI, portions of the IMSI reuse information and the device profile associated with each of the multiple $k_i$ to identity proxy function. In further embodiments, the identity proxy function can simulate the registration of the device. The identity proxy function can compare the device authentication response to each of the generated authentication responses. Further, the identity proxy function identifies a generated authentication response that matches the device authentication response. In addition, the identity proxy function can identify or determine the device profile associated with the identified generated authentication response. Identifying the device profile can include determining the $k_i$ associated with the identified generated authentication response and the determining the device profile associated with the $k_i$. The identity proxy function can notify the identity provisioning function that the identity proxy function simulating a registration for a device that has an IMSI that is shared among different device profiles. Further, the identity provisioning function may provision another IMSI on the device and the first registration function and/or second registration function. In addition, the device can re-register with the first registration function and/or second registration function with the newly provisioned IMSI. However, the services network device is notified by the identity proxy function or identity provisioning function that the device has enabled with a particular device profile so that the services network device can provide services to the device according to the device profile.

In one or more embodiments, at 3532, the second registration function sends a notification to the identity provisioning function indicating that the identity proxy function has received an authentication response, $SRES_2$. In additional embodiments, the first registration can determine the device profile and notify the identity provision function. That is, the second registration function provides the matched generated authentication response to the first registration function and the first registration function identifies the device profile according to the generated authentication response. In further embodiments, where the identity proxy function has simulated a registration, the identity proxy function can provide the identity provisioning function with the authenticated response, $SRES_2$. In some embodiments, the identity provisioning function can identify the particular device profile enabled on the device 3402 according to the $SRES_2$. In other embodiments, the identity provisioning function can determine, identify, or otherwise obtain a shared secret key, $k_2$, from $SRES_2$ then determine the particular device profile enabled on the device 3402 according to the shared secret key $k_2$. In further embodiments, the notification from the second registration function can indicate the device profile associated with $SRES_2$.

In one or more embodiments, the IMSI reuse information 3404 can be stored in a database. Associations among the shared secret key $k_2$ and device profile can be determined by accessing the IMSI reuse information according to the shared secret key, $k_2$ used to generate the $SRES_2$ from the database, by any network device in the network including, but not limited to the identity proxy function, identity provisioning function, first registration function, and second registration function.

Responsive to obtaining or determining the device profile, and identifying that the device profile for business services, at 3535, the identity provisioning function can deliver the identified device profile to a business services network device 3504 or provide a notification to the business services network device 3504 that device 3502 has enabled the particular device profile associated with $SRES_2$. In some embodiments, the notification can be provided by another network device that is notified, directly or indirectly, by the second registration function, identity proxy function, and/or identity provisioning function. Further, the business network device may provide business services according to the device profile, at 3540. For example, the business services network device 3504 can set up a virtual private network to the device 3502 over a communication network according to the device profile. In another example, the business services network device 3504 can initiate configuration of the device 3502 to receive business emails securely over the communication network according to the device profile. In some embodiments, the network can point all traffic to the services network device directed toward or received from the device to provide services according to the device profile.

In some embodiments, functions described for the identity provisioning function can be also be implemented by the identity proxy function. In other embodiments, functions described for the identity proxy function can also be implemented by the identity provisioning function. In further embodiments, the first registration function may receive a registration request from the device and perform the functions by the second registration function described herein.

Figure 36:
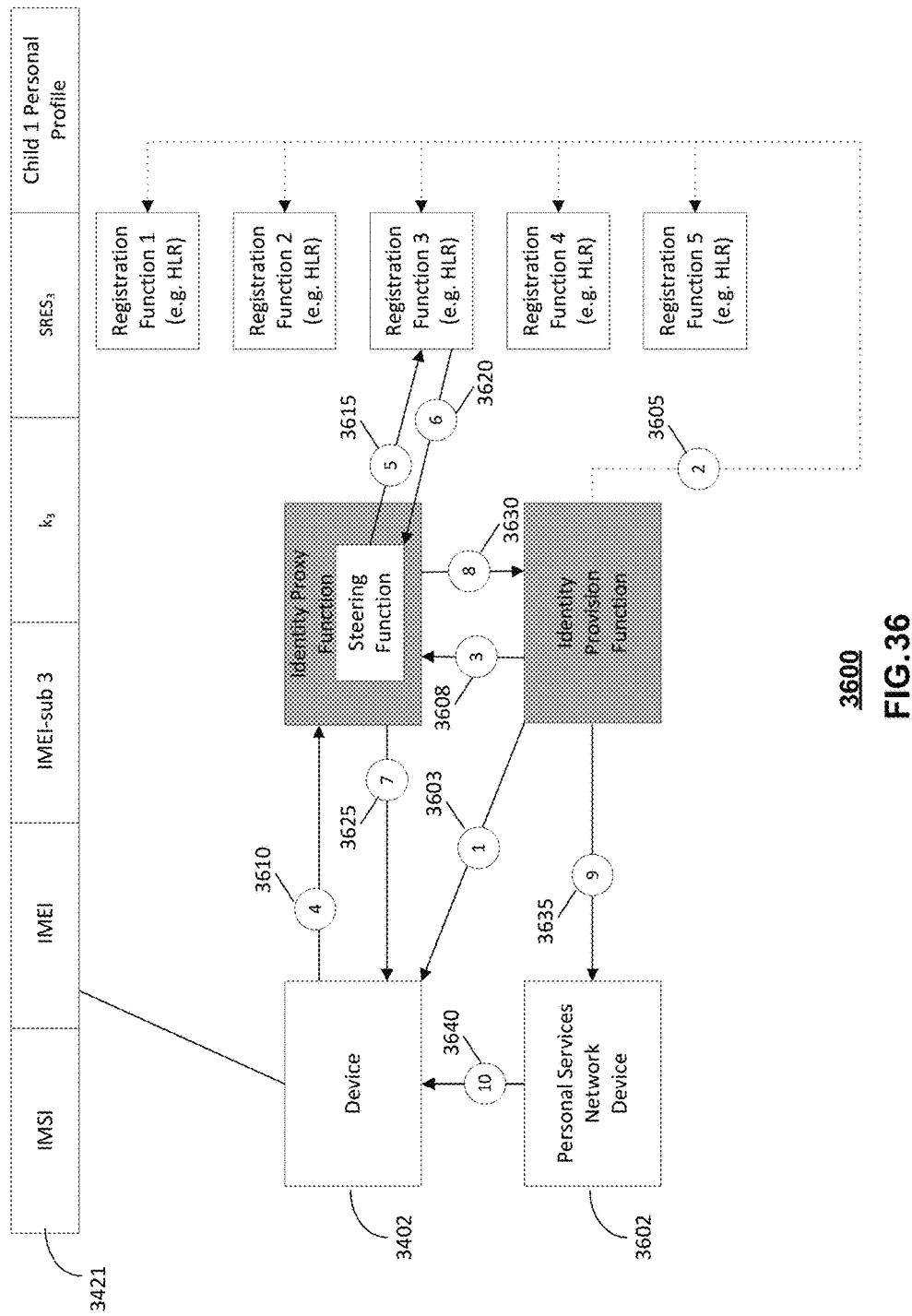

FIG. 36 depicts an illustrative embodiment of a device registering for services according to one of a multiple shared secret keys, $k_i$, of the device 3402. The system 3600 incorporates the functions discussed in describing, inter alia, FIGS. 3, 4, 5, 6, 10, and 11.

In one or more embodiments, the identity provisioning function assigns, at 3603, the device 3402 with IMSI 3406 and with IMSI reuse information 3404 including a portion or all of the IMSI reuse information 3418. In additional embodiments, the identity provisioning function notifies, at 3605, multiple registration functions (e.g. HLR, VLR, HSS, MME, etc.) that the device 3402 is assigned the IMSI 3406 as well as provisioned the multiple $k_i$. That is, a first registration function can be notified of the IMSI and $k_1$, a second registration function can be notified of the IMSI and $k_2$, a third registration function can be notified of the IMSI and $k_3$, a fourth registration function can be notified of the IMSI and $k_4$, and a fifth registration function can be notified of the IMSI and $k_5$. The identity provisioning function may also share the $k_i$ with an associated registration function or the registration functions may be provided with the multiple $k_i$ by other network devices. Each of the registration functions can be on separate network devices or some or all of the registration functions can be on a same device such that each of the registration function can be a virtual registration function.

In one or more embodiments, the identity provisioning function, at 3608, notifies the identity proxy function of the IMSI for the device and that the IMSI is associated with multiple device profiles. In some embodiments, the identity provisioning function may provide the identity proxy function with a unique identity associated with a device profile that can be selected by the user of the device 3402. Further, the identity provisioning function can provide steering information to the identity proxy function to steer a registration request from the device to one of the multiple registration functions according to a unique identifier. For example, if the identity proxy function receives a unique identifier, IMEI-sub 3, then the steering function forwards the registration request for the device to a third registration function.

In one or more embodiments, the identity proxy function, at 3610, may receive a registration request from the device. In some embodiments, the registration request may include a unique identifier associated with a device profile. In other embodiments, the identity proxy function can determine according to the IMSI included in the registration request that the device has more than one device profile. The identity proxy function can send a request to the device for the unique identifier associated with the enabled device profile. In response, the device can provide the unique identifier to the identity proxy function. A steering function, at 3615, can send the registration request to one of the multiple registration functions according to the unique identifier. For example, the device may be enabled or user selected to have personal profile for a child 3421. Such a profile is associated with the IMSI of the device and the IMEI as well as the unique identifier IMEI-sub 3 (based on the IMEI), $k_3$, and $SRES_3$ (signed authentication response). The identity proxy function steers the registration function, at 3615, according to the unique identifier to the third registration function. Further, the third registration function sends, at 3620, a registration confirmation for the device to the identity proxy function. The identity proxy function relays the registration confirmation, at 3625, to the device. Further, the identity proxy function, at 3630, sends a notification to the identity provisioning function that the device has enabled or user-selected a third device profile according to the unique identifier, IMEI-sub 3. In addition, the identity provisioning function sends, at 3635, a notification to a personal services network device 3602 to provide personal services to the device. At 3640, the personal services network device 3602 provides personal services to the device. For example, the personal services network device 3602 can provide streaming media services to the device 3402 over a communication network. In another example, the personal services network device 3602 can initiate configuration of the device 3402 to receive music files over the communication network. In a further example, the personal services network device 3602 can institute parental controls, filters, software, programs, applications, etc.

In some embodiments, functions described for the identity provisioning function can be also be implemented by the identity proxy function. In other embodiments, functions described for the identity proxy function can also be implemented by the identity provisioning function.

Figure 37A:
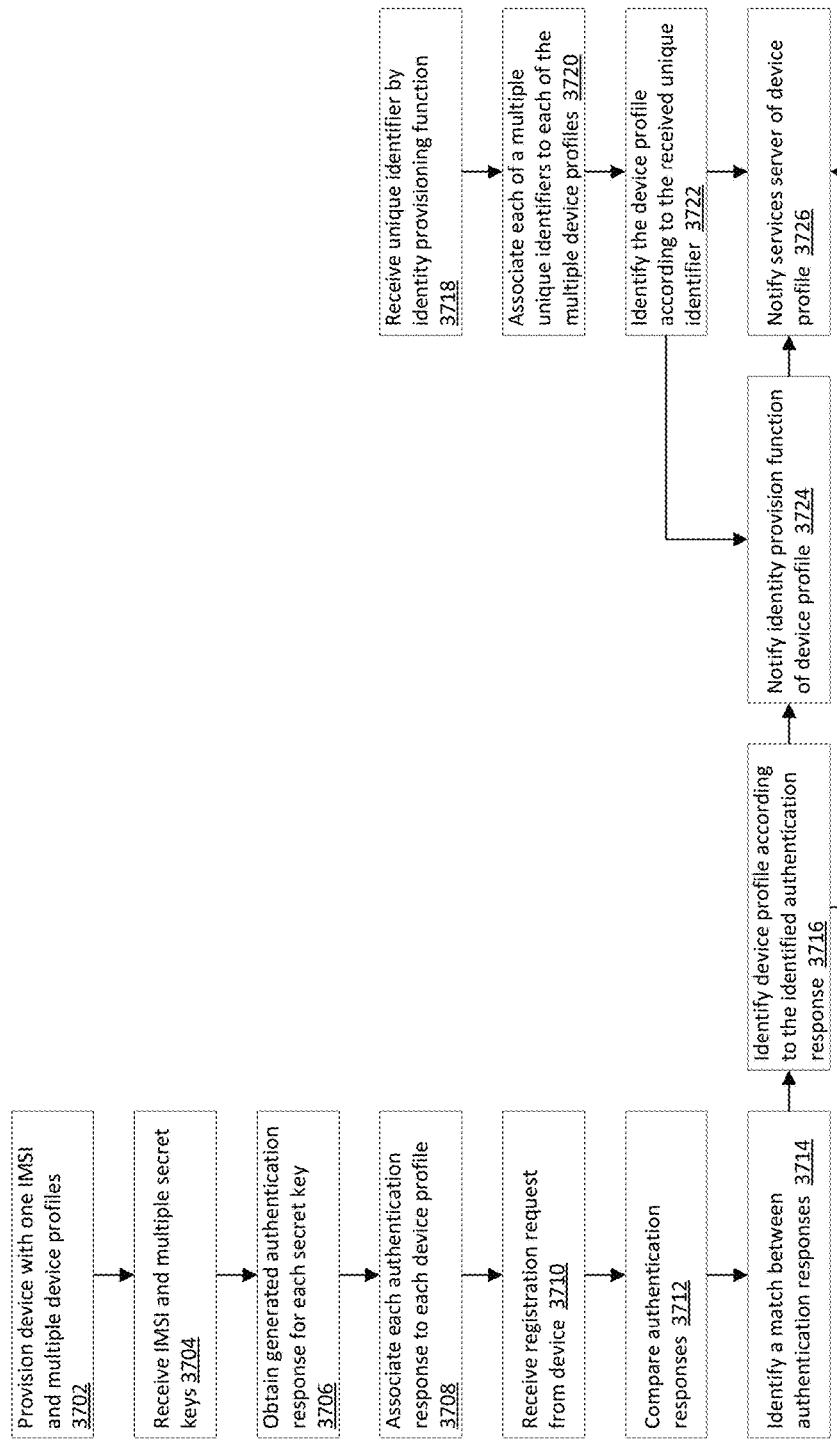
FIGS. 37A-B depict illustrative embodiments of methods that use multiple shared secret keys, $k_i$ associated with an IMSI of a device.

FIG. 37A depicts an illustrative embodiment of a method 3700 that uses multiple shared secret keys, $k_i$, associated with an IMSI of a device. The method 3700 can be implemented by a network device or a group of network devices that can include the identity proxy function, identity provisioning function, one or more registration functions, and service provision functions (e.g. networks devices that provide personal or business services). In one or more embodiments, the method 3700, at 3702, can include the identity provisioning function provisioning a communication device with multiple device profiles as well as an IMSI and IMSI reuse information and provides instructions to the communication device to associate each of the multiple device profiles with the IMSI. Further, the method 3700 can include, at 3704, a network device receiving an international mobile subscriber identity (IMSI) and multiple secret keys associated with the IMSI. In some embodiments, the network device can include a registration function (e.g. HLR, HSS). In other embodiments, the network device having the registration function can receive the IMSI and the multiple secret keys from an identity provisioning function. Each of the multiple secret keys is associated with a device profile resulting in multiple device profiles.

In addition, the method 3700 can include, at 3706, a registration function obtaining a generated authentication response for each of the multiple secret keys resulting in multiple generated authentication responses. In some embodiments, the registration function can generate the multiple authentication responses. In other embodiments, the registration function can obtain the multiple authentication responses from another network device. Also, the method 3700 can include, at 3708, the registration function associating each of the multiple, generated authentication responses with each of the multiple device profiles. This can be done through storing the generated authentication response with each of the multiple device profiles in a table or database. The method 3700 can include the registration function, at 3710, receiving a registration request from the communication device. The registration request can include a device authentication response. In some embodiments, the registration request can be more than one message and one of these messages can include the device authentication response. Further, the method 3700 can include the registration function, at 3712, comparing the device authentication response to the each of the multiple generated authentication responses. In addition, the method 3700 can include the registration function identifying, at 3714, that the device authentication response matches a first generated authentication response. The first generated authentication response is one of the multiple generated authentication responses. Also, the method 3700 can include, at 3716, the registration function identifying a first device profile associated with the first generated authentication response. The first device profile can be one of the multiple device profiles. In some embodiments, the steps above 3702-3716, can be implemented by any registration function (e.g. HLR, VLR, HSS, MME, etc.). In some embodiments, the method 3700 can include the registration function notifying, at 3726, a server, or network services device, to provide services to the communication device according to the first device profile. In other embodiments, the registration function can notify, at 3724, an identity provisioning function that the communication device is registering with first device profile and the identity provisioning function can notify, at 3726, a server, or network services device, to provide services to the communication device according to the first device profile. In further embodiments, the registration function can be an MME or VLR and notifies the HSS or HLR the identified device profile. In some embodiments, the server or network services device is provided the first device profile. In other embodiments, the server or network services device is provided an indication of the first device profile. The server or networks services device can provide services to the communication device according to the first device profile.

In one or more embodiments, the registration function can determine the first device profile according to method 3700. Further, method 3700 can request and receive a unique identifier associated with the first device profile from the communication device. In addition, the method 3700 can include an identity provisioning function, at 3718, receiving the unique identifier from the registration function. The method 3700 can include, prior to receiving the unique identifier and provisioning the communication device, the identity provisioning function, at 3720, associating each of a multiple unique identifiers to each of the multiple device profiles. Further, the method 3700 can include the identity provisioning function, at 3722, identifying the first device profile according the received unique identifier. Subsequently, the method 3700 can include the identity provisioning function notifying, at 3726, a server or network services device of the first device profile. (e.g. enabled or selected by the communication device based user-generated input through a user interface). For example, if the first device profile is a business profile, the network services device can provide VPN services, business email services, or data encryption services to the communication device. In another example, if the first device profile is a personal profile, the network services device can provide streaming media services, music distribution services, or parental controls to the communication device.

Figure 37B:
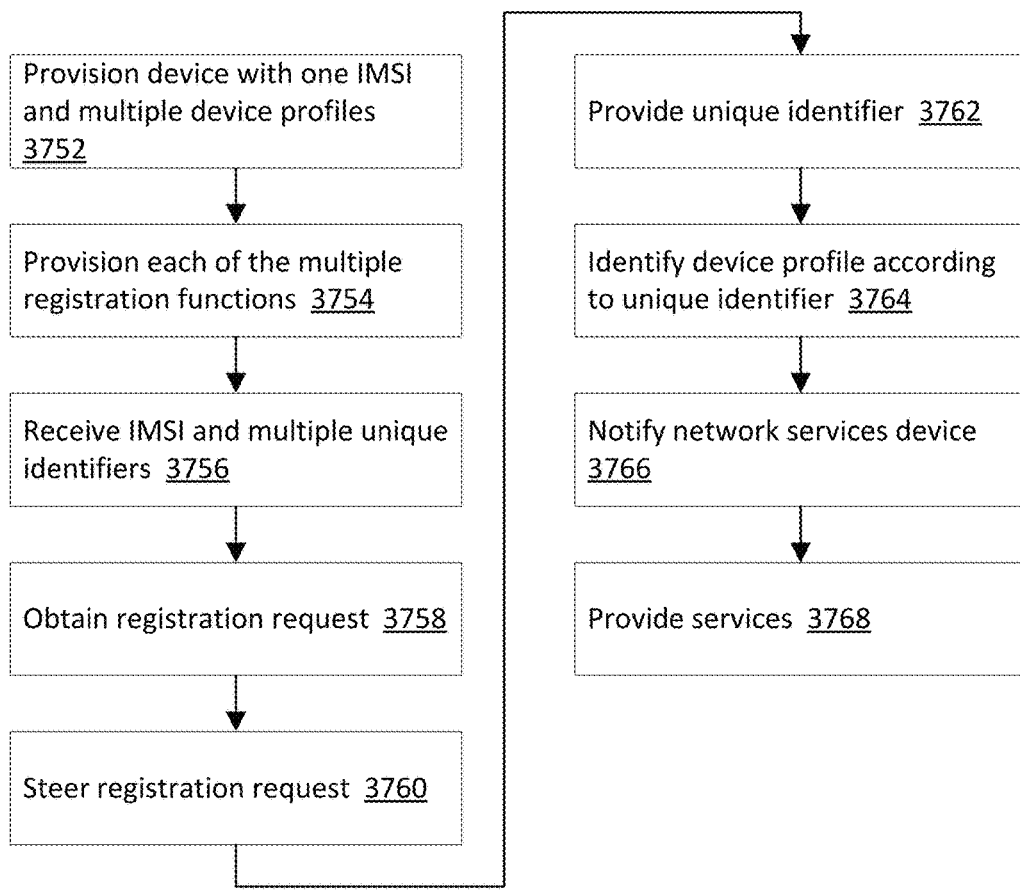

FIG. 37B depicts an illustrative embodiment of a method 3750 that uses multiple shared secret keys, $k_i$ associated with an IMSI of a device. The method 3700 can be implemented by a network device or a group of network devices that can include the identity proxy function, identity provisioning function, one or more registration functions, and service provision functions (e.g. networks devices that provide personal or business services). The method 3750 can include, at 3752, the identity provisioning function provisioning a communication device with an IMSI, multiple device profiles, and multiple secret keys. The identity provisioning function can also provide instructions to the communication device to associate each of the plurality of device profiles with the IMSI. Each of the plurality of secret keys are associated with each of the plurality of device profiles. Also, the communication device can associate a device authentication response generated from each secret key with a device profile. Further, method 3750 can include, at 3754, the identity provisioning function provisions each of multiple registration functions with the IMSI provisioned on the communication device and one of multiple secret keys. In some embodiments, each registration function is provisioned with a device profile associated with the provision secret key. In addition, the method 3750 can include, at 3756, the identity proxy function receiving an IMSI and multiple unique identifiers from an identity provisioning function. Each of the multiple unique identifiers are associated with a registration function from the multiple registration functions. Also, the method 3750 can include, at 3758, the identity proxy function obtaining a registration request from a communication device. The registration request includes a first unique identifier of the multiple unique identifiers. In some embodiments, the registration request can be an exchange of several messages between the identity proxy function and the communication device. The method 3750 can include, at 3760, steering the registration request to a first registration function of the multiple registration functions according to the first unique identifier. In further embodiments, prior to sending the registration request, the communication device enables a first device profile. The communication device selects a first secret key of multiple secret keys according to the first device profile and the communication device generates a device authentication response based on the first secret key. The communication device sends the device authentication response to the first registration function. The identity proxy function can receive a device authentication from the communication device and forward the device authentication to the first registration function. In other embodiments, the first registration function receives a first secret key from the multiple secret keys from a network device. The first registration function can generate a first authentication response based on the first secret key. Further, the first registration function matches the first authentication response with the device authentication response. Accordingly, the first registration function confirms the registration. In additional embodiments, the identity proxy function can receive a registration confirmation message from the first registration function and forward the registration confirmation to the communication device.

Further, the method 3750 can include, at 3762, providing the first unique identifier to the identity provisioning function either from the identity proxy function or the first registration function. In addition, the method 3750, at 3764, the identity provisioning function identifies a first device profile according to the first unique identifier. In some embodiments, the first device profile is identified by the registration function and provided to the identity provisioning function. Also, the method 3750 can include, a 3766, the identity provisioning function notifying a network services device that the communication device has enabled a first device profile. The method 3750 can include, at 3768, the network services device to provide services to the communication device according to the first device profile.

Figure 38:
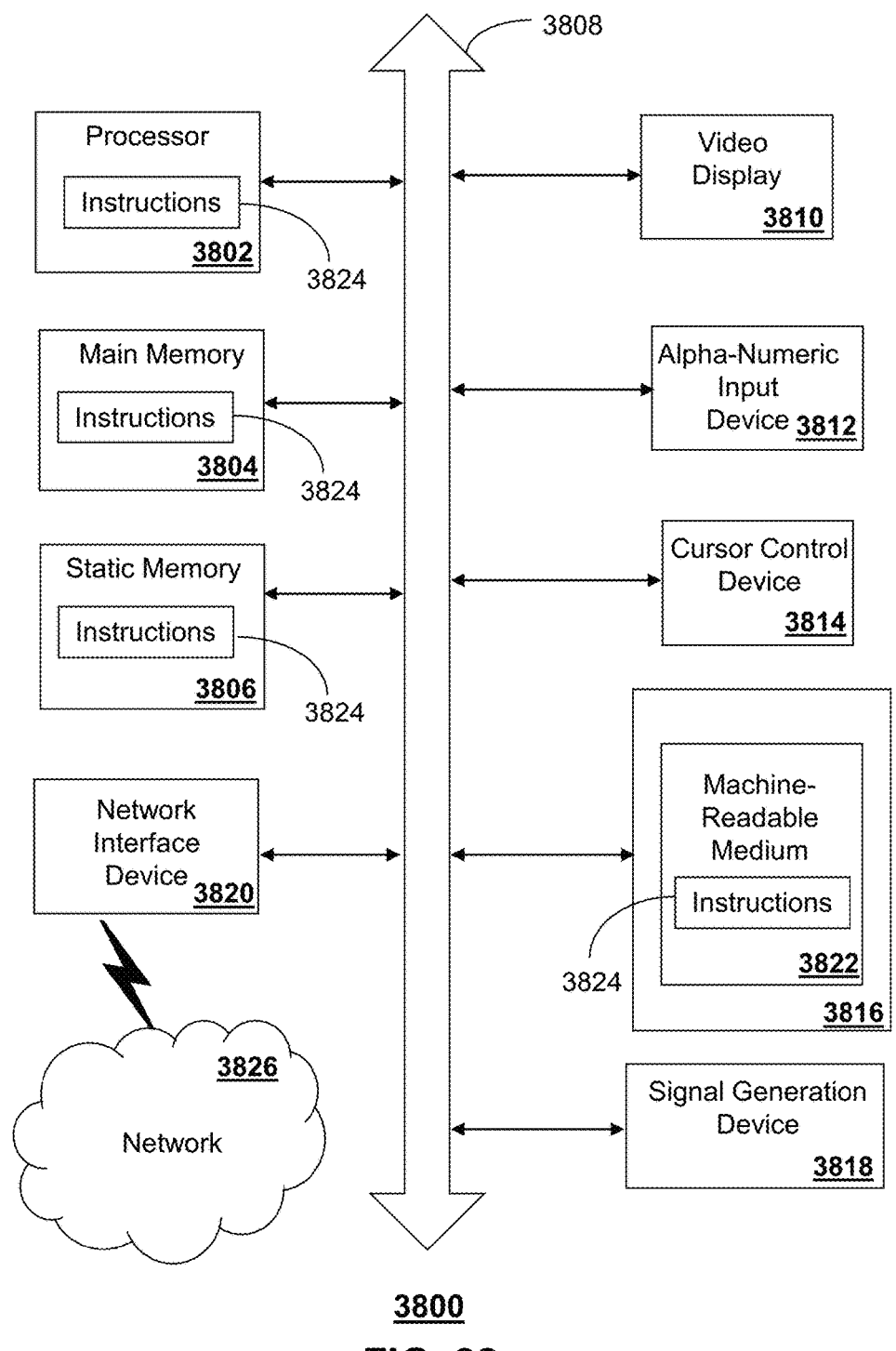

FIG. 38 depicts an exemplary diagrammatic representation of a machine in the form of a computer system 3800 within which a set of instructions, when executed, may cause the machine to perform any one or more of the methods described above. One or more instances of the machine can operate, for example, as the identity proxy functions 250, 850, 1050, 1350, 2250, 2450, 2650, 2750, the identity provisioning functions 350, 899, 1099, 1399, 1599, 1999, 2299, 2499, 2599, 2699, the steering functions 1575, and/or other network elements (e.g., MSC/VLR, HLR, MME, HSS) or end user devices for switching between a generic IMSI and a full service IMSI, facilitating the use of the same IMSI by multiple devices, intercepting authentication requests, determining a particular device that is utilizing a shared IMSI, intercepting other messages such as registration requests or error messages, determining identities of devices, and/or managing the use and reassignment of the IMSIs, including through the use of a bootstrap IMSI, and so forth. In some embodiments, the machine may be connected (e.g., using a network 3826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 3800 may include a processor (or controller) 3802 (e.g., a central processing unit (CPU)), a graphics processing unit (GPU, or both), a main memory 3804 and a static memory 3806, which communicate with each other via a bus 3808. The computer system 3800 may further include a display unit 3810 (e.g., a liquid crystal display (LCD), a flat panel, or a solid state display). The computer system 3800 may include an input device 3812 (e.g., a keyboard), a cursor control device 3814 (e.g., a mouse), a disk drive unit 3816, a signal generation device 3818 (e.g., a speaker or remote control) and a network interface device 3820. In distributed environments, the embodiments described in the subject disclosure can be adapted to utilize multiple display units 3810 controlled by two or more computer systems 3800. In this configuration, presentations described by the subject disclosure may in part be shown in a first of the display units 3810, while the remaining portion is presented in a second of the display units 3810.

The disk drive unit 3816 may include a tangible computer-readable storage medium 3822 on which is stored one or more sets of instructions (e.g., software 3824) embodying any one or more of the methods or functions described herein, including those methods illustrated above. The instructions 3824 may also reside, completely or at least partially, within the main memory 3804, the static memory 3806, and/or within the processor 3802 during execution thereof by the computer system 3800. The main memory 3804 and the processor 3802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 3822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 3800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
receiving an international mobile subscriber identity (IMSI) and a generated authentication response for each of a plurality of secret keys resulting in a plurality of generated authentication responses;
associating each of the plurality of generated authentication responses with each of a plurality of device profiles;
receiving a registration request from a communication device, wherein the registration request includes a device authentication response;
comparing the device authentication response to the each of the plurality of generated authentication responses;
identifying that the device authentication response matches a first generated authentication response, wherein the first generated authentication response is one of the plurality of generated authentication responses;
identifying a first device profile associated with the first generated authentication response; and
notifying a server to provide services to the communication device according to the first device profile.

2. The device of claim 1, wherein the receiving of the IMSI and the plurality of generated authentication responses comprises receiving of the IMSI and the plurality of generated authentication responses from a registration function.

3. The device of claim 1, wherein the receiving of the IMSI and the plurality of secret keys comprises receiving of the IMSI and the plurality of secret keys from an identity provisioning function.

4. The device of claim 1, wherein the notifying of the server comprises notifying an identity provisioning function of the first device profile, wherein the server obtains an indication of the first device profile from the identity provisioning function.

5. The device of claim 4, wherein the operations further comprise receiving a first unique identifier from the communication device, wherein the first unique identifier is associated with the first device profile, and wherein the notifying of the identity provisioning function of the first device profile comprises sending the first unique identifier to the identity provisioning function, wherein the identity provisioning function associates each of the plurality of device profiles with each of a plurality of unique identifiers, and wherein the identity provisioning function identifies the first device profile according to the first unique identifier.

6. The device of claim 1, wherein the identity provisioning function provisions the communication device with the plurality of device profiles and provides instructions to the communication device to associate each of the plurality of device profiles with the IMSI.

7. A method, comprising:
receiving, by a processing system including a processor, an international mobile subscriber identity (IMSI) and a plurality of unique identifiers from an identity provisioning function, wherein each of the plurality of unique identifiers are associated with a registration function resulting in a plurality of registration functions, wherein the processing system operates as an identity proxy function;
obtaining, by the processing system, a registration request from a communication device, wherein the registration request includes a first unique identifier of the plurality of the unique identifiers;
steering, by the processing system, the registration request to a first registration function of the plurality of registration functions according to the first unique identifier; and
providing, by the processing system, the first unique identifier to the identity provisioning function, wherein the identity provisioning function identifies a first device profile according to the first unique identifier, and wherein the identity provisioning function sends a notification to a server that the communication device has enabled the first device profile.

8. The method of claim 7, comprising:
receiving, by the processing system, a device authentication response from the communication device; and
forwarding, by the processing system, the device authentication response to the first registration function.

9. The method of claim 7, comprising:
receiving, by the processing system, a registration confirmation from the first registration function; and
forwarding, by the processing system, the registration confirmation to the communication device.

10. The method of claim 7, wherein the identity provisioning function provisions the communication device with the IMSI, a plurality of device profiles, and a plurality of secret keys, and provides instructions to the communication device to associate each of the plurality of device profiles with the IMSI, and wherein the each of the plurality of secret keys are associated with each of the plurality of device profiles.

11. The method of claim 7, wherein the identity provisioning function provisions each of the plurality of registration functions with the IMSI provisioned on the communication device and one of a plurality of secret keys.

12. The method of claim 7, wherein the first registration function receives a first secret key of a plurality of secret keys, wherein the first registration function generated a first authentication response based on the first secret key.

13. The method of claim 12, wherein the communication device enables the first device profile, wherein the communication device selects the first secret key of the plurality of secret keys according to the first device profile, wherein the communication device generates a device authentication response based on the first secret key, and wherein the communication device sends the device authentication response to the first registration function.

14. A non-transitory machine-readable storage medium, comprising executable instruction that, when executed by a processing system including a processor, facilitate performance of operations, comprising:
  receiving an international mobile subscriber identity (IMSI) and a generated authentication response for each of a plurality of secret keys resulting in a plurality of generated authentication responses;
  associating each of the plurality of generated authentication responses with each of a plurality of device profiles;
  receiving a registration request from a communication device, wherein the registration request includes a device authentication response;
  identifying a first device profile according to the device authentication response and a first generated authentication response from the plurality of generated authentication responses; and
  notifying a server to provide services to the communication device according to the first device profile.

15. The non-transitory machine-readable storage medium of claim 14, wherein identifying the first device profile comprises:
  comparing the device authentication response to the each of the plurality of generated authentication responses; and
  identifying that the device authentication response matches the first generated authentication response, wherein the first generated authentication response is one of the plurality of generated authentication responses.

16. The non-transitory machine-readable storage medium of claim 14, wherein the receiving of the IMSI and the plurality of generated authentication responses comprises receiving of the IMSI and the plurality of generated authentication responses from a registration function.

17. The non-transitory machine-readable storage medium of claim 14, wherein the receiving of the IMSI and the plurality of secret keys comprises receiving of the IMSI and the plurality of secret keys from an identity provisioning function.

18. The non-transitory machine-readable storage medium of claim 14, wherein the notifying of the server comprises notifying an identity provisioning function of the first device profile, wherein the server obtains an indication of the first device profile from the identity provisioning function.

19. The non-transitory machine-readable storage medium of claim 18, wherein the operations further comprise receiving a first unique identifier from the communication device, wherein the first unique identifier is associated with the first device profile, and wherein the notifying of the identity provisioning function of the first device profile comprises sending the first unique identifier to the identity provisioning function, wherein the identity provisioning function associates each of the plurality of device profiles with each of a plurality of unique identifiers, and wherein the identity provisioning function identifies the first device profile according to the first unique identifier.

20. The non-transitory machine-readable storage medium of claim 14, wherein the identity provisioning function provisions the communication device with the plurality of device profiles and provides instructions to the communication device to associate each of the plurality of device profiles with the IMSI.

* * * * *